United States Patent [19]
Hamada et al.

[11] Patent Number: 5,374,984
[45] Date of Patent: Dec. 20, 1994

[54] CAMERA HAVING LEARNING FUNCTION

[75] Inventors: Masataka Hamada, Osakasayama; Masayuki Ueyama, Toyonaka; Kenji Ishibashi; Hiroshi Oosuka, both of Sakai, all of Japan

[73] Assignee: Minolta Camera Kabushiki Kaisha, Osaka, Japan

[21] Appl. No.: 145,510

[22] Filed: Nov. 4, 1993

Related U.S. Application Data

[62] Division of Ser. No. 797,960, Nov. 26, 1991, Pat. No. 5,285,231.

[30] Foreign Application Priority Data

| Nov. 29, 1990 | [JP] | Japan | 2-334414 |
| Nov. 29, 1990 | [JP] | Japan | 2-334415 |
| Nov. 29, 1990 | [JP] | Japan | 2-334416 |

[51] Int. Cl.$^5$ .............. G03B 5/00; G03B 7/097
[52] U.S. Cl. ............................ 354/400; 354/443
[58] Field of Search ............ 354/443, 400, 195.1, 354/195.12, 410, 412, 289.1, 289.12

[56] References Cited

U.S. PATENT DOCUMENTS

| 4,769,668 | 9/1988 | Ishikawa et al. | 354/443 X |
| 4,942,417 | 7/1990 | Miyazawa et al. | 354/400 |
| 4,951,075 | 8/1990 | Tokumaru et al. | 354/400 |

Primary Examiner—W. B. Perkey
Attorney, Agent, or Firm—Burns, Doane, Swecker & Mathis

[57] ABSTRACT

A camera according to the present invention comprises a taking lens whose focal length is variable. A focal length thereof is determined based on a subject distance measured by a distance measuring circuit and a relation between a subject distance and a focal length previously stored in a memory or according to a manual operation. The relation stored in the memory is changed based on a focal length determined.

27 Claims, 58 Drawing Sheets

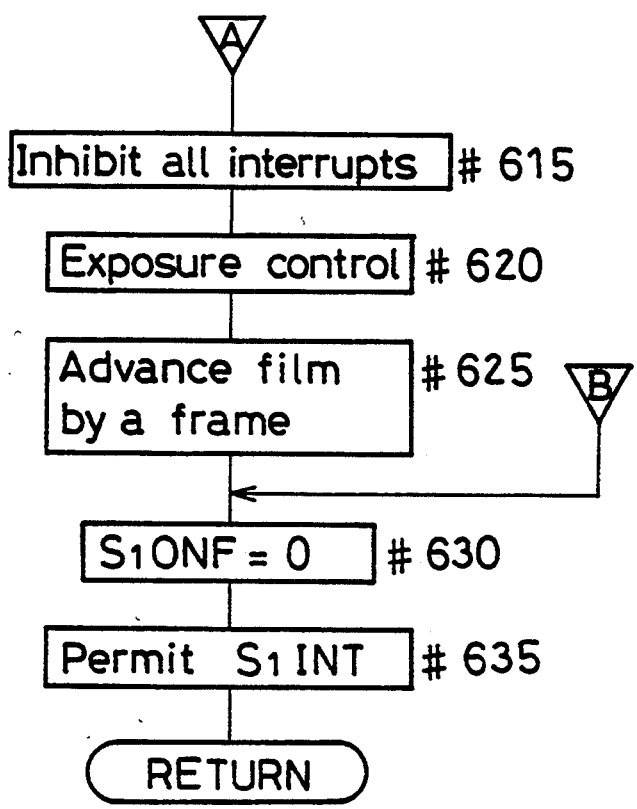

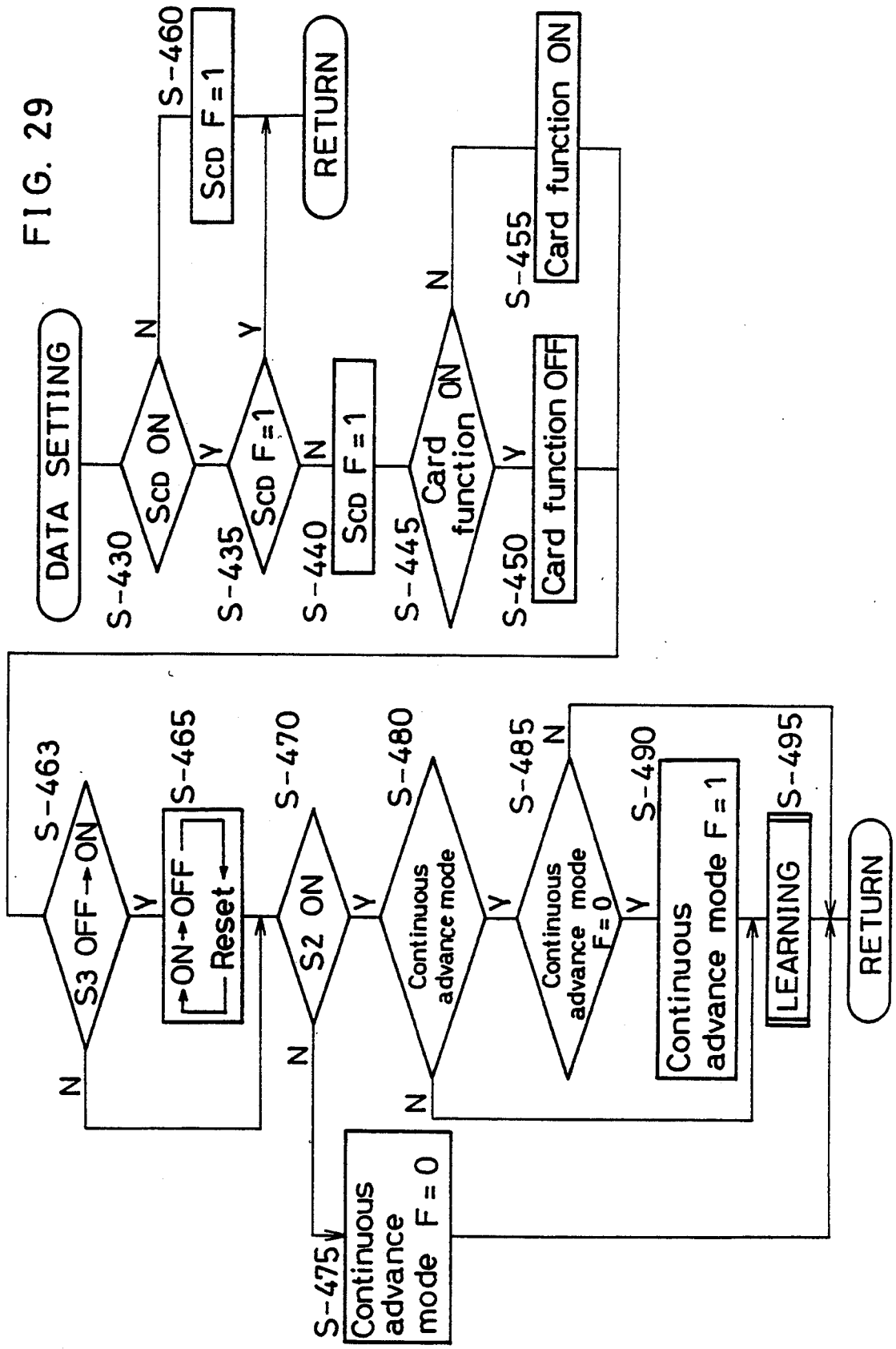

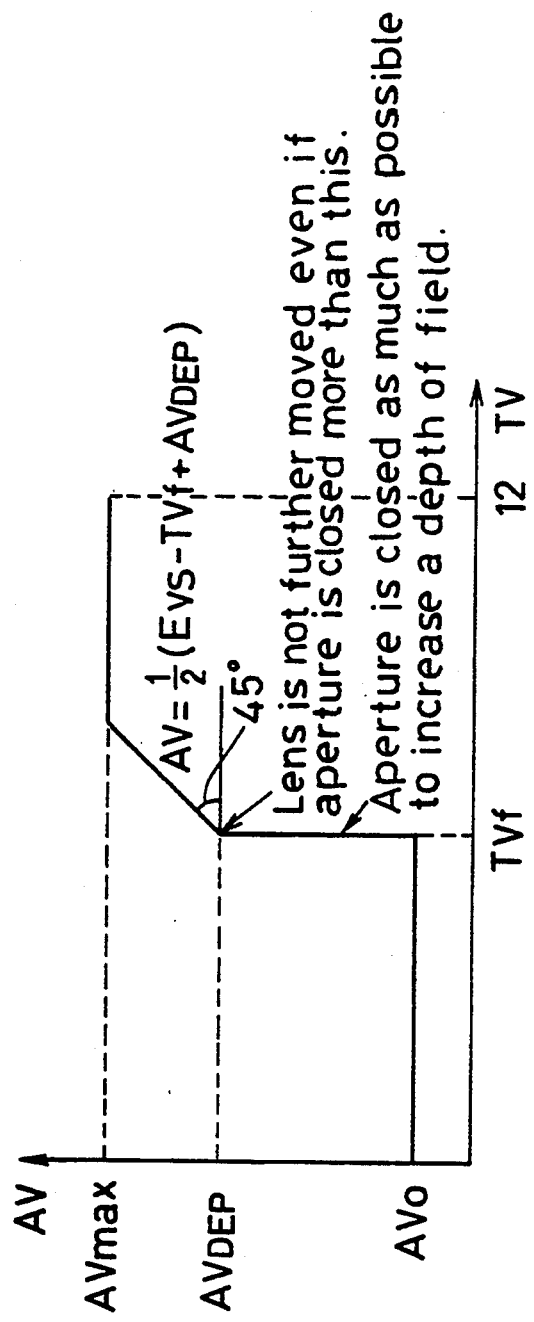

CAMERA HAVING LEARNING FUNCTION

This application is a divisional of application Ser. No. 07/797,960, filed Nov. 26, 1991, now U.S. Pat. No. 5,285,231.

BACKGROUND OF THE INVENTION

1. Field of the Invention

The present invention relates to a camera where a taking condition is automatically set.

2. Description of the Prior Art

A large number of cameras have conventionally been proposed where a taking condition is automatically set based on a predetermined data.

However, when a taking condition automatically set by the camera does not suite a user's intention, the user has to manually re-set it. Furthermore, since a user's intention does not change so frequently, the user has to reset the taking condition every time it is automatically set.

As described above, when taking condition automatically set by the camera does not suite a user's intention, an advantage to be expected from the automatization cannot be obtained.

SUMMARY OF THE INVENTION

An object of the present invention is to provide a camera where a taking condition which suites a user's intention is automatically set by automatically changing a data for automatic setting according to a value manually set by the user ( which is called learning).

According to one feature of the present invention, a camera comprises: a taking lens whose focal length is variable; storing means where a data representing a relation between a subject distance and a focal length is previously stored; distance measuring means for measuring a subject distance; automatic zooming means for determining a focal length of said taking lens based on a subject distance measured by said distance measuring means and the data stored in said storing means; manual zooming means for determining a focal length of said taking lens according to a manual operation; and changing means for changing a content of the data stored by said storing means based on a focal length determined by said manual zooming means and a subject distance measured by said distance measuring means.

According to another feature of the present invention, a camera comprises: storing means where a data showing a
image is size of a subject image against a taking plane previously stored; distance measuring means for measuring a subject distance; automatic setting means for determining a size of a subject image against a taking image plane based on a subject distance measured by said distance measuring means and the data stored in said storing means; manual setting means for determining a size of a subject image against a taking image plane according to a manual operation; and changing means for changing a content of the data stored in said storing means based on a size of a subject image against a taking image plane determined by said manual setting means.

According to another feature of the present invention, a camera comprises: storing means where an automatic control data is stored; automatic setting means for determining an automatic control value based on said automatic control data; manual setting means for determining a manual control value according to a manual operation; changing means for changing the automatic control data stored in said storing means according to said manual control value; and change inhibiting means for inhibiting an operation of said changing means when said manual control value does not fulfill a predetermined condition.

According to another feature of the present invention, a camera comprises: storing means where an automatic control data is stored; automatic setting means for determining an automatic control value based on said automatic control data; manual setting means for determining a manual control value according to a manual operation; changing means for changing the automatic control data stored in said storing means according to said manual control value based on one of plural algorithms; and selecting means for selecting an algorithm among said plural algorithms.

According to another feature of the present invention, a camera comprises: storing means where an automatic control data is stored; automatic setting means for determining an automatic control value based on said automatic control data; manual setting means for determining a manual control value according to a manual operation; changing means for changing the automatic control data stored in said storing means, according to said manual control value, in response to an exposure control operation; mode selecting means for selecting a mode between a single-frame advance mode where an exposure control operation is performed only once and a continuous advance mode where an exposure control operation is repeated; and control means for causing said changing means to operate only once while an exposure control operation is being repeated in said continuous advance mode.

According to another feature of the present invention, a camera comprises: storing means where an automatic control data is stored; automatic setting means for determining an automatic control value based on said automatic control data; manual setting means for determining a manual control value according to a manual operation; detecting means for detecting whether a taking image plane is longer in a vertical direction or in a horizontal direction; and changing means for changing the automatic control data stored in said storing means according to a detection result of said detecting means and said manual control value.

According to another feature of the present invention, a camera comprises: storing means where an automatic control data is stored; automatic setting means for determining an automatic control value based on said automatic control data; manual setting means for determining a manual control value according to a manual operation; changing means for changing the automatic control data stored in said storing means according to the automatic control data stored in said storing means and said manual control value; and reset means for changing said automatic control data to a predetermined initial data.

According to another feature of the present invention, a camera comprises: storing means where an automatic control data is stored; automatic setting means for determining an automatic control value based on said automatic control data; manual setting means for determining a manual control value according to a manual operation; changing means for changing the automatic control data stored in said storing means according to a plurality of said manual control values determined by a plurality of preceding manual settings; and reset means for changing said automatic control data to a predetermined initial data.

According to another feature of the present invention, a camera comprises: storing means where an automatic control data is stored; automatic setting means for determining an automatic control value based on said automatic control data; manual setting means for determining a manual control value according to a manual operation; determining means for determining whether or not a changing operation can be performed where the automatic control data stored in said storing means is changed according to said manual control value; and selecting means for selecting between a mode where said changing operation is performed and a mode where said changing operation is not performed when said determining means determines that said changing operation can be performed.

According to another feature of the present invention, a camera comprises: storing means where an automatic control data is stored; automatic setting means for determining an automatic control value based on said automatic control data; manual setting means for determining a manual control value according to a manual operation; changing means for changing the automatic control data stored in said storing means according to said manual control value; changing-over means for changing over between a first mode where an operation of said changing means is inhibited and a second mode where it is not inhibited; and control means for controlling said changing-over means so that a mode is forcibly changed over to said second mode in response to an attachment of a battery.

According to another feature of the present invention, a camera comprises: a taking lens whose focal length is variable; storing means where a plurality of relations between a subject distance and a focal length are previously stored; distance measuring means for measuring a subject distance; selecting means for selecting a relation among said plurality of relations; automatic zooming means for determining a focal length of said taking lens based on a subject distance measured by said distance measuring means and the relation selected by said selecting means; exposure control value outputting means for outputting an exposure control value; and calculating means for calculating an aperture value and a shutter speed which correspond to said exposure control value based on one of plural program lines showing a correspondence relation between an exposure control value and a combination of an aperture value and a shutter speed, wherein said selecting means is a means for selecting a program line among said plural program lines.

BRIEF DESCRIPTION OF THE DRAWINGS

This and other objects and features of this invention will become clear from the following description taken in conjunction with the preferred embodiments with reference to the accompanied drawings in which:

FIGS. 13A and 13B show a flow chart of a subroutine SION executed by the in-body microcomputer $\mu C1$;

FIG. 29 shows a flow chart of a subroutine DATA SETTING executed by the in-card microcomputer $\mu C3$ of Sports Card;

FIG. 42 shows an AE program line of Auto Depth Card;

DETAILED DESCRIPTION OF THE PREFERRED EMBODIMENT

As an embodiment of the present invention, a single-lens reflex camera system will hereinafter be described which has an interchangeable lens where a focal length can be changed by moving a lens through a motor.

Figure 1:
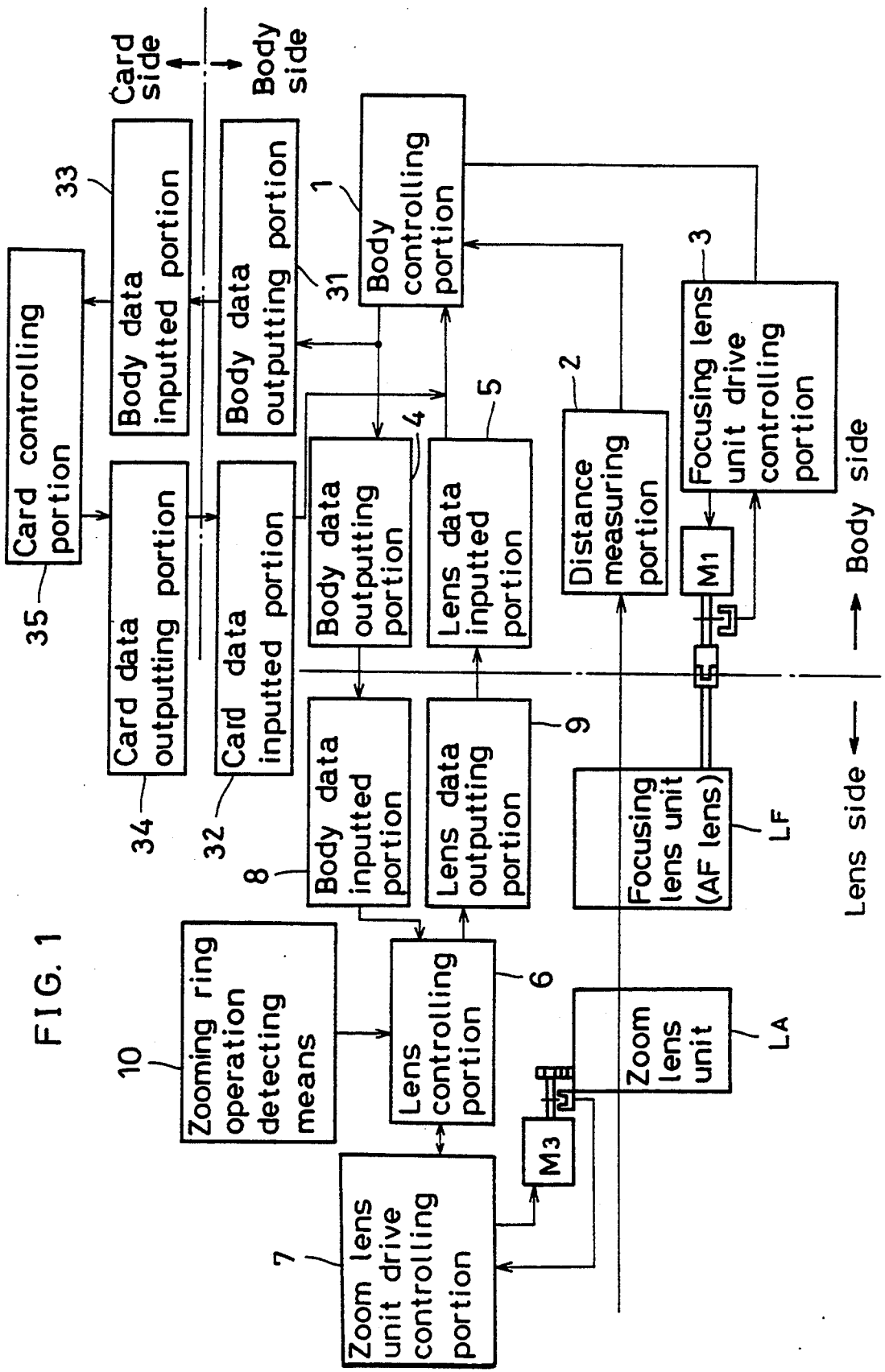
FIG. 1 is a schematic block diagram of a camera system where the present invention is incorporated.

FIG. 1 is a schematic block diagram of the camera system. As shown in the figure, the camera body has a function to automatically perform a focusing operation by inputting data from a distance measuring portion 2 into a body controlling portion 1 to calculate a lens movement amount and by moving a focusing lens unit $L_F$ (hereinafter referred to as AF lens) by activating a motor M1 with a focusing lens unit drive controlling portion 3, and a function to make the lens operate under control of the camera body by communicating with the lens through a body data outputting portion 4 and a lens data inputting portion 5. When an IC card is attached to the camera body, the body controlling portion 1 As provided with a function of the IC card. Various kinds of IC cards corresponding to various photographing genres such as "Sports Card", "Portrait Card", etc. are available. When an IC card is attached to the camera body, the body controlling portion 1 communicates with the card through a body data outputting portion 31 and a card data inputting portion 32. The card controlling portion 35 communicates with the camera body through a body data inputting portion 33 and a card data outputting portion 34, and calculates an aperture value, a shutter speed and a focal length of a zoom lens that are suitable for the photographing genre allocated to the IC card and transmits them to the camera body. As a result, the body controlling portion i can control the camera system, by using the control information, so that a photographing is performed under a condition suitable for each photographing genre.

On the other hand, the lens has a function to move a zoom lens unit $L_A$ to perform a zooming operation by activating a motor M3 (hereinafter referred to as "power zoom") with a zoom lens unit controlling portion 7 when an operation of a zooming ring is detected by a zooming ring operation detecting means 10, a function to output data of the lens to the camera body by communicating with the camera body through a body data inputting portion 8 and a lens data outputting portion 9, and a function to make the lens operate according to data from the camera body.

Next, appearances of the camera body and lens will be described.

Figure 2A:
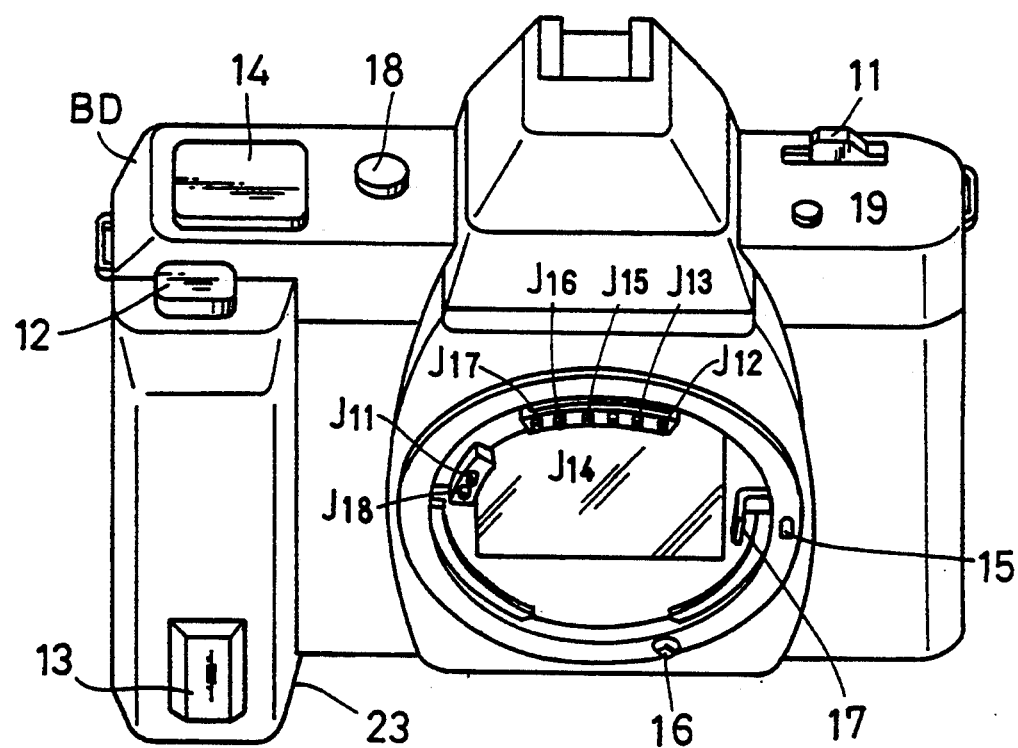
FIG. 2A shows a front appearance of a body of the camera system.
Figure 2B:
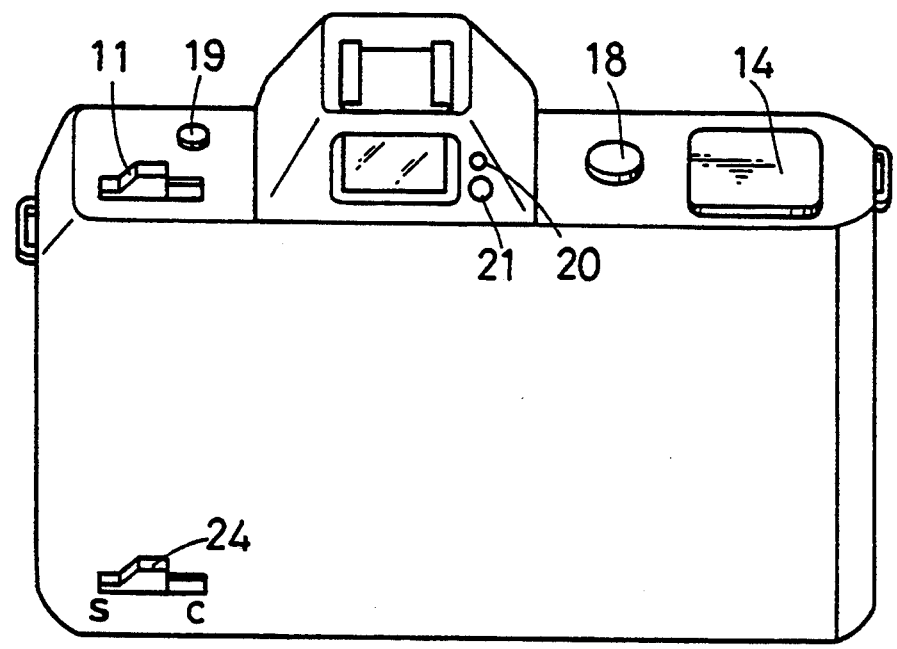
FIG. 2B is a rear appearance of the camera body.
Figure 2C:
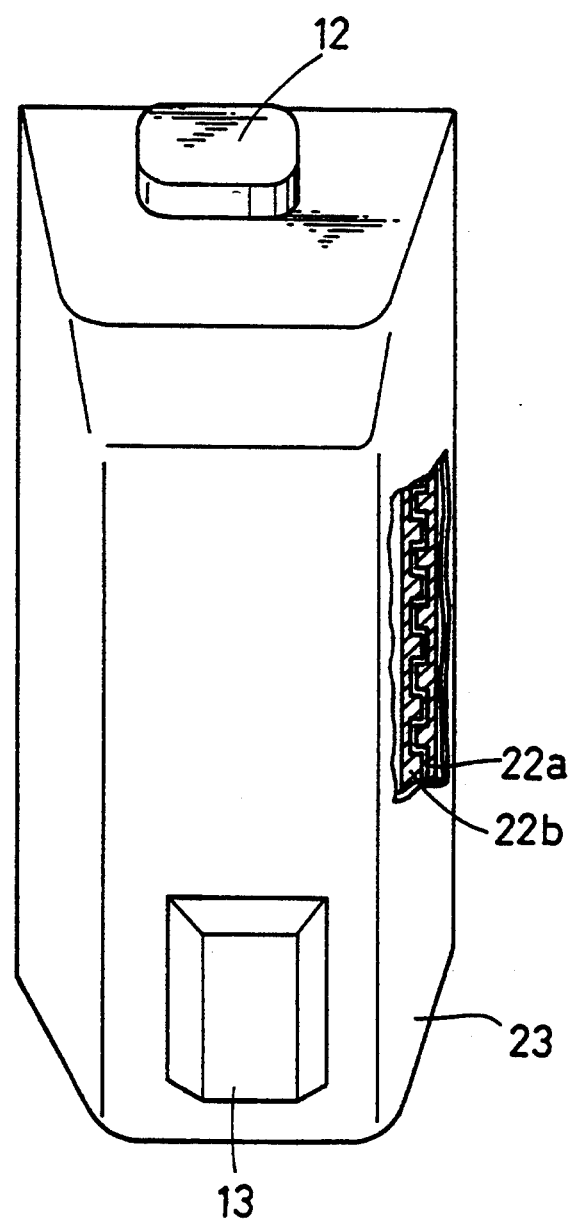
FIG. 2C is an enlarged view of a grip portion of the camera body.
Figure 2D:
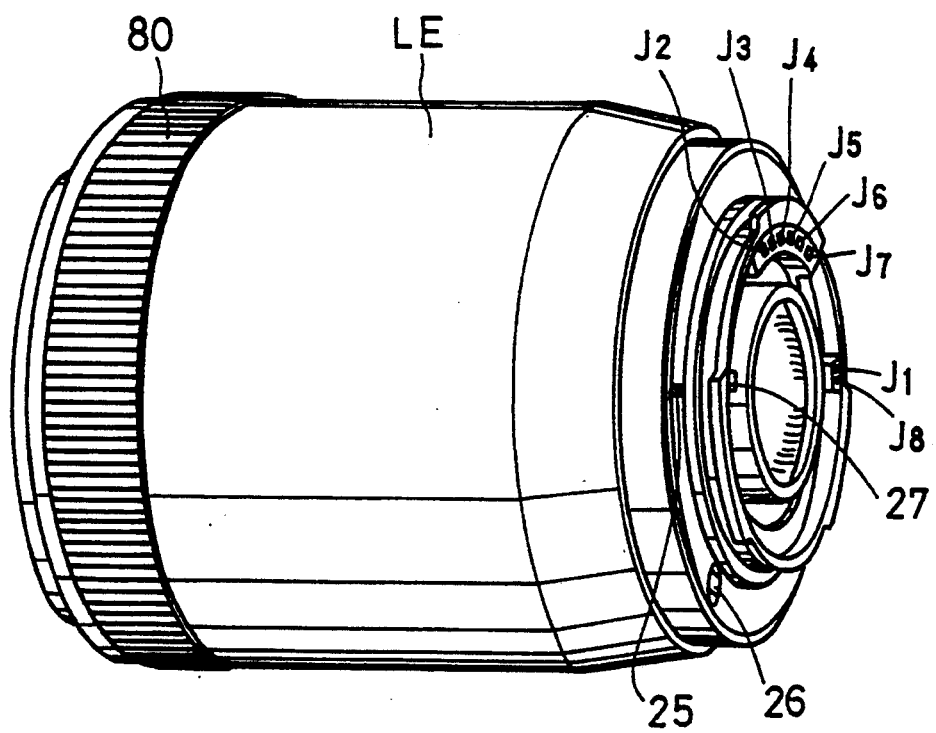
FIG. 2D shows an appearance of an interchangeable lens which is attached to the camera body.

FIG. 2A shows a front appearance of a camera body BD to which the present invention is applied. FIG. 2B shows a rear appearance of the camera body BD. FIG. 2C is an enlarged view of a grip portion of the camera body BD. FIG. 2D is an appearance of an interchangeable lens LE which is interchangeably attached to the camera body BD.

The name and function of each portion of the camera body BD will be described with reference to FIGS. 2A to 2D.

The numeral 11 is a slider for turning on/off a main switch $S_M$. The camera body BD is under an operable condition when the slider 11 is placed at its ON position. The camera body is under an inoperable condition when the slider 11 is placed at its OFF position.

The numeral 12 is a release button. When the release button is depressed halfway, a preparation switch S1 (to be described later with reference to FIG. 3) is turned on to start a photometry, exposure calculation and auto focusing (AF) operations, When the release button 12 is depressed all the way down, a release switch S2 (to be described later with reference to FIG. 3) is turned on to start an exposure control operation.

The numeral 13 is an inserting portion for IC cards. When an IC card in which a microcomputer is incorporated is inserted into the inserting portion 13, the camera body BD is provided with the function of the IC card.

The numeral 14 is a body display portion, where a shutter speed, an aperture value, information on an IC card, etc. are displayed.

The numeral 15 is a mount lock pin. When the interchangeable lens LE is attached to the camera body BD and is mount locked, a lens attachment switch $S_{LE}$ (to be described later with reference to FIG. 4) is OFF. Otherwise, the lens attachment switch $S_{LE}$ is ON.

The numeral 16 is an AF coupler, which is rotated in accordance with a rotation of an AF motor provided in the camera body BD.

The numeral 17 is a stop-down lever for closing an aperture of the interchangeable lens LE by stop-down steps obtained by the camera body BD.

The numeral 18 is a card key for switching between an ON and OFF of a function of an IC card.

The numeral 19 is a learning mode key for switching between an ON, OFF and resetting of a learning mode (to be described later).

The numeral 20 is an LED (light-emitting diode) which is a light emitting portion. The numeral 21 is an SPC (silicon photocell) which is a light receiving portion. The SPC 21 in corporation with the LED 20 senses whether or not the user is looking into a finder (this sensing is hereinafter referred to as finder sensing).

The numeral 24 is a slider for changing over a mode between a single-frame advance mode and a continuous advance mode. The single-frame advance mode is set when the slider 24 is placed at S position, and the continuous advance mode is set when the slider 24 is placed at C position. The single-frame advance mode is a normal mode where a photographing operation is performed only once when the release button 12 is depressed all the way down. The continuous mode is a mode where a photographing operation is continuously performed at a predetermined film winding speed while the release button 12 is being depressed all the way down.

An exterior 23 of the grip portion shown in FIG. 2C is made of elastic rubber. Conductive patterns 22a and 22b insulated against each other are provided inside the grip portion. Conductive rubber (not shown) is arranged between the above-mentioned rubber and the conductive patterns 22a and 22b. The conductive patterns 22a and 22b are electrically connected through the conductive rubber by gripping the exterior 23 of the grip portion, whereby the grip portion functions as a switch (hereinafter referred to as grip switch).

Next, the name and function of each portion of the interchangeable lens LE will be described.

The numeral 25 is a mount lock slot. The numeral 26 is an AF coupler. The numeral 27 is a stop-down lever. When the interchangeable lens LE is attached to the camera body BD, the mount lock pin 15 of the camera body BD is engaged with the mount lock slot 25 of the interchangeable lens LE and a convex portion of the AF coupler 16 of the camera body BD engages with a concave portion of the AF coupler 26 of the interchangeable lens LE, so that a rotation of the AF motor of the camera body BD is transmitted to the interchangeable lens LE through the AF couplers 16 and 26 to move the AF lens for focusing. Further, terminals $J_1$ to $J_8$ of the interchangeable lens LE are connected to terminals $J_{11}$ to $J_{18}$ of the camera body. Moreover, the stop-down lever 17 of the camera body BD engages with the stop-down lever 27 of the interchangeable lens LE, so that the stop-down lever 27 of the interchangeable lens LE moves, following the stop-down lever 17 of the camera body BD, by a movement amount of the stop-down lever 17 of the camera body BD to control an aperture value so as to be a value corresponding to the movement amount of the stop-down levers 17 and 27.

The numeral 80 is a zooming ring, which is rotated to specify a direction and speed for power zooming. By rotating the zooming ring 80, the M3 provided in zoom motor the interchangeable lens LE is activated to change a focal length in the telephoto or the wide-angle direction.

Next, a circuit arrangement of the camera system will be described.

Figure 3:
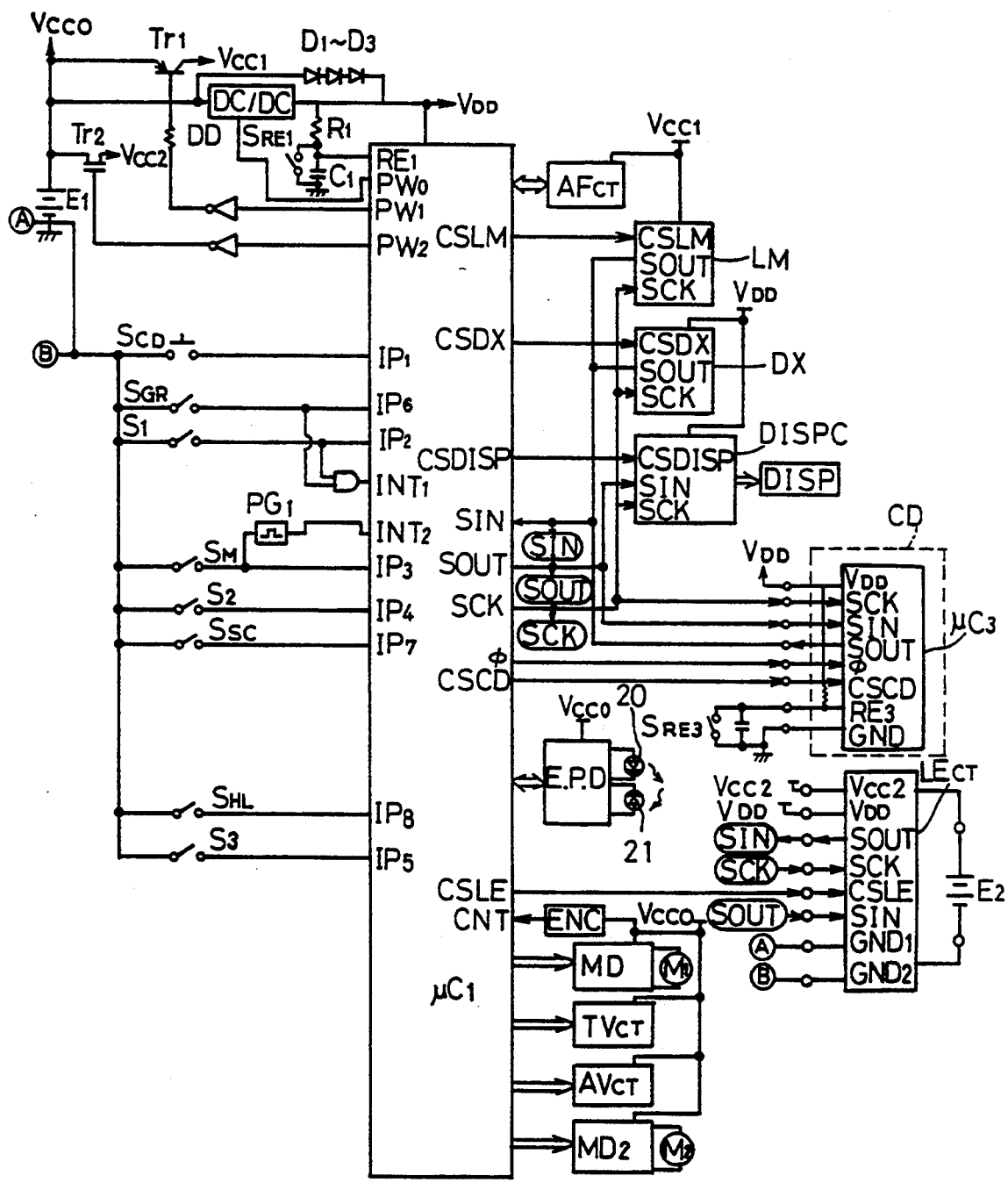
FIG. 3 is a circuit diagram of an in-body circuit incorporated in the camera body.

FIG. 3 is a circuit diagram of an in-body circuit incorporated in the camera body BD. Firstly, the in-body circuit will be described with reference to the figure.

$\mu C1$ is an in-body microcomputer $\mu C1$ for controlling the camera various entire system and for performing calculations.

$AF_{CT}$ is a focus detection light receiving circuit, which is provided with a CCD (charge coupled device) which serves as an accumulation-type focusing optical sensor for accumulating optical charge for a predetermined period of time, a drive circuit for the CCD and a circuit for processing and A/D (analog to digital)-converting an output of the CCD and providing it (data dump) to the in-body microcomputer $\mu C1$. The focus detection light receiving circuit $AF_{CT}$ is connected to the in-body microcomputer $\mu C1$ through a data bus. Information on a defocus amount of a subject located in a distance measurement area is obtained by the focus detection light receiving circuit $AF_{CT}$.

LM is a photometry circuit provided on an optical path of the finder. The photometry value is A/D-converted and supplied to the in-body microcomputer $\mu C1$ as luminance information.

DX is a film sensitivity reading circuit, provided in a film holder, for reading data on a film sensitivity and for serially outputting them to the in-body microcomputer $\mu C1$.

DISPC is a display circuit for inputting display data and a display control signal from the in-body microcomputer $\mu C1$ to make a display portion DISP (the display portion 14 shown in FIGS. 2A and 2B) provided on the upper surface of the camera body BD display predetermined data.

CD is an IC card to be inserted into the card inserting portion 13. A microcomputer (hereinafter referred to as in-card microcomputer $\mu C3$) is incorporated in the IC card. The IC card CD will be described later in detail.

EPD is a finder sensing circuit for sensing that the photographer is looking into the finder.

$LE_{CT}$ is an in-lens circuit incorporated in the interchangeable lens LE (hereinafter referred to as lens) for providing information particular to the lens LE to the in-body microcomputer $\mu C1$. The in-lens circuit will be described later in detail.

M1 is an AF motor for driving the AF lens of the lens LE through the AF couplers 16 and 26.

MD1 is a motor drive circuit for driving the AF motor M1 based on the focus detection information. Its rotation direction and stopping are controlled by a command of the in-body microcomputer $\mu C1$.

ENC is an encoder for monitoring a rotation of the AF motor M1. The encoder ENC outputs pulses into a counter input terminal CNT of the in-body microcomputer $\mu$C1 every predetermined angle of rotation. The in-body microcomputer $\mu$C1 counts the pulses, detects a movement amount of the AF lens from the infinity position to the present position, and calculates an object distance (subject distance) of a subject based on the detected movement amount (movement pulse count CT).

TV$_{CT}$ is a shutter controlling circuit for controlling a shutter based on a control signal from the in-body microcomputer $\mu$C1.

AV$_{CT}$ is an aperture controlling circuit for controlling an aperture based on a control signal from the in-body microcomputer $\mu$C1.

M2 is a motor for winding up and rewinding film and for charging an exposure controlling mechanism. MD2 is a motor drive circuit for driving the motor M2 based on a command of the in-body microcomputer $\mu$C1.

Next, portions relating to power source will be described.

E1 is a battery which supplies power to the camera body BD.

Tr1 is a first power-supply transistor for supplying power to some of the above-described circuits. Tr2 is a second power-supply transistor for supplying power for driving the zoom motor M3 of the lens LE. The power-supply transistor Tr2 is of MOS (metal oxide semiconductor) structure.

DD is a DC/DC (direct current to direct current) converter for stabilizing a voltage V$_{DD}$ to be supplied to the in-body microcomputer $\mu$C1. The DC/DC converter DD operates when the level of a power controlling terminal PWO is high. The voltage V$_{DD}$ is an operation power voltage for the in-body microcomputer $\mu$C1, the in-lens circuit LE$_{CT}$, the in-card microcomputer $\mu$C3, the film sensitivity reading circuit DX and the display controlling circuit DISPC. A voltage V$_{CC1}$ is an operation power voltage for the focus detection light receiving circuit AF$_{CT}$ and the photometry circuit LM, and is supplied from the battery E1 through the power-supply transistor Tr1 under control of a signal outputted from a power controlling terminal PW1. A voltage V$_{CC2}$ is an operation power voltage for the zoom motor M3 of the lens LE, and is supplied from the battery E1 through the power-supply transistor Tr2 under control of a signal outputted from a power controlling terminal PW2. A voltage V$_{CC0}$ is an operation power voltage for the finder sensing circuit EPD, the motor drive circuit MD1, the shutter controlling circuit TV$_{CT}$, the aperture controlling circuit AV$_{CT}$ and the motor drive circuit MD2, and is supplied directly from the battery E1.

D1 to D3 are diodes for supplying a voltage lower than the voltage V$_{DD}$ to the in-body microcomputer $\mu$C1 in order to reduce power consumption while the DC/DC converter DD is being stopped. This low voltage is set to a lowest power voltage at which the in-body microcomputer $\mu$C1 can operate. Only the in-body microcomputer $\mu$C1 is operable while the DC/DC converter DD is being stopped.

GND1 is a ground line for a smaller-power-consumption portion. The ground line is connected through the terminals J$_{17}$ and J$_7$ between the lens LE and camera body BD. Although different ground lines are required for an analog portion and a digital portion of the camera body BD, the ground line GND1 is shown by a single line in the figures for easier explanation.

GND2 is a ground line for a Earlier-power-consumption portion. The GND2 is connected through the terminals and J$_8$ between the lens LE and the camera body BD.

Next, switches will be described.

S$_{CD}$ is a normally-open push switch for switching between an ON and OFF of a function of the IC card CD when the IC card CD is attached to the camera body BD. The switch S$_{CD}$ is turned on when the card key 18 is depressed.

S$_{GR}$ is a grip switch which is turned on when the grip portion is gripped.

S1 is a preparation switch which is turned on when the release button 12 is depressed halfway. When the switch or the above-described grip switch S$_{GR}$ is turned on, an interrupt signal is inputted into an interrupt terminal INT1 of the in-body microcomputer $\mu$C1 to start operations required for photographing such as a photometry, a distance measurement, an AF (automatic focusing) operation, etc.

S$_M$ is a main switch which is turned on when the slider 11 for making the camera operable is at the ON position and is turned off when the slider 11 is at the OFF position.

PG1 is a pulse generator for outputting a pulse whose level is low every time the switch S$_M$ is turned from on to off or from off to on. The output of the pulse generator PG1 is inputted into an interrupt terminal INT2 of the in-body microcomputer C1 as an interrupt signal.

S2 is a release switch which is turned on when the release button 12 is depressed all the way down. When the switch S2 is turned on, a photographing operation is performed.

S$_{SC}$ is a switch for changing over a mode between the single-frame advance mode and the continuous advance mode according to a position of the slider 24. When the switch S$_{SC}$ is turned on (that is, the slider 24 is placed at S position), the single-frame advance mode is set. When the switch S$_{SC}$ is turned off (that is, the slider 24 is placed at C position), the continuous advance mode is set.

S3 is a normally-open learning mode switch for switching between an ON, OFF and resetting of the learning mode.

S$_{HL}$ is a switch for sensing whether the camera is held longitudinally or horizontally. The switch S$_{HL}$ is turned on when the camera is horizontally held. It is turned off when the camera is longitudinally held.

S$_{RE1}$ is a battery attachment detecting switch which is turned off when the battery E1 is attached to the camera body BD. When the battery E1 is attached to the camera body BD and the battery attachment switch S$_{RE1}$ is turned off, a condenser C1 is charged through a resistance R1 to change the level of a reset terminal RE1 of the in-body microcomputer $\mu$C1 from low to high. Thereby, the in-body microcomputer $\mu$C1 executes a routine RESET to be described later.

S$_{RE3}$ is a card attachment detecting switch which is turned off when the IC card CD is attached. When the IC card CD is attached and the switch S$_{RE3}$ is turned off, the level of a reset terminal RE3 of the in-card microcomputer $\mu$C3 is changed from low to high to reset the in-card microcomputer $\mu$C3.

Next, portions relating to a serial data communication will be described.

The photometry circuit LM, the film sensitivity reading circuit DX, the display circuit DISPC and the in-card microcomputer $\mu$C3 perform a serial data communication with the in-body microcomputer µC1 through signal lines of a serial input SIN, a serial output SOUT and a serial clock SCK, respectively. The partner of the serial communication with the in-body microcomputer µC1 is selected by chipselect terminals CSLM, CSDX, CSDISP and CSCD. When the level of the terminal CSLM is low, the photometry circuit LM is selected. When the level of the terminal CSDX is low, the film sensitivity reading circuit DX is selected. When the level of the terminal CSDISP is low, the display circuit DISPC is selected. When the level of the terminal CSCD is low, the in-card microcomputer µC3 is selected. The three signal lines SIN, SOUT and SCK for the serial communication are connected to the in-lens circuit $LE_{CT}$ through the terminals $J_{15}$ and $J_5$; $J_{14}$ and $J_4$; and $J_{16}$ and $J_6$, respectively. When the in-lens circuit $LE_{CT}$ is selected as the partner of the communication, the level of a terminal CSLE is set to low. The signal of the low level is transmitted to the in-lens circuit $LE_{CT}$ through the terminals $J_3$ and $J_{13}$.

Next, the in-lens circuit $LE_{CT}$ will be described with reference to FIG. 4.

Figure 4:
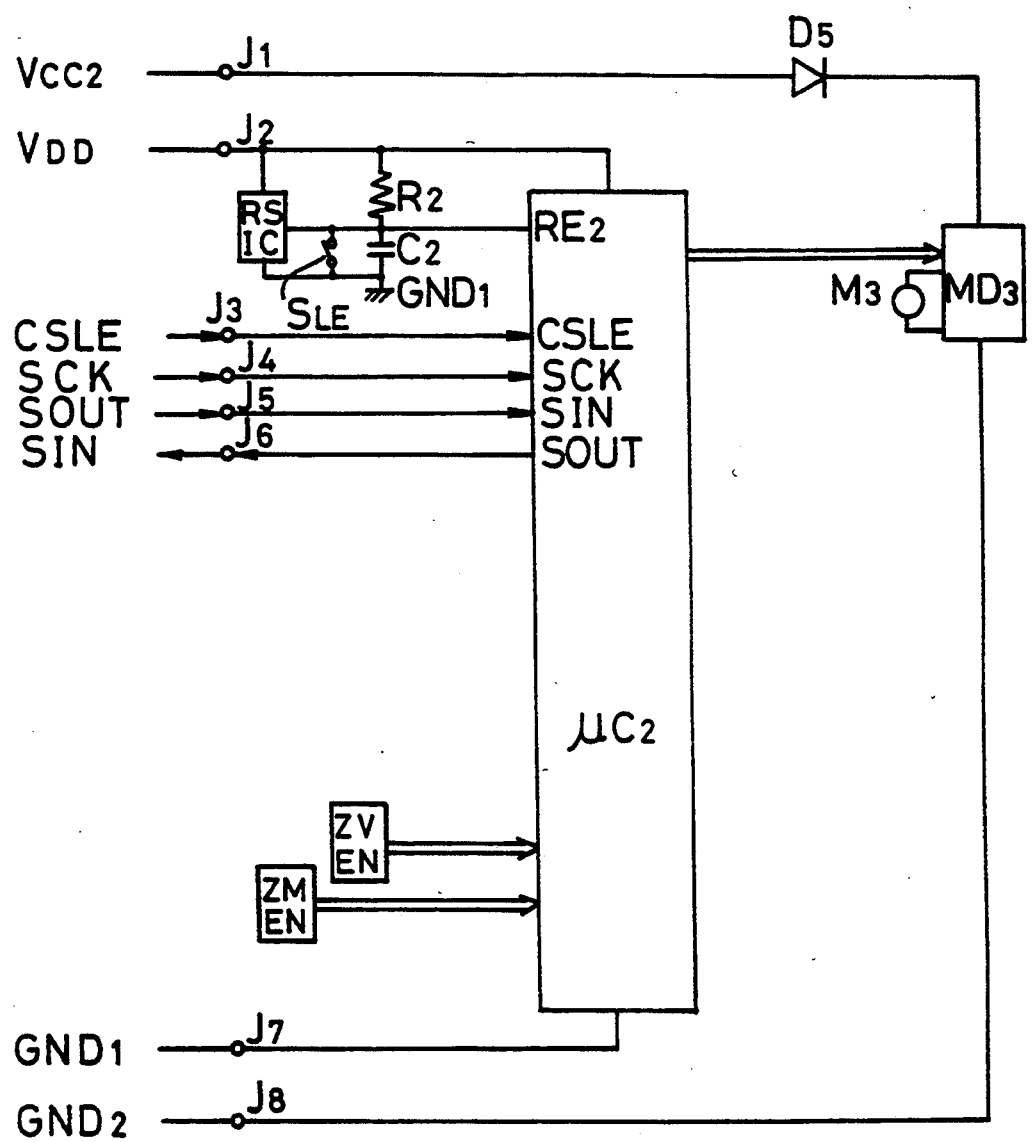
FIG. 4 is a circuit diagram of an in-lens circuit incorporated in the interchangeable lens.

FIG. 4 is a circuit diagram of the in-lens circuit $LE_{CT}$ incorporated in the interchangeable lens LE. In the figure, µC2 is an in-lens microcomputer µC2 having functions such as for controlling the zoom motor M3 provided in the interchangeable lens LE, for executing a data communication with the camera body BD and for setting a mode.

Now, the terminals $J_1$ and $J_8$ which are connected to the camera body BD will be described. $J_1$ is a power terminal for supplying a power voltage $V_{CC2}$ for driving the zoom motor M3 from the camera body BD to the lens LE. $J_2$ is a power terminal for supplying the voltage VDD for other than driving the zoom motor M3 from the camera body BD to the lens LE. $J_3$ is a terminal for inputting and outputting a signal representing a request of the data communication. $J_4$ is a clock terminal for inputting a clock for the data communication from the camera body BD. $J_5$ is a serial input terminal for inputting data from the camera body BD. $J_6$ is a serial output terminal for outputting data to the camera body BD. $J_7$ is a ground terminal for the circuits other than the motor drive circuits. $J_8$ is a ground terminal for the motor drive circuit.

RSIC is a reset IC for resetting the in-lens microcomputer µC2 when the voltage VDD supplied from the camera body BD is lower than the normal operation voltage of the in-lens microcomputer µC2. R2 and C2 are a reset resistor and a reset condenser for resetting the in-lens microcomputer µC2.

RE2 is a reset terminal of the in-lens microcomputer µC2. When the voltage $V_{DD}$ for activating the in-lens circuit is supplied from the camera body BD to the in-lens microcomputer µ2, and the level of the terminal RE is changed from low to high through the resistor R2 and condenser C2, the in-lens microcomputer µC2 executes a reset operation.

ZVEN is a zoom speed encoder which interlocks with the zooming ring 80. The zoom speed encoder ZVEN sets a speed and direction for power zooming in a power zooming operation.

ZMEN is a zoom encoder for showing an absolute position of the zooming ring 80.

M3 is a zoom motor for driving a zoom lens unit (zooming ring 80). The movement of the zoom lens unit by the zoom motor M3 can change a focal length without changing a position of an image point.

MD3 is a motor drive circuit for driving the zoom motor M3. The motor drive circuit MD3 controls the rotation of the zoom motor M3 according to a control signal representing a motor drive direction and speed provided from the in-lens microcomputer µC2. It also performs a short-circuiting between both terminals of the zoom motor M3 and stops applying a voltage to the zoom motor M3 according to a motor stop signal and a motor halt signal provided form the in-lens microcomputer µC2.

D5 is a diode for preventing a reverse flow of a current. The diode D5 prevents a reverse flow of a current from one electric power source to the other electric power source as well as supplies to the motor drive circuit MD3 the power voltage $V_{CC2}$ for driving the zoom motor M3 which is supplied from the camera body BD to the lens LE.

Next, switches will be described.

$S_{LE}$ is a lens is attachment detecting switch which turned off when the interchangeable lens LE is attached to the camera body BD and is mount locked. When the interchangeable lens LE is detached from the camera body BD, the switch $S_{LE}$ is is turned on so that the condenser C2 short-circuited between both terminals. Thereby, the electric charge which is accumulated in the condenser C2 is discharged to change the level of the terminal RE2 of the in-lens microcomputer µC2 to low. Thereafter, when the interchangeable lens LE is attached to the camera body BD, the switch $S_{LE}$ is turned off so that the condenser C2 is charged through the power line $V_{DD}$. Then, after a period of time predetermined by the resistor R2 and the condenser C2, the level of the terminal RE2 is changed to high so that the in-lens microcomputer µC2 executes a reset operation as described above.

Finishing a description of the hardware of the present embodiment, the software will hereinafter be described.

Firstly, the software of the in-body microcomputer µC1 will be described.

When the battery E1 is attached to the camera body BD, in the in-body circuit shown in FIG. 3, the battery attachment detecting switch $S_{RE1}$ is turned off, the reset condenser C1 is charged through the resistor R1, and thereby, a reset signal whose level changes from low to high is inputted to the reset terminal RE1 of the in-body microcomputer µC1 which controls the entire camera system. In response to the input of the reset signal, the in-body microcomputer µC1 activates the DC/DC converter DD as well as starts to generate a clock by use of the incorporated hardware. Then, supplied with the voltage VDD at which the in-body microcomputer µC1 is operable, the in-body microcomputer µC1 executes a routine RESET shown in FIG. 5. Under a sleep condition (or halt condition) to be described later, the clock generation by the in-body microcomputer µC1 and the operation of the DC/DC converter DD are stopped. When an interrupt is applied to the in-body microcomputer µC1 in this condition, the in-body microcomputer µC1 starts the clock generation and activates the DC/DC converter DD by means of the inside hardware provided in the in-body microcomputer µC1 in the same manner as that when the battery E1 is attached.

Figure 5:
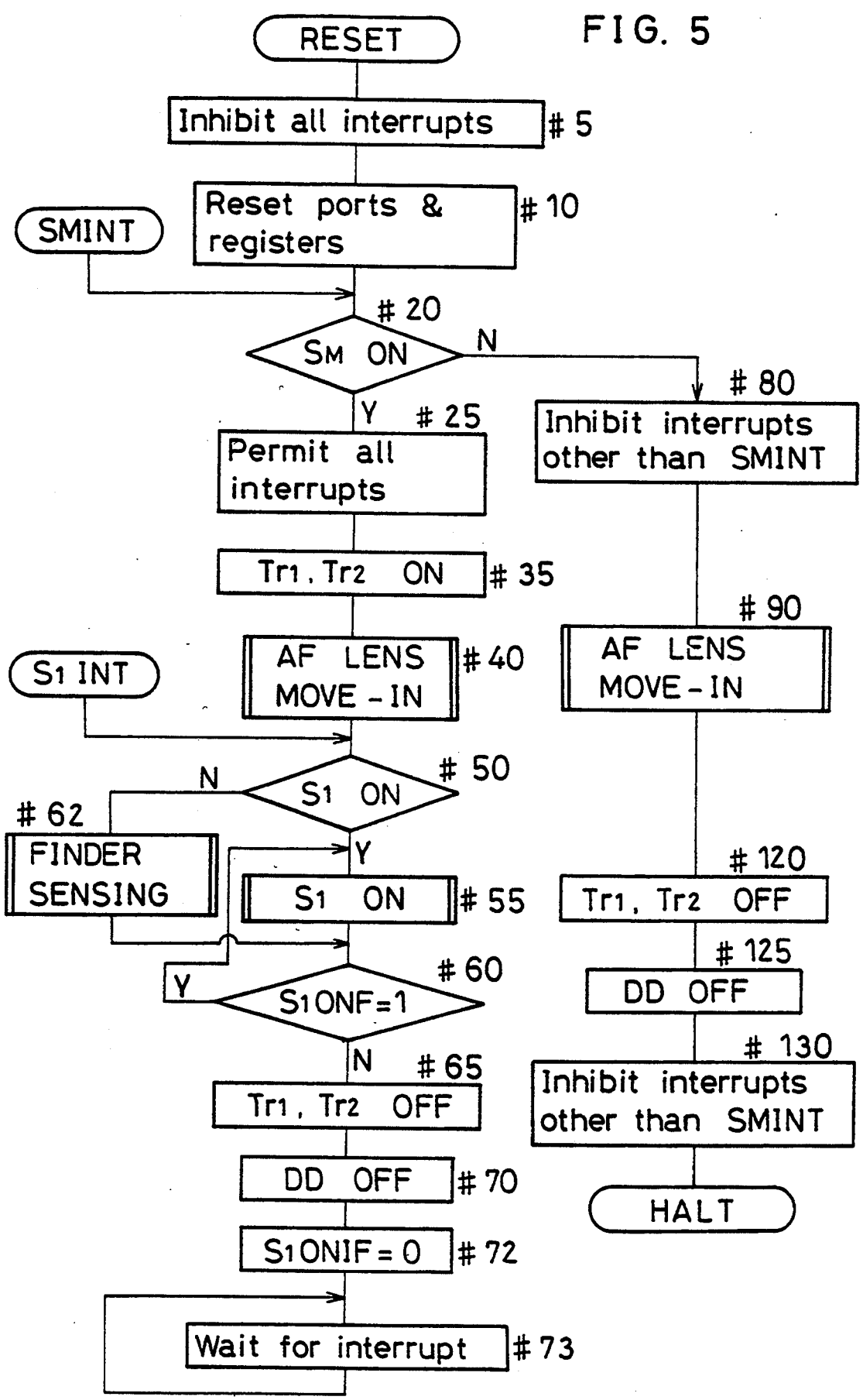
FIG. 5 shows a flow chart of a routine RESET executed by an in-body microcomputer $\mu C1$ of the camera system.

In the routine RESET shown in FIG. 5, firstly, all the interrupts are inhibited and various ports and registers are reset (steps #5 to #10). Then, whether or not the main switch $S_M$ is ON is determined at step #20. When the main switch $S_M$ is turned from on to off or from off to on, an interrupt SMINT is also generated by an operation of the main switch $S_M$ so that steps from #20 are executed. When it is determined that the main switch $S_M$ is ON at step #20, all the interrupts are permitted and the levels of the output ports PW1 and PW2 which are the power control terminals are respectively changed to high in order to activate the transistors Tr1 and Tr2 for supplying power to each circuit and the in-lens microcomputer $\mu$C2 (steps #25 to #35).

Figure 6:
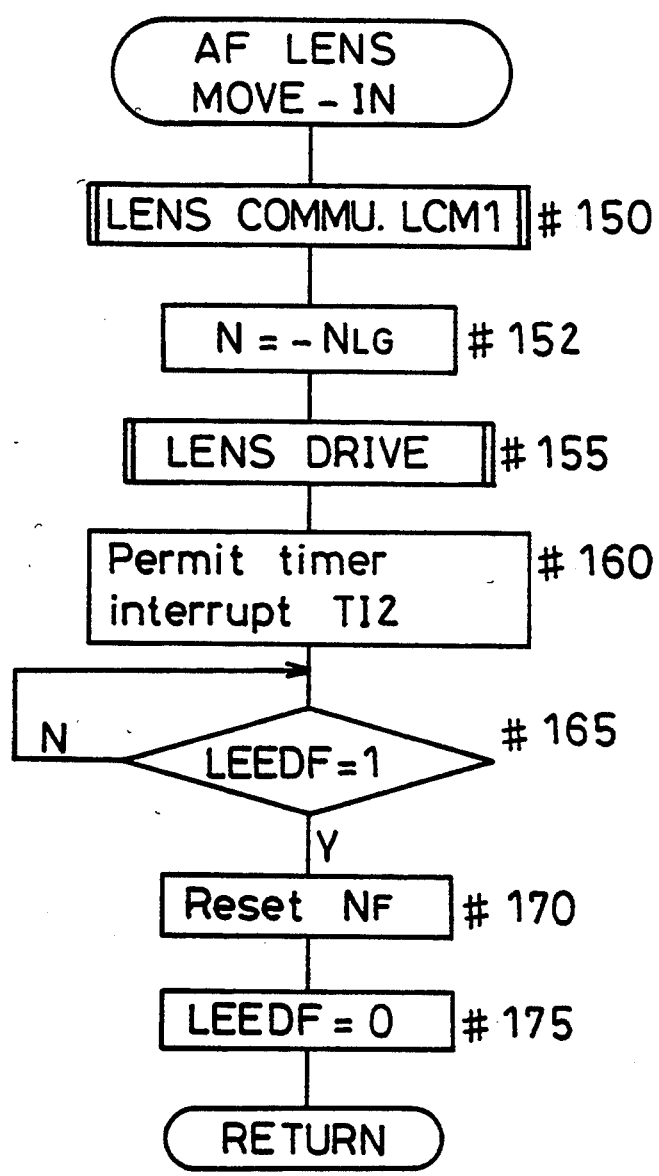
FIG. 6 shows a flow chart of a subroutine AF LENS MOVE-IN executed by the in-body microcomputer $\mu C1$.

Next, a subroutine AF LENS MOVE-IN is executed at step #40. This subroutine is shown in FIG. 6. When the subroutine is called, firstly, a subroutine LENS COMMUNICATION LCM1 is executed at step #150.

Figure 11:
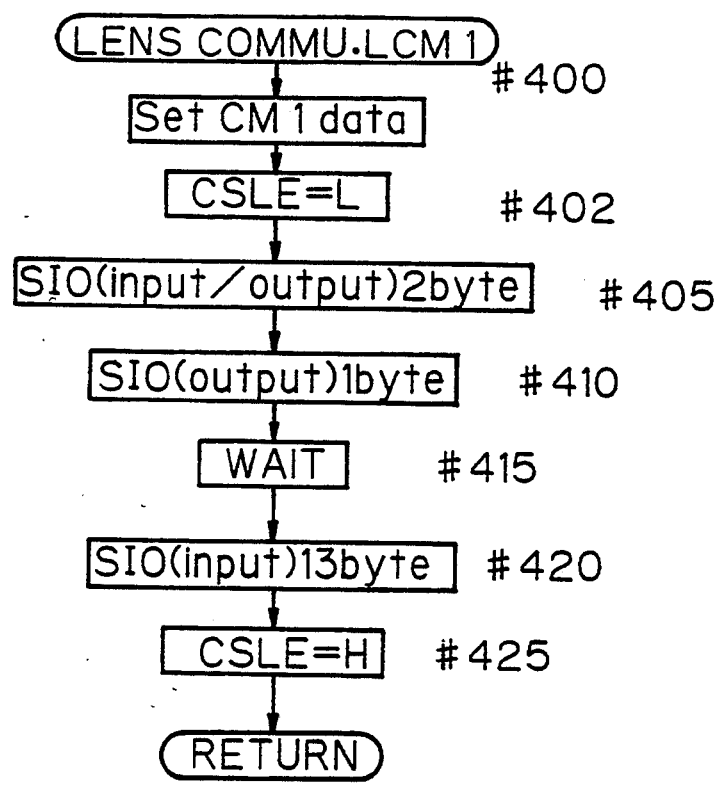
FIG. 11 shows a flow chart of a subroutine LENS COMMUNICATION LCM1 executed by the in-body microcomputer $\mu C1$.

The lens communication LCM1 is a communication in a communication mode CM1, which is one of various communications between the in-body microcomputer $\mu$C1 and the in-lens microcomputer $\mu$C2, where data from the in-lens microcomputer $\mu$C2 to be described in this embodiment are inputted. The subroutine LENS COMMUNICATION LCM1 is shown in FIG. 11. When the subroutine is called, firstly, data showing that the present communication mode is the communication mode CM1 are set, the level of the terminal CSLE is changed to low and the in-lens microcomputer $\mu$C2 is informed that a data communication will be performed (steps #400 and #402). Then, a two-byte serial communication (serial input/output) is performed at step #405. In the serial communication, the in-body microcomputer $\mu$C1 and the in-lens microcomputer $\mu$C2 simultaneously and serially input data transmitted from the other while serially outputting data to the other. At the first byte, the data showing the kind of the camera body BD are outputted from the in-body microcomputer $\mu$C1. At this time, the in-lens microcomputer $\mu$C2 outputs meaningless data $FF_H$ (the subscript H shows a hexadecimal number), and the in-lens microcomputer $\mu$C2 and the in-body microcomputer $\mu$C1 respectively input data transmitted from the other. At the second byte, data showing the kind of the lens LE are outputted from the in-lens microcomputer $\mu$C2. At this time, meaningless data $FF_H$ are outputted from the in-body microcomputer $\mu$C1, and the in-lens microcomputer $\mu$C2 and the in-body microcomputer $\mu$C1 respectively input data transmitted from the other. Then, the one-byte data showing the present communication mode are serially outputted to the in-lens microcomputer $\mu$C2 in order to show that mode of the communication with the in-lens microcomputer $\mu$C2 is the communication mode (step #410). After the process waits for a while, 13-byte data are inputted from the in-lens microcomputer $\mu$C2, the level of the terminal CSLE is changed to high, and the process returns (steps #415 to #425). It is in order to inform the in-lens microcomputer $\mu$C2 of the completion of the subroutine LENS COMMUNICATION LCM1 that the level of the terminal CSLE is changed to high before the process returns. The similar process is applied in the lens communications of the other modes.

Now, the detail of the data will be described which are transmitted between the in-body microcomputer $\mu$C1 and the in-lens microcomputer $\mu$C2 in this embodiment.

In this embodiment, communication of the communication mode CM1 and that of a communication mode CM2 are performed. These communications are called a lens communication LCM1 and a lens communication LCM2, respectively. In the lens communication LCM1, the in-lens microcomputer $\mu$C2 transmits data showing the following to the in-body microcomputer $\mu$C1 as data particular to the lens LE:

(i) an open aperture value $AV_o$;
(ii) a maximum aperture value $AV_{max}$;
(iii) a converting coefficient $K_L$ for converting a defocus amount into a drive amount (the converting coefficient $K_L$ will hereinafter be referred to as drive amount converting coefficient);
(iv) a present focal length $f_n$;
(v) a lens attachment signal $L_{ON}$;
(vi) a converting coefficient $K_N$ for converting a movement amount into a distance (the converting coefficient $K_N$ will hereinafter be referred to as distance converting coefficient);
(vii) a minimum focal length and $f_{min}$; and
(viii) a maximum focal length $f_{max}$.

Data showing a condition of the zoom switch (that is, whether or not the zooming ring has been operated) are also transmitted (the data will hereinafter be referred to as zoom switch data).

On the other hand, in the lens communication LCM2, the in-body microcomputer $\mu$C1 transmits the data showing the following to the in-lens microcomputer $\mu$C2:

(ix) a target focal length $f_c$; and
(x) an ON/OFF of an APZ, and whether or not a subroutine SION is executed for the first time (for the first time in a repetition of the subroutine SION).

The above data (i) to (x) are inputted and outputted as one-byte data.

Returning to the flow chart shown in FIG. 6, the description will be continued. When the process returns from the above-described subroutine LENS COMMUNICATION LCM1, the value of a counter N showing a drive amount of the AF lens for focusing is set to $-N_{LG}$ (a negative value having a large absolute value, and whether the first bit thereof is 0 or 1 indicates whether the value is positive or negative), and a subroutine LENS DRIVE for the AF lens is executed (steps #152 and #155).

Figure 21:
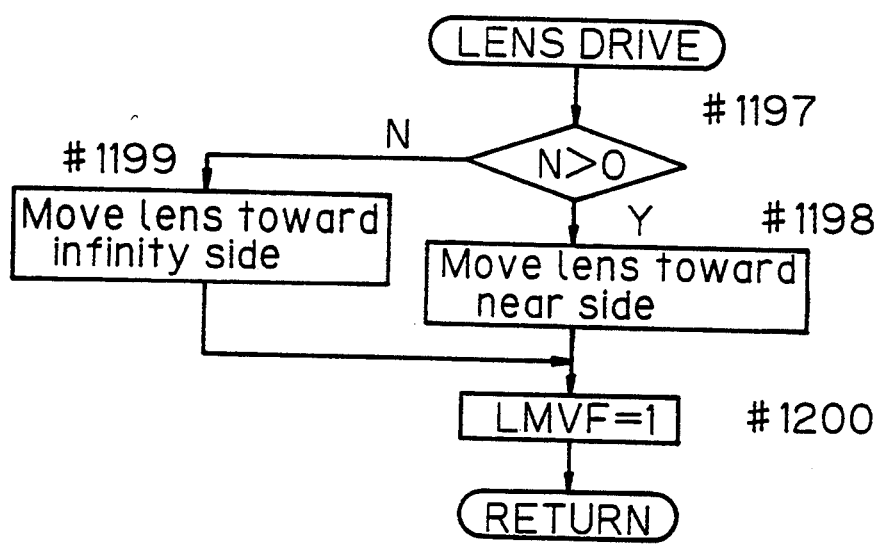
FIG. 21 shows a flow chart of a subroutine LENS DRIVE executed by the in-body microcomputer $\mu C1$.

The subroutine LENS DRIVE is shown in FIG. 21. When the subroutine is called, whether or not the sign of the lens drive amount N is positive (that is, whether or not the first bit is 1) is determined (step #1197). When it is positive, the lens drive direction is set to a move-out direction (step #1198), and when it is not positive, to a move-in direction (step #1199). Then, a signal representing the lens drive direction is outputted to the motor drive circuit MD1, a flag LMVF showing that the lens is being moved is set, and the process returns (step #1200).

In this embodiment, the driving of the AF lens is controlled by a counter interrupt CI2 and a timer interrupt TI2. The counter interrupt CI2 is generated when a pulse showing the driving of the AF lens is inputted from the encoder ENC (see FIG. 3). The timer interrupt TI2 is generated when the next counter interrupt CI2 is not executed within a fixed period of time after the first counter interrupt CI2 is executed. Then, it is detected by the timer interrupt TI2 that the lens has reached the endmost position (the infinity position or the nearest position). That is, when a value having a large absolute value is set as the drive amount N as at step #152 of FIG. 6, the lens always reaches the endmost position without stopping on the way, and it is detected by the timer interrupt TI2 which is generated thereafter that the lens has reached the endmost position.

Figure 7:
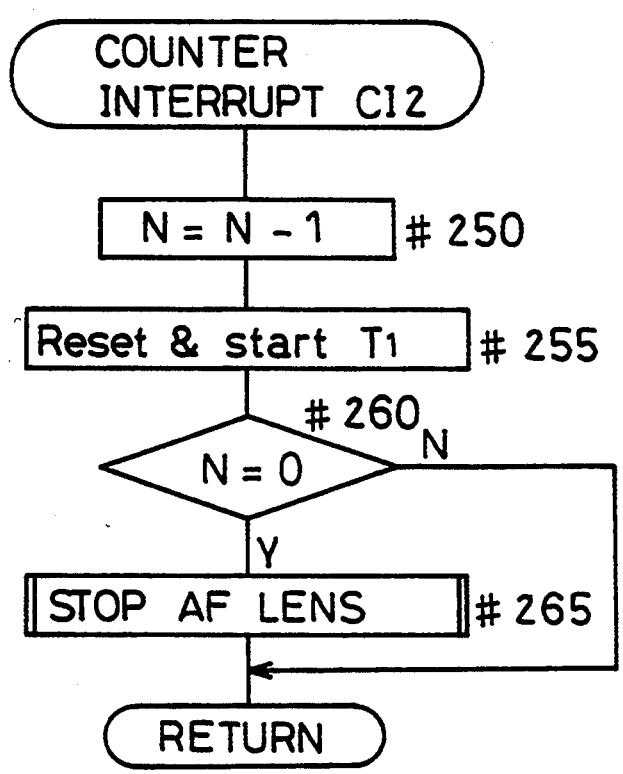
FIG. 7 shows a flow chart of a routine COUNTER INTERRUPT CI2 executed by the in-body microcomputer $\mu C1$.
Figure 8:
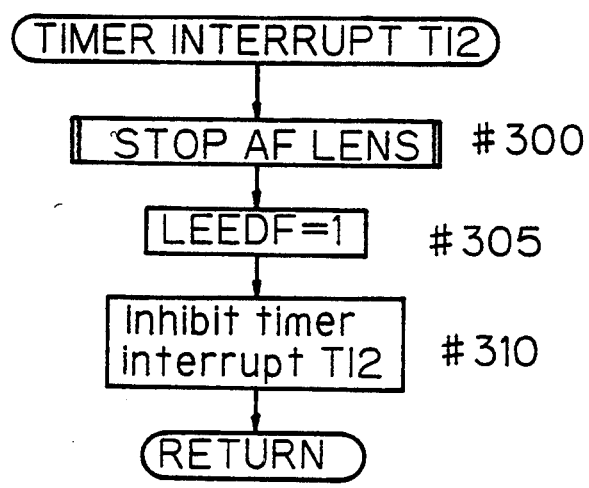
FIG. 8 shows a flow chart of a routine TIMER INTERRUPT TI2 executed by the in-body microcomputer $\mu C1$.

Routines COUNTER INTERRUPT CI2 and TIMER INTERRUPT TI2 are shown in FIGS. 7 and 8, respectively, and will be described with reference to the figures.

First, the routine COUNTER INTERRUPT will be described. The counter interrupt is generated when the pulse is inputted from the encoder ENC, and the routine COUNTER INTERRUPT CI2 shown in FIG. 7 is executed. Firstly, 1 is subtracted from the counter value N showing a drive amount of the AF lens and the result is set to the new counter value N (step #250), and after being reset, a timer T1 for the timer interrupt is started (step #255). Then, whether or not the counter value N is 0 is determined (step #260). When N=0, determining that the lens has moved by a predetermined amount, a subroutine STOP AF LENS is executed, and the process returns (step #265). When N≠0, the process returns without stopping the AF lens.

Next, the routine TIMER INTERRUPT CI2 will be described. When the timer T1 which is started after being reset in the above-described routine COUNTER INTERRUPT CI2 has counted a predetermined value, the routine TIMER INTERRUPT TI2 shown in FIG. 8 is executed. Firstly, determining that the AF lens has reached the endmost position (the infinity position or the nearest position), the subroutine STOP AF LENS is executed (step #300). Then, a flag LEEDF showing that the flow is executed is set (step #305), the timer interrupt TI2 is inhibited, and the process returns (step #310).

Figure 9:
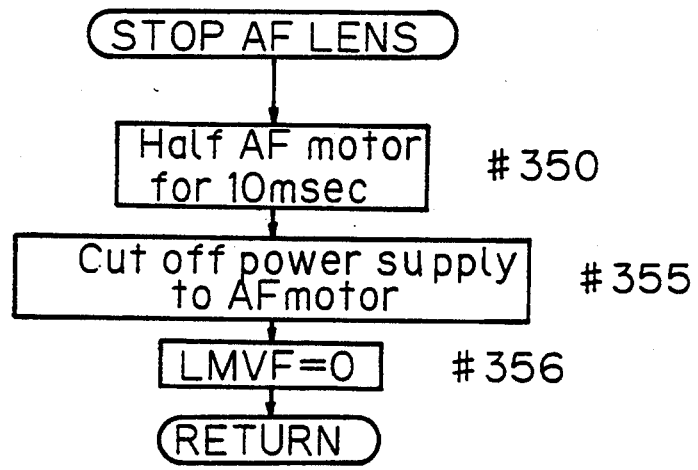
FIG. 9 shows a flow chart of a subroutine STOP AF LENS executed by the in-body microcomputer $\mu C1$.

The subroutine STOP AF LENS which is called at the above-described steps #265 and #300 is shown in FIG. 9. When the subroutine is called, firstly, a control signal for short-circuiting between both terminals of the AF motor M1 is outputted from the in-body microcomputer μC1 to the motor drive circuit MD1 for 10 msec. in order to halt the AF motor M1 (step #350). Then, a control signal for cutting off the power supply to the AF motor M1 is outputted from the in-body microcomputer μC1 to the motor drive circuit MD1 (step #355), the flag LMVF showing that the lens is being moved is reset, and the process returns (step Returning to the flow chart shown in FIG. 6, the description will be continued. When the process returns from the subroutine LENS DRIVE, the timer interrupt TI2 is permitted (step #160}, and the process waits until the flag LEEDF showing that the lens has reached the endmost position is set (step #165). Since the drive amount N is set to $-N_{LG}$ which is a negative value having a large absolute value at step #152, the drive amount N never becomes N=0 by the counter interrupt CI2 before the lens reaches the endmost position. Thus, the lens never stops on the way. That is, since no lenses have a drive amount where the drive amount N may becomes $N=-N_{LG}$, when the drive amount N is set to $-N_{LG}$, the lens always reaches the endmost position (the infinity position) without stopping on the way, and the flag LEEDF is set by the interrupt routine TIMER INTERRUPT TI2 which is thereafter executed. When it is determined that the flag LEEDF has been set at step #165, the process proceeds to step #170. Then, determining that the lens has reached the infinity position, a counter for counting a movement amount $N_F$ of the lens from the infinity position is reset, the above-described flag LEEDF is reset, and the process returns (steps #170 and #175).

Returning to the flow chart shown in FIG. 5, the description will be continued. When the process returns from the above-described subroutine AF LENS MOVE-IN, the process proceeds to step #50, where whether or not the preparation switch S1 is ON is determined. When the preparation switch S1 is not ON, the process proceeds to step #62, where a subroutine FINDER SENSING is executed. Thereafter, the process proceeds to step #60.

Figure 10:
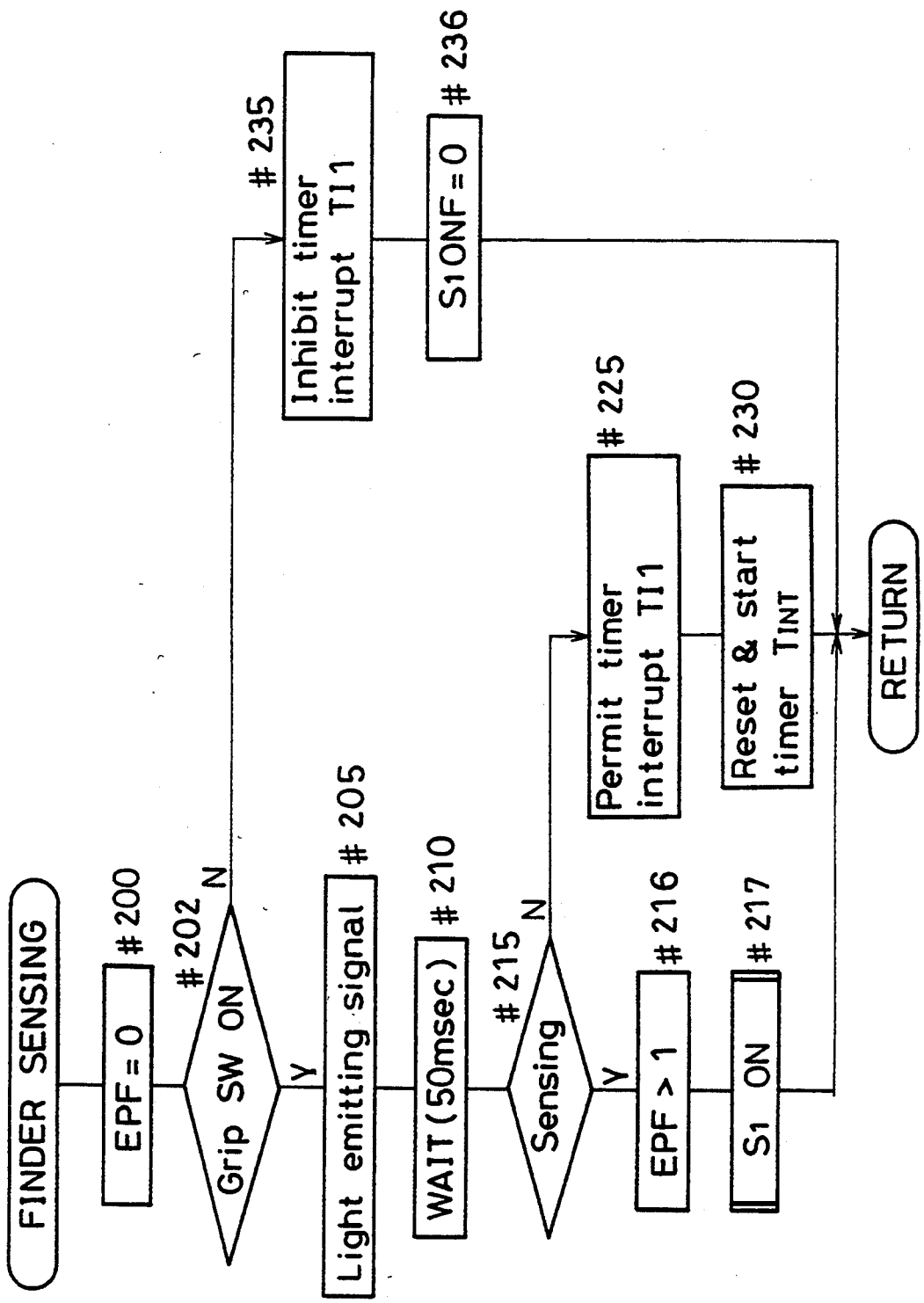
FIG. 10 shows a flow chart of a subroutine FINDER SENSING executed by the in-body microcomputer $\mu C1$.
Figure 12:
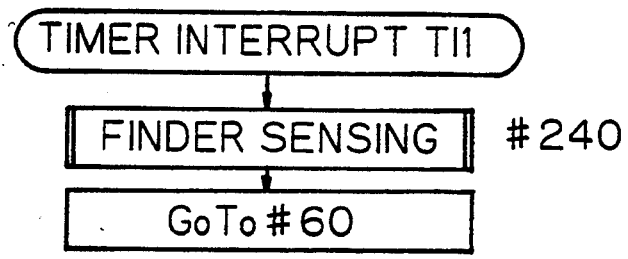
FIG. 12 shows a flow chart of a routine TIMER INTERRUPT TI1 executed by the in-body microcomputer $\mu C1$.

The subroutine FINDER SENSING is shown in FIG. 10 and will be described with reference to the figure. When the subroutine is called, firstly, a flag EPF showing that the finder is being looked into is reset (step #200), and whether or not the grip switch $S_{GR}$ is ON is determined (step #202). When the grip switch $S_{GR}$ is not ON, a timer interrupt TI1 is inhibited, a flag S1ONF is reset which is set when the grip switch $S_{GR}$ is ON or when less than five minutes have passed since the switch $S_{GR}$ is turned off, and the process returns (steps #236 and #235). When the grip switch $S_{GR}$ is ON, a signal representing a start of the light emitting is outputted to the finder sensing circuit EPD (step #205). Thereby, infrared ray is emitted by the LED of the finder sensing circuit EPD. Thereafter, the in-body microcomputer μC1 waits for 50 msec. and receives a sensing signal from the finder sensing circuit EPD (step #210). Then, it is determined from the sensing signal whether or not the finder sensing has been performed, that is, whether or not the user is looking into the finder (step #215). When it is detected that the user the looking into the finder, a flag EPF showing that the user is looking into the finder is set, the subroutine S1ON is executed, and the process returns (step #216 and #217). When it is not determined that the user is looking into the finder at step #215, the timer interrupt TI1 is permitted, a timer $T_{INT}$ thereof is reset and started, and the process returns (steps #225 and #230). The timer interrupt TI1 is generated every 250 msec. When the interrupt is generated, after the above-described subroutine FINDER SENSING is executed as shown in FIG. 12 (step #240), the process proceeds to step #60 of FIG. 5. When only the finder sensing is performed, the subroutine S1ON (step #55 of FIG. 5) is not executed, and determining that only the finder is being looked into and that the succeeding operations will not be performed, the holding of electric power is not performed (step #510 of FIG. 13A). Thus, power consumption can be reduced.

Returning to the flow chart shown in FIG. 5, when it is determined that the preparation switch S1 is ON at the above-described step #50, the process proceeds to step #55, where the subroutine S1ON is executed and it is determined whether or not the flag S1ONF has been set which is set when the preparation switch S1 is ON or when less than five minutes have passed since the preparation switch is turned off (step #60). When the flag S1ONF has been set, the process returns to step #55, where the subroutine S1ON is repeatedly executed until the flag S1ONF is reset. When the flag S1ONF has not been set, the process proceeds to step #65, where the level of each of the power controlling terminals PW1 and PW2 is changed to low to disable the power-supply transistors Tr1 and Tr2. Then, the level of the power controlling terminal PW0 is changed to low to stop the operation of the DC/DC converter DD, a flag S1ONIF is reset, and the process waits for an interruption (steps #70 to #73).

When the grip switch $S_{GR}$ or the preparation switch S1 is turned from off to on, an interrupt SIINT is executed, and the process from step #50 is executed.

Figure 13A:
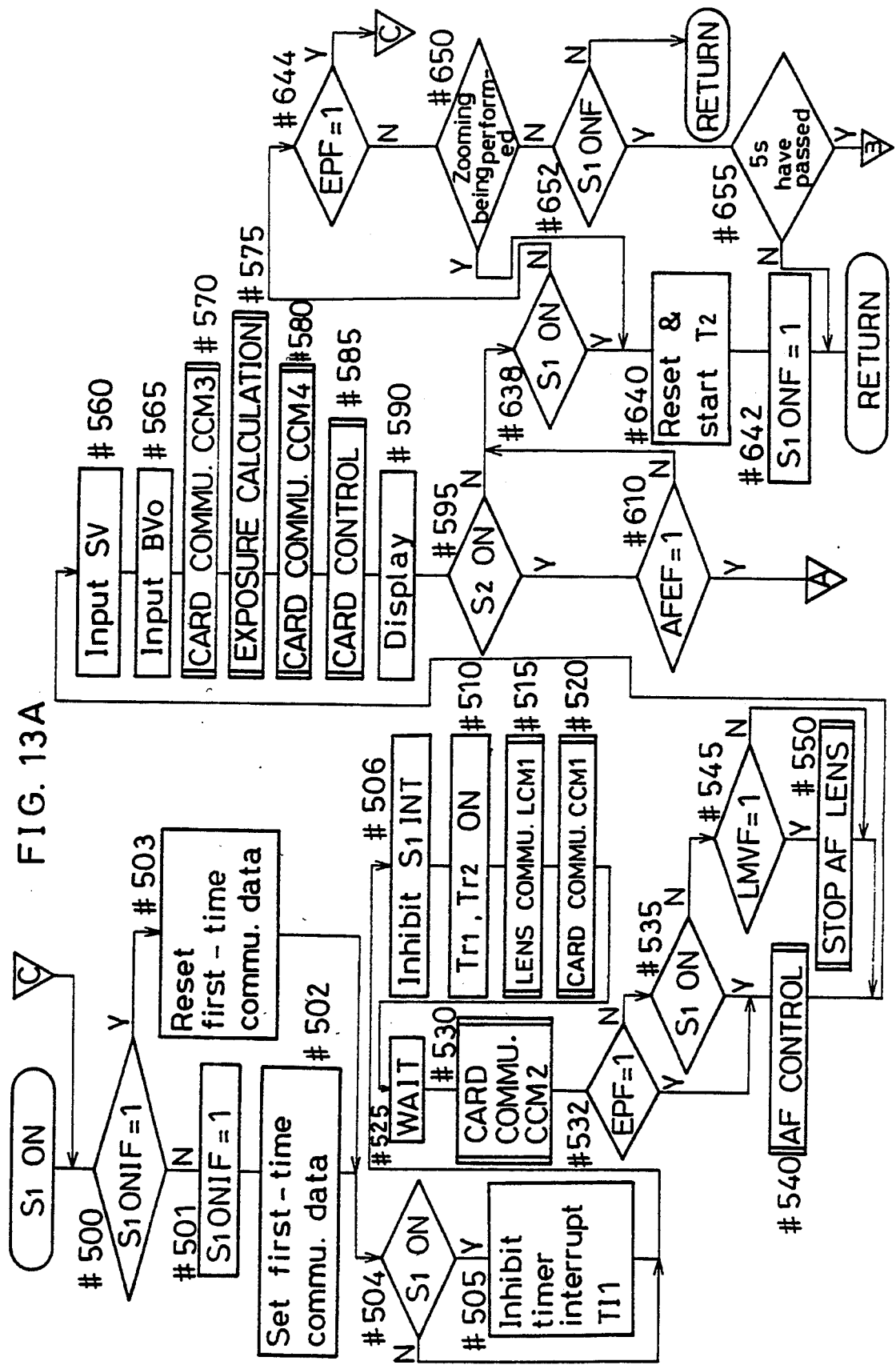

The subroutine SION is shown in FIGS. 13A and 13B. When the subroutine is called, firstly, it is determined whether or not the flag SIONIF showing that the subroutine SION is executed for the first time has been set (step #500). When it has not been set, the flag SIONIF is set, first-time communication data to be transmitted to the in-lens microcomputer $\mu$C2 are set, and the process proceeds to step #504. When the flag SIONIF has been set, the first-time communication data are reset, and the process proceeds to step #504. At step #504, whether or not the preparation switch S1 is ON is determined. When the preparation switch S1 is ON, the timer interrupt TI1 is inhibited, and the process proceeds to step #506. When the preparation switch S1 is not ON, the process proceeds directly to step #506. The interrupt SIINT is inhibited at step #506. Thereafter, the level of each of the power controlling terminals PW1 and PW2 is changed to high to activate the transistors Tr1 and Tr2, and the subroutine LENS COMMUNICATION LCM1 is executed (steps #510 and #515). Then, the subroutine CARD COMMUNICATION CCM1 is executed (step #520).

Figure 16:
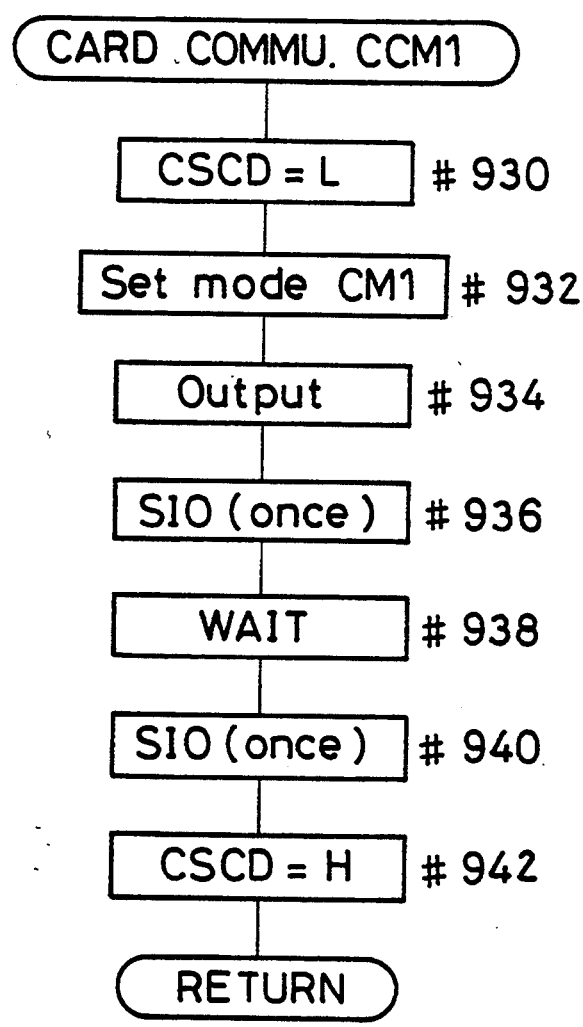
FIGS. 16 to 19 show flow charts of subroutines CARD COMMUNICATIONS CCM1 to CARD COMMUNICATIONS CCM4, respectively, executed by the in-body microcomputer $\mu C1$.

The subroutine CARD COMMUNICATION CCM1 is shown in FIG. 16. When the subroutine is called, firstly, the level of the terminal CSCD is changed to low to inform the in-card microcomputer $\mu$C3 that a communication will be performed with the IC card (hereinafter referred to as card) inserted into the inserting portion 13 of the camera body BD, and data showing that the communication is a card communication of the communication mode CM1 are set (steps #930 and #932). Then, an output mode is set, a serial data communication is performed once and the in-card microcomputer $\mu$C3 is informed that the communication is the card communication of the communication mode CM1 (steps #934 and #936). In a single serial data communication (that is in a single SIO), 8-bit data are transmitted, which is the same in the hereinafter-described communications. After the process waits for a time required for the in-card microcomputer $\mu$C3 to execute a predetermined process, a serial data communication is performed one more time (steps #938 and Then, the level of the terminal CSCD is changed to high to inform the in-card microcomputer $\mu$C3 of a completion of the data communication, and the process returns (step #942). The data transmitted at step #940 are data showing a condition of each of:

the card switch $S_{CD}$ on the camera body BD;
the release switch S2;
the learning mode switch S3;
the single-frame advance mode/continuous advance mode switch $S_{SC}$;
and the switch $S_{HL}$ for sensing whether the camera is held longitudinally or horizontally, and the data showing whether or not the data communication is performed for the first time.

Returning to the flow chart shown in FIG. 13A, the description will be continued. When the process returns from the subroutine CARD COMMUNICATION CCM1, after the process waits for a time required for a control performed by the in-card microcomputer $\mu$C3 in response to the above-described data, the subroutine CARD COMMUNICATION CCM2 is executed (steps #515 and #530).

Figure 17:
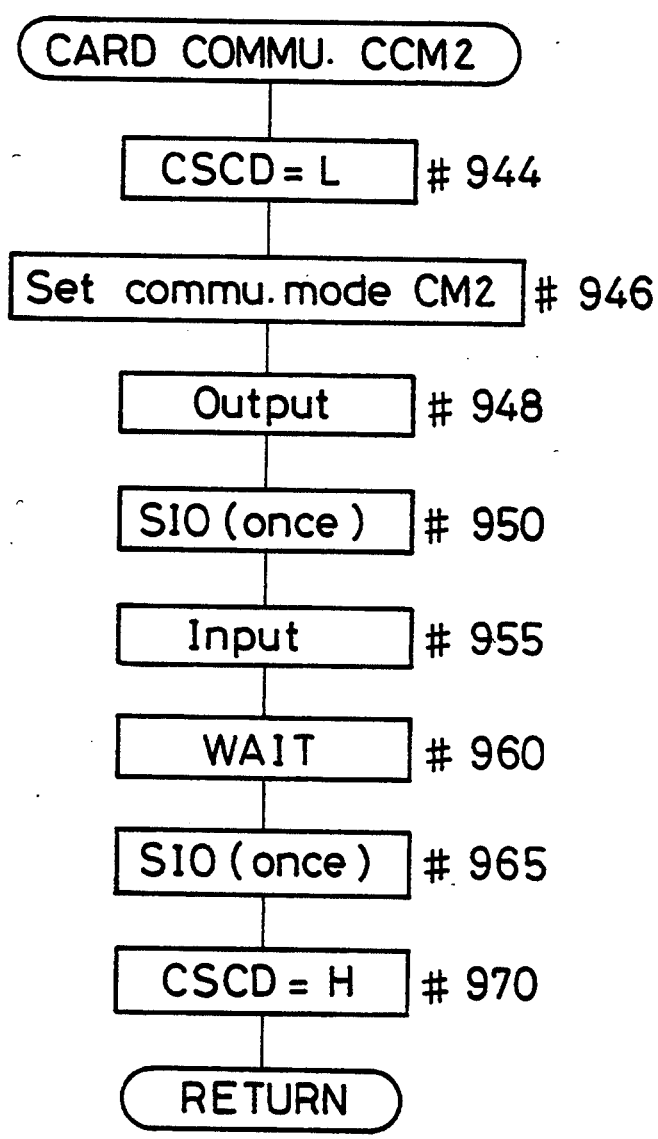

The subroutine CARD COMMUNICATION CCM2 is shown in FIG. 17. When the subroutine is called, firstly, the level of the terminal CSCD is changed to low to select the card as the partner of the communication, and data showing that the communication is a card communication of the communication mode CM2 is set (steps #944 and 946). Then, an output mode is set, a serial data communication is performed once, and the in-card microcomputer $\mu$C3 is informed that the communication is the card communication of the communication mode CM2 (steps #948 and #950). Then, an input mode is set, and after the process waits for a time required for a control by the in-card microcomputer $\mu$C3, the serial data communication is performed one more time. In the communication, the data are inputted into the in-body microcomputer $\mu$C1 which show an ON/OFF of a card control, a one shot/continuous of AF and an ON/OFF of an APZ (steps #955 to #965). The card control is that an exposure, etc. of a camera, is performed based on data which are set by the in-card microcomputer $\mu$C3. The one shot of AF is that a focusing operation when the is performed only once preparation switch S1 is turned on (or when the finder is looked into). The continuous of AF is that the focusing operation is continuously performed following a change of a subject while the preparation switch S1 is ON (or while the finder is being looked into). An ON/OFF of an APZ is whether or not a focal length is determined according to a subject distance (that is, based on a zoom program line). After the above-described data are inputted into the in-body microcomputer $\mu$C1 at step #965, the level of the terminal CSCD is changed to high to complete the data communication with the card, and the process returns (step #970).

Returning to the flow chart shown in FIG. 13A, the description will be continued. When the process returns from the subroutine CARD COMMUNICATION CCM2, whether or not the flag EPF showing that the user is looking into the finder has been set is determined (step #532). When it has been set, a subroutine AF CONTROL is executed (step #540). When the flag EPF has not been set, whether or not the preparation switch S1 is ON is determined at step #535. When the preparation switch S1 is ON, the subroutine AF CONTROL (a control of an automatic focusing operation) is executed (step #540).

Figure 20:
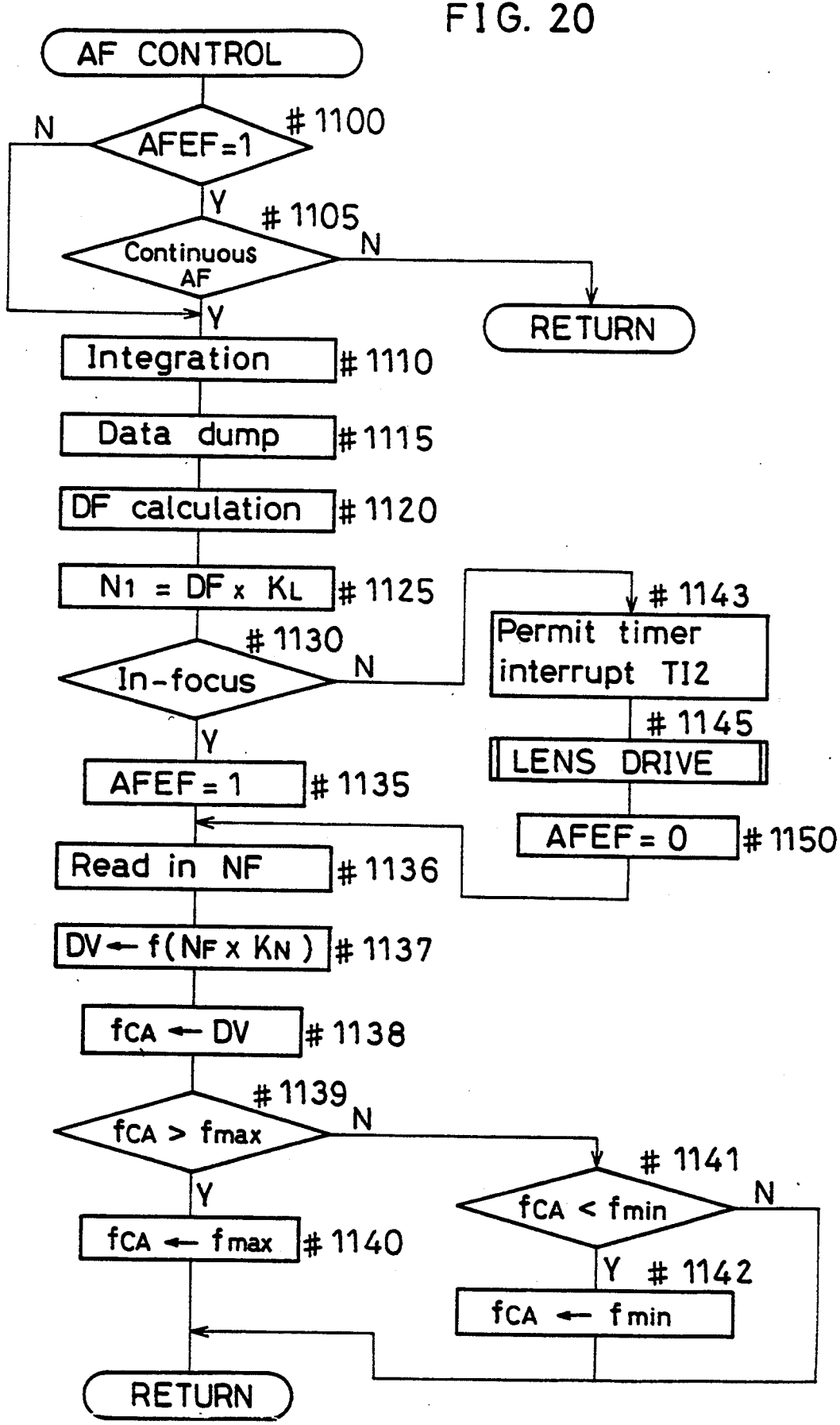
FIG. 20 shows a flow chart of a subroutine AF CONTROL executed by the in-body microcomputer $\mu C1$.

The subroutine AF CONTROL is shown in FIG. 20. When the subroutine is called, firstly, whether or not a flag AFEF showing that an in-focus condition is obtained has been set is determined (step #1100). When it has been set, whether or not a continuous AF has been set is determined (step #1105). When the continuous AF has not been set, the process returns. When the continuous AF has been set, the process proceeds to step #1110. When the flag AFEF showing that an in-focus condition is obtained has not been set at step #1100, the process also proceeds to step #1110. At step #1110, the CCD provided in the focus detection light receiving circuit $AF_{CT}$ is made to perform an integration (charge accumulation). After the integration by the CCD is completed, output data of the CCD converted into a digital signal are inputted (data dump) into the in-body microcomputer $\mu$C1 (step #1115). A defocus amount DF is calculated from the data (step #1120). A drive amount (AF lens drive pulse count) $N = DF \times K_L$ is obtained by multiplying the defocus amount DF by the drive amount converting coefficient $K_L$, and the process returns (step #1125). Then, whether or in-focus condition is obtained is not an determined from the drive amount N (step #1130). When an in-focus condition is obtained, the flag AFEF is set, a movement amount $N_F$ of the AF lens is read in, and a distance from a subject (a subject distance) DV is calculated from the movement amount $N_F$ and the distance converting coefficient $K_N$ (steps #1135 to #1138). The subject distance DV is shown in a logarithmic form. Then, a focal length $f_{CA}$ is determined to determine a size (that is, magnification) of a subject according to the subject distance. To determine a focal length according to a subject distance as describe above (or to perform a zooming operation based on a focal length which is determined in the above manner) is referred to as "auto program zoom" or "APZ". In the in-card microcomputer $\mu$C3, a focal length can be determined according to a subject distance as described later. When the control is performed based on data determined by the in-body microcomputer $\mu$C1, the magnification is fixed at 1/60. The focal length $f_{CA}$ corresponding thereto is obtained by accessing a predetermined memory by using the subject distance DV calculated at step #1137 as an address (step #1138). Then, whether or not the obtained focal length $f_{CA}$ exceeds the maximum focal length $f_{max}$ of the employed lens is determined (step #1139). When it exceeds the maximum focal length $f_{max}$, the focal length $f_{CA}$ is re-set to the maximum focal length $f_{max}$, and the process returns (step #1140). When it does not exceed the maximum focal length $f_{max}$, the process proceeds to step #1141, where whether or not the focal length $f_{CA}$ is smaller than the minimum focal length $f_{min}$ of the employed lens is determined. When it is smaller than the minimum focal length $f_{min}$, the focal length $f_{CA}$ is re-set to the minimum focal length $f_{min}$, and the process returns (step #1142). When it is not smaller than the minimum focal length $f_{min}$, the process returns.

When it is determined that an in-focus condition is not obtained at step #1130, after the timer interrupt TI2 is permitted, a driving of the AF lens is started, the flag AFEF showing that an in-focus condition is obtained is reset, and the process proceeds to step #1136 (steps #1143 to #1150).

Returning to the flow chart shown in FIG. 13A, the description will be continued. After returning from the above-described subroutine AF CONTROL, the process proceeds to step #560. When it is determined that the preparation switch S1 is not ON at step #535, the process proceeds to step #545, where whether or not the flag LMVF showing that the AF lens is being moved has been set i s determined. When the flag LMVF has been set, after the subroutine STOP AF LENS is executed at step #550, the process proceeds to step #560. When the flag LMVF has not been set, skipping step #550, the process proceeds to step #560. At step #560, a film sensitivity SV is inputted from the film sensitivity reading circuit DX, and at step #565, a luminance $BV_o$ of an object when an aperture is opened is inputted from the photometry circuit LM. The data input will be described. Firstly, the level of the terminal CSDX or the terminal CSLM is changed to low to select a circuit (DX or LM) into which the data are to be inputted. Then, the data are inputted through the terminal SIN. After the data are inputted, the level of the terminal CSDX or the terminal CSLM is changed to high, and the data input is completed. After the data are inputted as described above, a subroutine CARD COMMUNICATION CCM3 is executed to transmit these data, etc. (step #570).

Figure 18:
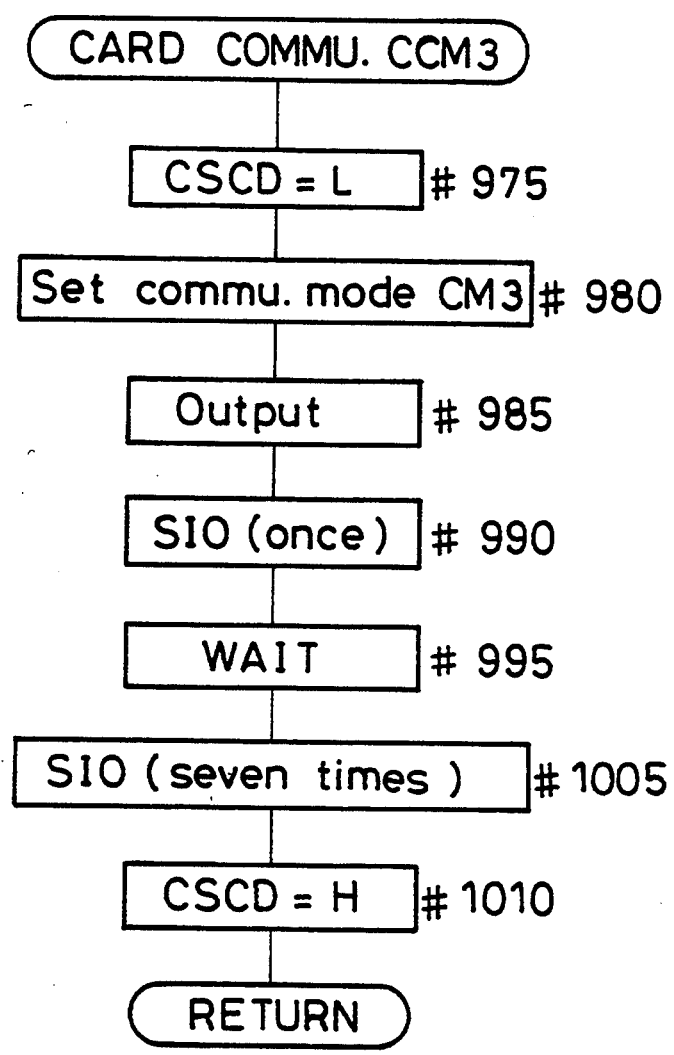

The subroutine CARD COMMUNICATION CCM3 is shown in FIG. 18. When the subroutine is called, firstly, the level of the terminal CSCD is changed to low to show the in-card microcomputer $\mu$C3 a request for a data communication, and data showing that the communication is a card communication of a communication mode CM3 are set (steps #975 and #980). Then, the output mode is set, and a serial data communication is performed once (steps #985 and #990). Thereafter, after the process waits for a time required for the in-card microcomputer $\mu$C3 to perform necessary calculations, a serial data communication is performed seven times, and the level of the terminal CSCD is changed to high (step #995 to #1010). Then, the in-card microcomputer $\mu$C3 is informed that the data communication is completed, and the process returns. The following are the data transmitted to the in-card microcomputer $\mu$C3 at step #1005 of the subroutine CARD COMMUNICATION CCM3:

the present focal length $f_p$;
the minimum focal length $f_{min}$;
the maximum focal length $f_{max}$;
the photometry value $BV_o$;
the film sensitivity SV;
the open aperture value $AV_o$; and
the maximum aperture value $AV_{max}$.

Figure 22:
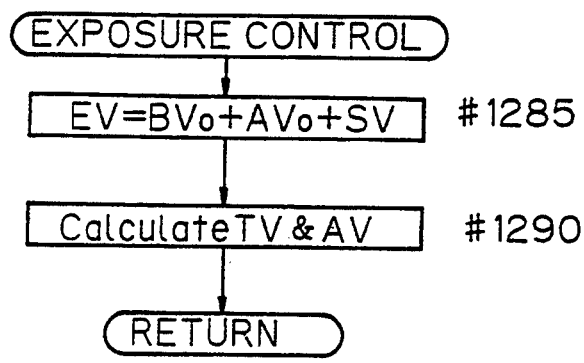
FIG. 22 shows a flow chart of a subroutine EXPOSURE CONTROL executed by the in-body microcomputer $\mu C1$.

Returning to the flow chart shown in FIG. 13A, the description will be continued. When the process returns from the above-described subroutine CARD COMMUNICATION CCM3, a subroutine EXPOSURE CALCULATION (shown in FIG. 22) is executed at step #575. When the subroutine is called, firstly, an exposure value EV is calculated by $EV=BV_o+AV_o+SV$ (step #1285). $BV_o$ represents an object luminance which is measured in an exposure measurement at open aperture, $AV_o$ represents an open aperture value, and SV is a film sensitivity. From the exposure value EV, a shutter speed TV and an aperture value AV are calculated based on a predetermined AE program line, and the process returns (step #1290). The AE program line is a program line for providing a relation between the shutter speed and the aperture value. A description and drawing thereof are omitted in this specification. However, since the shutter speed and the aperture value are calculated based on the AE program line in the cards to be described later, a specific description thereof will be given when operations of the cards are described.

Figure 19:
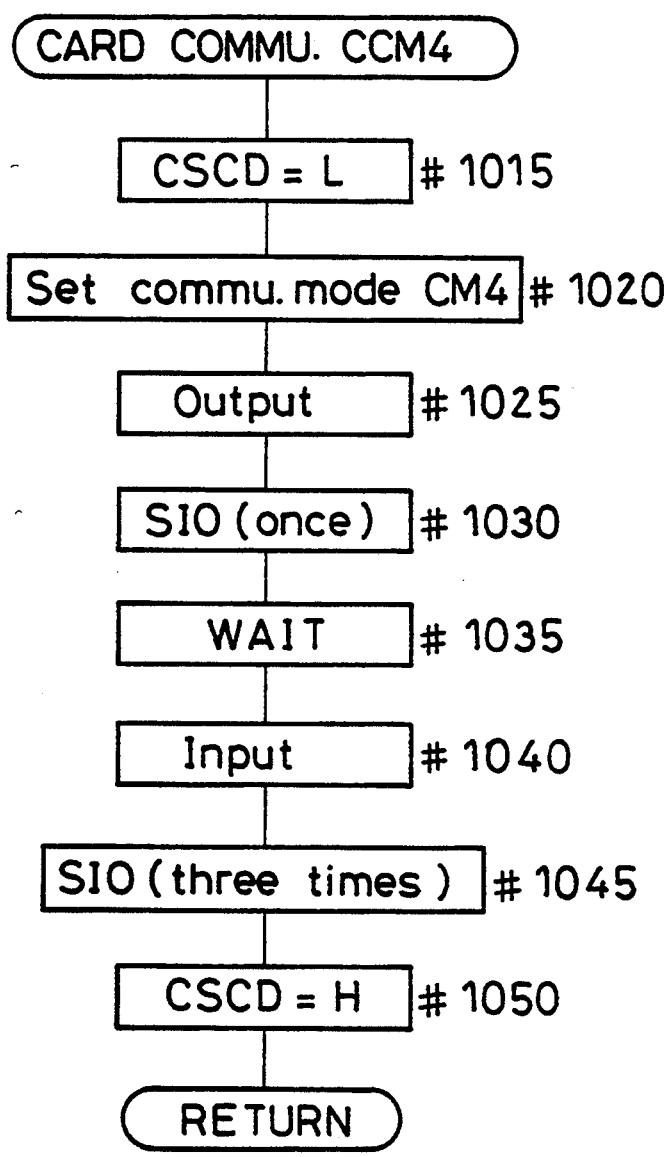

After the above-described subroutine EXPOSURE CONTROL is executed, a subroutine CARD COMMUNICATION CCM4 (shown in FIG. 19) is executed to input the exposure value EV calculated by the in-card microcomputer $\mu$C3 and other information (step #580). The detailed description of the subroutine is omitted, since the subroutine is the same as the subroutine CARD COMMUNICATION CCM2 (shown in FIG. 17) except that the communication mode which is set at step #1020 is a communication mode CM4 and that a serial communication is performed three times at step #1045. The following are the data inputted from the in-card microcomputer $\mu$C3 in this communication:

a card-side calculation shutter speed $TV_{CD}$;
a card-side calculation aperture value $AV_{CD}$; and
a card-side calculation focal length $f_{CD}$.

Figure 15:
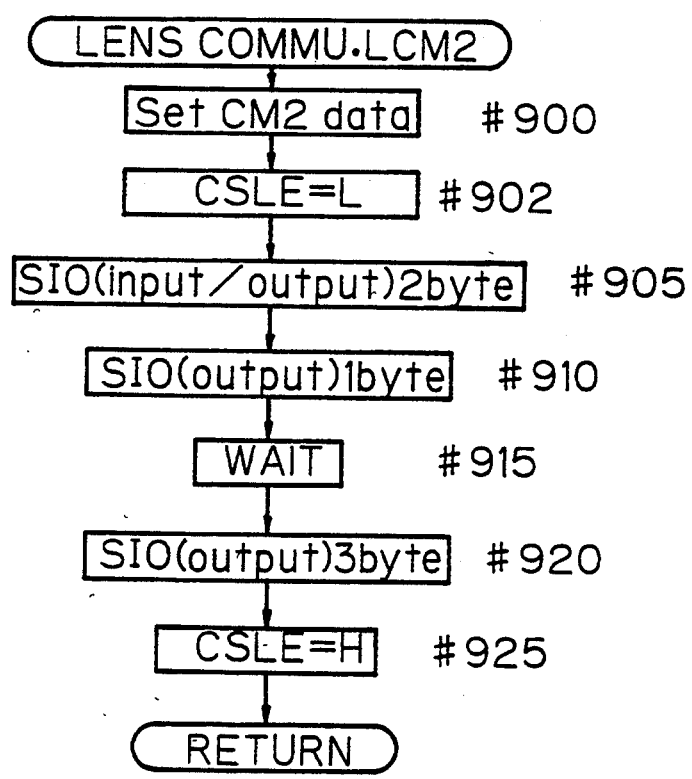
FIG. 15 shows a flow chart of a subroutine LENS COMMUNICATION LCM2 executed by the in-body microcomputer $\mu C1$.
Figure 23:
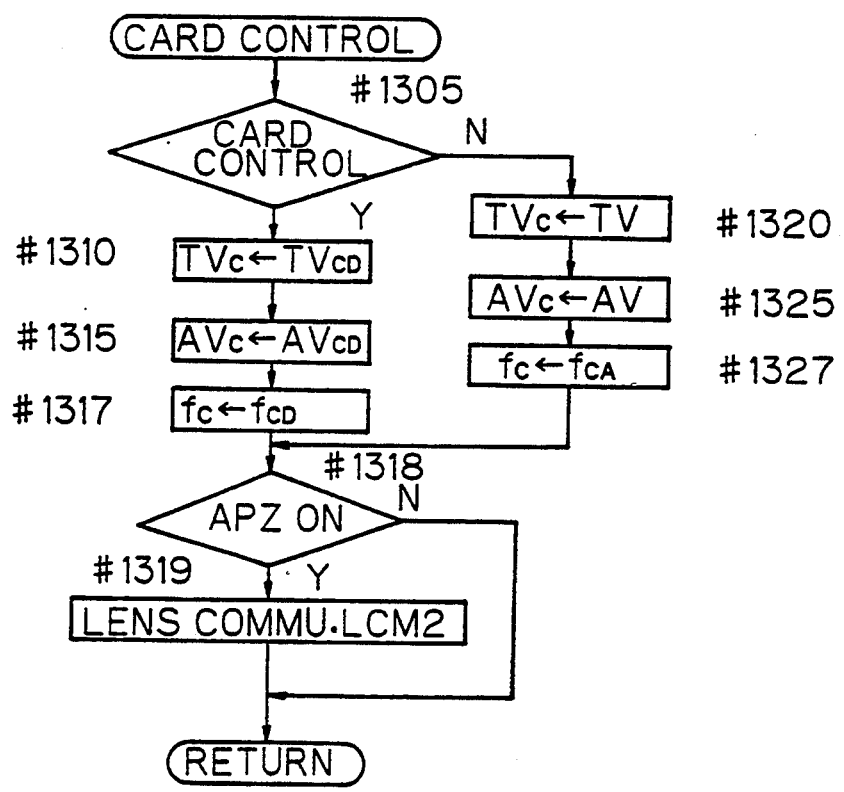
FIG. 23 shows a flow chart of a subroutine CARD CONTROL executed by the in-body microcomputer $\mu C1$.

After the above-described subroutine CARD COMMUNICATION CCM4 is executed, whether or not an exposure control, etc. is to be performed based on the data of the card is determined based on the data obtained in the card communication CCM4 and the data obtained therebefore (step #585). The subroutine CARD CONTROL is shown in FIG. 23. When the subroutine is called, whether or not the card control is to be performed is determined based on the data, inputted from the in-card microcomputer μC3 to the in-body microcomputer μC1 in the card communication CCM2, On whether or not the card control is ON (step #1305). When the card control is performed (that is, when an exposure, etc. of a camera is performed based on data set by the in-card microcomputer μCa), a control shutter speed $TV_C$, a control aperture value $AV_C$ and a focal length $f_C$ are respectively set to the shutter speed $TV_{CO}$, the aperture value $AV_{CD}$ and the focal length $f_{CD}$ which are calculated by the in-card microcomputer μC3 (steps #1310 to #1317). Then, whether or not the APZ is ON is determined based on the data inputted from the in-card microcomputer μC3. When the APZ is ON, the subroutine LENS COMMUNICATION LCM2 is executed, the target focal length $f_C$ is transmitted to the in-lens microcomputer μC2, and the process returns (steps #1318 and #1319). When the APZ is not ON, the process returns without executing the subroutine LENS COMMUNICATION LCM2. The description of the subroutine LENS COMMUNICATION LCM2 is omitted, since the subroutine is, as shown in FIG. 15, the same as the subroutine LENS COMMUNICATION LCM1 (shown in FIG. 11) except that the data are outputted from the in-body microcomputer μC1 to the in-lens microcomputer μC2 at step #920. On the other hand, when a camera control is performed (that is, when an exposure of a camera is performed based on data obtained by the in-body microcomputer μC1) at step #1305, the control shutter speed $TV_C$, the control aperture value $AV_C$ and the focal length $f_C$ are respectively set to the shutter speed TV, the aperture value AV and the focal length $f_{CA}$ which are calculated by the in-body microcomputer μC1 at step #575 (steps #1320 to #1327), and the process proceeds to step #1318.

Figure 14:
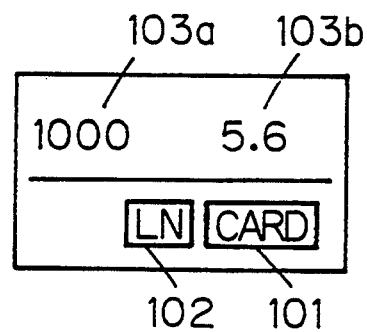
FIG. 14 shows a content of a display on a display portion of the camera body.

Returning to the flow chart shown in FIG. 13A, the description will be continued. When the process returns from the above-described subroutine CARD CONTROL, data showing the control shutter speed $TV_C$, the control aperture value $AV_C$, whether or not the card function is ON (that is, whether or not the card control is ON) and that the learned APZ is being performed are serially outputted to the display control circuit DISPC. The display control circuit DISPC makes the display portion DISP on the camera body BD display based on the above-described inputted data (step #590). FIG. 14 shows a content of the display by the display portion DISP on the camera body BD. In the figure, 101 shows a sign which is displayed when the card function is ON, and 102 shows a sign which is displayed when the learned APZ is being performed. The numeral display 103a shows a shutter speed. The numeral display 103b shows an aperture value. These numerals are displayed based on the data serially outputted from the in-body microcomputer μC1 to the display control circuit DISPC.

When the display (step #590) is completed, whether or not the release switch S2 is ON is determined at step #595. When the release switch S2 is ON, whether or not an in-focus condition is obtained is determined from the flag AFEF at step #610. When an in-focus condition is obtained (that is, AFEF-1), the process proceeds to step #615. When an in-focus condition is not obtained, the process proceeds to step #638, a release operation not being performed. At step #615, all the interrupts are inhibited. Then, an exposure control is performed, and after the exposure control is completed, the film is advanced by a frame (steps #620 and #625). Then, the flag SIONF is reset to show that the subroutine SION is completed, the interrupt SIINT by a turning on of the preparation switch S1 is permitted, and the process returns (steps #630 and #635).

When it is determined that the release switch S2 is not ON at step #595, the process proceeds to step #638 similarly to the case where it is determined that an in-focus condition is not obtained at step #610. At step #638, whether or not the preparation switch S1 is ON is determined. When the preparation switch S1 is ON, a timer T2 for maintaining electric power is reset and started at step #640. Then, the flag SIONF (which is set when the preparation switch is ON or when less than five minutes have passed since the preparation switch S1 is turned off) is set, and the process returns (step #642). On the other hand, when it is determined that the preparation switch S1 is not ON at step #638, whether or not the flag EPF showing the finder sensing has been set is determined (step #644). When the flag EPF has been set, the process returns to step #500. When the flag EPF has not been set, the process proceeds to step #650, where whether or not a zooming operation is being performed is determined from the zoom switch data. When a zooming operation is being performed, the process proceeds to step #640, where the timer T2 for maintaining electric power is reset and started to prolong a power maintained time. Then, the flag SIONF is set, and the process returns (step #642). When it is determined that a zooming operation is not being performed at step #650, whether or not the flag SIONF has been set is determined (step #652). When it has not been set, the process returns. Thereby, although the subroutine SION is executed when the finder is looked into by the user, the maintenance of electric power is stopped when the user stops looking into the finder to reduce power consumption. That is, when the process returns from the subroutine SION to the routine RESET (shown in FIG. 5), since the flag SIONF has been reset, the power-supply transistors Tr1 and Tr2 are disabled to stop the operation of the DC/DC converter DD (steps #60 to #70). On the other hand, when it is determined that the flag SIONF has been set at step #652, the process proceeds to step #655, where whether or not the timer T2 for maintaining electric power has counted five seconds is determined. When five seconds have not passed, the process returns. When five seconds have passed, the process proceeds to step #630, where a completion of photographing by a turning off of the preparation switch S1 is controlled.

Returning to the flow chart shown in FIG. 5, a case where it is determined that the main switch $S_M$ is not ON at step #20 will be described. In this case, the process proceeds to step #80, where the interrupts other than the interrupt SMINT by the switch $S_M$ are inhibited. Then, a subroutine AF LENS MOVE-IN is executed (step #90). Thereby, the AF lens is moved to the endmost position on the infinity side. A detailed description thereof is omitted, since this has already been described. After the subroutine AF LENS MOVE-IN is executed, the levels of the terminals PW1 and PW2 are changed to low to disable the transistors Tr1 and Tr2 for supplying power to the circuits of the camera body and to the zoom motor M3 of the lens (step #120). Then, the level of the terminal PWO is changed to low to disable the DC/DC converter DD, the interrupts other than the interrupt SMINT by a turning on of the main switch $S_M$ are inhibited, and the process halts (that is, the in-body microcomputer μC1 enters the sleep condition) (steps #125 and #130).

Finishing a description of the software of the in-body microcomputer μC1, the software of the in-lens microcomputer μC2 will hereinafter be described.

Figure 24:
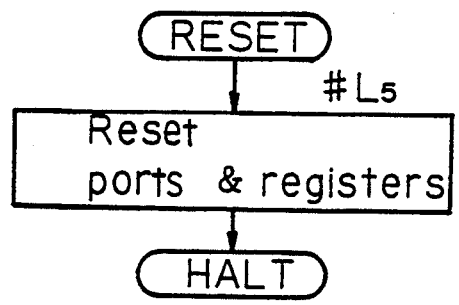
FIG. 24 shows a flow chart of a routine RESET executed by an in-lens microcomputer $\mu C2$ of the interchangeable lens.

When the lens LE is not attached to the camera body the circuits of the lens are not activated at all, since the lens attachment detecting switch $S_{LE}$ shown in FIG. 4 is ON and the level of the reset terminal RE2 of the in-lens microcomputer μC2 is maintained low. When the lens LE is attached to the camera body BD, the lens attachment switch $S_{LE}$ is turned off, a signal whose level changes from low to high is inputted into the reset terminal RE2. Thereby, the in-lens microcomputer μC2 executes a routine RESET shown in FIG. 24. In the routine RESET, after ports and registers are reset (step #L5), the process halts (that is, the in-lens microcomputer μC2 enters the sleep condition).

Figure 25:
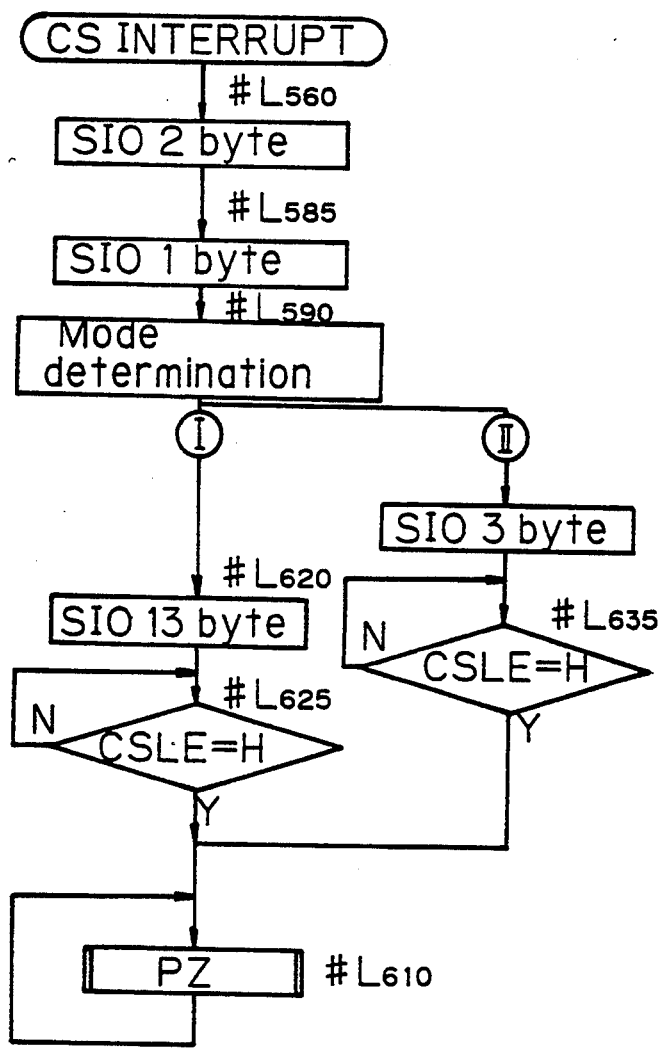
FIG. 25 shows a flow chart of a routine CS INTERRUPT executed by the in-lens microcomputer $\mu C2$.

Next, a process when a CS interrupt is executed will be described. When a signal whose level changes from high to low is transmitted from the in-body microcomputer μC1 to the terminal CSLE of the in-lens microcomputer μC2, the in-lens microcomputer μC2 executes a routine CS INTERRUPT shown in FIG. 25. In the routine, firstly, a two-byte serial communication (serial input/output) is performed in response to a clock from the in-body microcomputer μC1 (step #L560). Then, data showing the present communication mode is inputted from in-body microcomputer μC1 by a one-byte serial communication (serial input/output), and the communication mode is determined (steps #L585 and #L590). Then, the following process (a process corresponding to the lens communications LCM1 and LCM2 by the in-body microcomputer μC1) is executed according to the result of the communication mode determination.

When the communication mode is the communication mode CM1, 13-byte data are serially outputted to the in-body microcomputer μC1 (step #L620), and the process waits until the level of a signal to be inputted to the terminal CSLE is changed from low to high (step #L625). When the level is changed to high, the process proceeds to step #L610, where a subroutine PZ is repeated. It is in order to confirm a completion of the communication between the in-lens microcomputer μC2 and the in-body microcomputer μC1 that the process waits until the level of the signal to be inputted to the terminal CSLE is changed from low to high at step #L625. Thereby, other processes are not executed during the communication. A completion of the communication is confirmed similarly in the communication mode CM2 (step #L635). Moreover, the CS interrupt can be executed while the subroutine PZ is repeated at step #L610. In this case, the interrupted routine is determined to be completed.

When the communication mode is the communication mode CM2, three-byte data are serially inputted from the in-body microcomputer μC1 into the in-lens microcomputer μC2 (step #L630), and the process waits until the level of the signal to be inputted to the terminal CSLE is changed from low to high (step #L635). When the level is changed to high, the process proceeds to step #L610, where the subroutine PZ is repeated.

Figure 26:
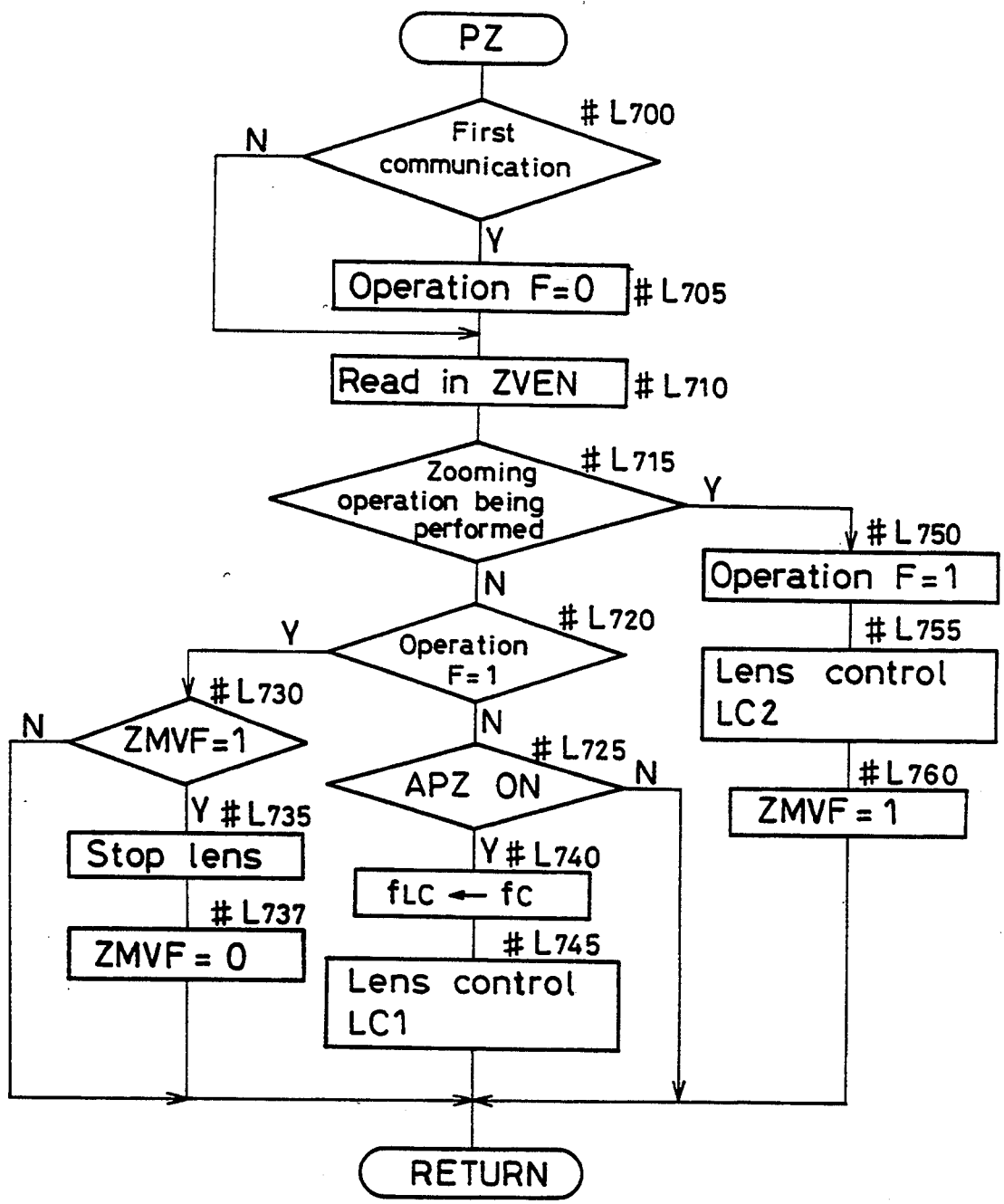
FIG. 26 shows a flow chart of a subroutine PZ executed by the in-lens microcomputer $\mu C2$.

The above-described subroutine PZ is shown in FIG. 26, and will be described with reference to the figure. When the subroutine is called, firstly, it is determined whether or not data showing the first data communication which is performed when it is sensed that the finder is being looked into or when the preparation switch S1 is operated are transmitted from the in-body microcomputer μC1. When the data are transmitted, a flag (an operation flag F) showing that a zooming operation has been performed is reset, and the process proceeds to step #L710. The operation flag F is reset only when the data communication is performed for the first time, that is, only when the subroutine SION is executed for the first time. When the data communication is not performed for the first time and, therefore, the above-described data are not transmitted, skipping step #L705, the process proceeds directly to step #L710. At step #L710, the encoder ZVEN showing whether or not the zooming ring is being operated is read in. At the next step #L715, whether or not a zooming operation is being performed is determined. When a zooming operation is being performed, the process proceeds to step #L750, where the operation flag F showing that a zooming operation has been performed is set. Then, a control signal is outputted to the motor drive circuit MD3 according to the direction and amount of the operation to control the driving of the zoom lens unit (step #L755). Then, the flag ZMVF showing that the zoom lens unit is being moved is set, and the process returns (step #L760). The detail of the lens control LC2 (step #L755) is omitted since it has no direct relation with the present invention.

When it is determined that a zooming operation is not being performed at step #L715, the process proceeds to step #L720, where whether or not the operation flag F has been set is determined. When it has been set, determining that the user, judging that the focal length (angle of view) determined by the APZ is inappropriate, performs a zooming operation, the control of the APZ is not performed. That is, whether or not the flag ZMVF showing that the zoom lens unit is being moved has been set is determined (step #L730). When it has not been set, the process returns. When it has been set, determining that the zooming operation is stopped, after resetting the flag ZMVF by stopping the zoom lens unit, the process returns (steps #L735 and #L737). On the other hand, when it is determined that the operation flag F has not been set at step #L720, the process proceeds to step #L725, where whether or not the APZ is ON (that is, whether or not a target focal length of zooming is determined according to a subject distance) is determined based on the data transmitted from the in-body microcomputer μC1. When the APZ is ON, the focal length $f_C$ transmitted from the in-body microcomputer μC1 is set to a focal length $f_{LC}$ for driving the lens. Then, the zoom lens unit is moved until the above-described focal length is obtained. After the driving is completed, the process returns (steps #L740 and #L745). When the APZ is not ON, the process directly returns. The detail of the lens control LC1 (step #L745) is omitted, since it has no direct relation with this application.

Finishing description of the software of the in-lens microcomputer μC2, the software of the in-card microcomputer C3 will hereinafter be described.

For the camera system of this embodiment, Sports Card, Auto Depth Card, Portrait Card, etc. can be used as the above-described IC card. The operations of Sports Card, Auto Depth Card and Portrait Card will hereinafter be described along with a description of the software of the in-card microcomputer μC3.

Firstly, Sports Card will be described.

Sports Card is an IC card suitable for photographing a moving object such as an object playing a sport. When photographing is performed with the card attached to the camera body, the AE program line of the camera shifts toward a high speed side, so that photographing can be performed at a high shutter speed. Now, the operation of the card will be described.

Figure 27:
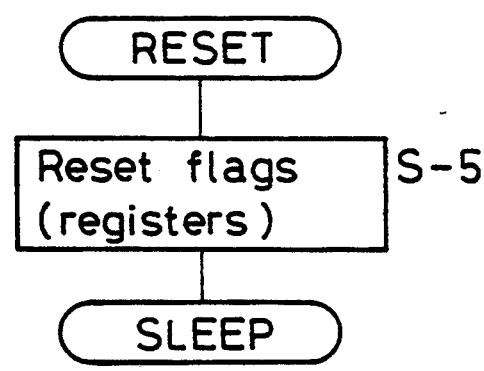
FIG. 27 shows a flow chart of a routine RESET executed by an in-card microcomputer $\mu C3$ of Sports Card which is attached to the camera body.

When Sports Card is attached to the camera, or when a battery is attached to the camera under a condition where Sports Card is attached, the level of the reset terminal RE3 is changed from low to high, a routine RESET shown in FIG. 27 is executed. In the routine, all the flags and registers (RAM) are reset, and the in-card microcomputer μC3 enters the sleep condition (step S-5). At this time, the learning mode is set to an ON mode.

Figure 28:
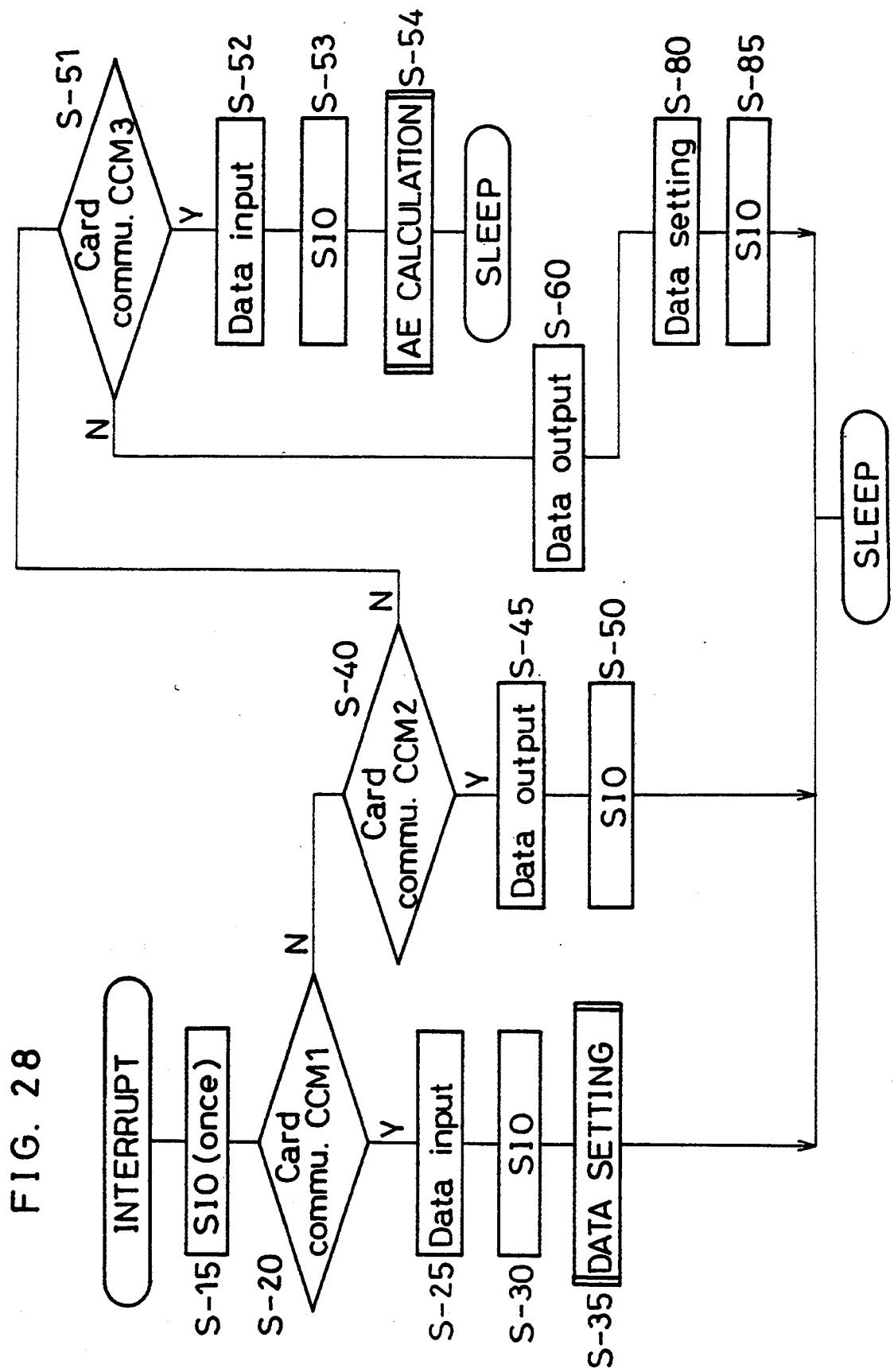
FIG. 28 shows a flow chart of a routine INTERRUPT executed by the in-card microcomputer $\mu C3$ of Sports Card.

Then, when a signal whose level changes from high to low is transmitted from the in-body microcomputer μC1 to the terminal CSCD of Sports Card, the in-card microcomputer μC3 of Sports Card executes a routine INTERRUPT shown in FIG. 28. In the routine, the in-card microcomputer μC3 of Sports Card performs a serial communication (a transmission of eight-bit data once in synchronism with a clock transmitted from the in-body microcomputer μC1 to input data showing a mode of the card communication (step S-15). Then, which of the card communications CCM1 to CCM4 (the communication modes CM1 to CM4 correspond to the card communications CCM1 to CCM4, respectively) is the present card communication is determined from the data showing a mode, and a process according to the kind of communication is executed.

That is, firstly, whether or not the communication is the card communication CCM1 is determined (step S-20). When it is the card communication CCM1, the in-card microcomputer μC3 is made the data inputted side (step S-35), and a serial communication is performed (step S-30) to receive data from the in-body microcomputer μC1. A subroutine DATA SETTING is executed based on the data (step S-35), and thereafter, the in-card microcomputer μC3 enters the sleep condition. The description of the detail of the data transmitted between the in-body microcomputer μC1 and the in-card microcomputer μC3 is omitted, since it has already been described in the description of the subroutine CARD COMMUNICATION CCM1 (shown in FIG. 16) executed by the in-body microcomputer μC1. The description of the transmitted data in the card communications CCM2 to CCM4 (shown in FIGS. 17 to 19) are also omitted.

Now, the subroutine DATA SETTING is described with reference to FIG. 29. When the subroutine is called, firstly, whether or not the card switch $S_{CD}$ is ON is determined at step S-430. When the card switch $S_{CD}$ is OFF, a flag $S_{CD}F$ is reset, and the process returns (step S-460). When the card switch $S_{CD}$ is ON, whether or not the flag $S_{CD}F$ has been set is determined at step S-435. When it has been set, determining that the switch $S_{CD}$ continues being operated, the process returns. When the flag $S_{CD}F$ has not been set, after the flag $S_{CD}F$ is set (step S-440), whether or not the card function is present ON is determined (step S-445). When the card function is ON, the data showing that the card control is not ON (that is, the data showing that the card function is OFF) are set as the data to be outputted to the in-body microcomputer μC1 in the card communication CCM2. When the card function is OFF, the data showing that the card control is ON (that is, the data showing that the card function is ON) are set. By the setting of the data showing whether or not the card control is ON, the ON and OFF of the card control is alternately switched every time the card switch $S_{CD}$ is turned on. After the setting of the data showing the ON/OFF of the card control, the process proceeds to step S-463, where a control of learning is performed.

That is, at step S-463, whether or not the switch S3 showing a change of a learning mode is turned from off to on is determined. When it is turned from off to on, the learning mode is cyclically switched among an ON mode where learning is performed, an OFF mode where learning is not performed and a reset mode where contents of learning are reset, every time the switch S3 is turned from off to on (step 5-465), and the process proceeds to step S-470. When it is determined that the switch S3 is not turned from off to on at step S-463, the process proceeds to step S-470 without changing the learning mode. At step #S-470, whether or not the release switch S2 is ON is determined based on the data transmitted from the in-body microcomputer μC1 in the card communication CCM1. When it is not ON, the process proceeds to step S-475, where a flag (continuous advance mode flag F) showing the continuous advance mode is reset, and the process returns. When the release switch S2 is ON, the process proceeds to step S-480, where whether or not the continuous advance mode has been set is determined based on the data transmitted from the in-body microcomputer μC1 (that is, the data on the single-frame advance/continuous advance switch $S_{SC}$). When the continuous advance mode has been set, whether or not the continuous advance mode flag F showing the continuous advance mode has been set is determined (step S-485). When the flag has been set, determining that the flow is executed again while the release switch 52 is ON, the process returns without performing learning. This is because in the continuous advance mode, learning is performed only for a photographing of the first frame and is not performed for that of the second and succeeding frames. Thereby, it is avoided that the similar photographing scenes are repeatedly learned, and only different photographing scenes are learned.

When it is determined that the continuous advance mode has not been set at step S-480, the process proceeds to step S-495, where a subroutine LEARNING is executed, and the process returns. When the continuous advance mode flag F has not been set at step #485, since the photographing of the first frame in the continuous advance mode is being performed, after the continuous advance mode flag F is set (step S-490), the subroutine LEARNING is executed, and the process returns.

Now, the subroutine LEARNING shown in FIG. 32 will be described. When the subroutine is called, firstly, whether or not the present learning mode is the OFF mode is determined (step S-500). When it is the OFF mode, the process returns without performing learning. When it is not the OFF mode, the process proceeds to step S-505, where whether or not the present learning mode is the reset mode is determined. When it is the reset mode, an $E^2$PROM (a programmable ROM which is electrically re-writable) for learning which is incorporated in the card is reset (represented by $\Delta f=0$ to be described later), and the process returns. When the present learning mode is not the reset mode, the process proceeds to step S-520, where whether or not the focal length $f_{CD}$ determined by the in-card microcomputer $\mu$C3 is between the minimum focal length $f_{min}$ and the maximum focal length $f_{max}$ of the employed interchangeable lens is determined. When the focal length $f_{CD}$ is not within the range ($f_{min} \leq f_{CD} \leq f_{max}$), since it is meaningless to learn an unsettable focal length, the process returns without performing learning. When the focal length $f_{CD}$ is within the range ($f_{min} \leq f_{CD} \leq f_{max}$), the process proceeds to step S-525, where whether or not the camera is longitudinally held is determined based on the data from the in-body microcomputer $\mu$C1 (that is, the data on the switch $S_{HL}$). When the camera is longitudinally held, the focal length $f_{CD}$ determined by the in-card microcomputer $\mu$C3 is multiplied by 1/1.3 (a ratio of the magnification when the camera is longitudinally held to that when the camera is horizontally held), and the result of the multiplication is set as a new $f_{CD}$. Then, the process proceeds to step S-530, where a subroutine LR is executed to determine whether or not the the focal length should be appropriate for learning (that is, the focal length is within a predetermined learning range). Since the focal length $f_{CD}$ is shown in logarithmic form, "to multiply by 1/1.3" means "to subtract log1.3" in the actual calculation.

Figure 33:
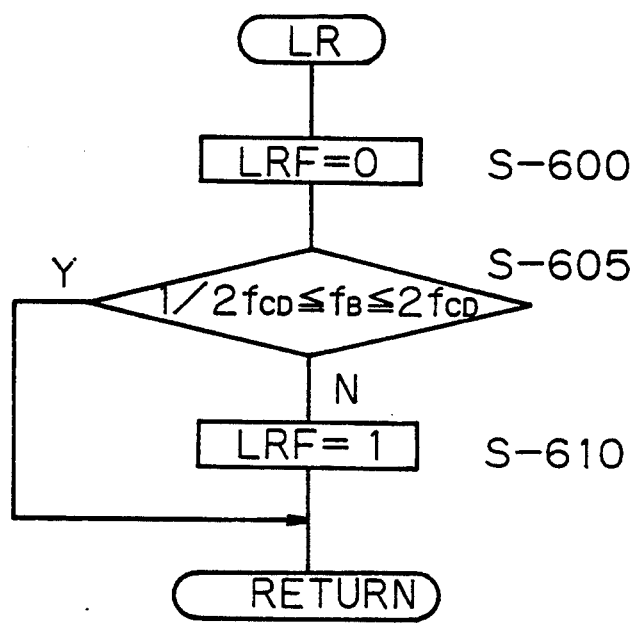
FIG. 33 shows a flow chart of a subroutine LR executed by the in-card microcomputer μC3 of Sports Card.

The subroutine LR is shown in FIG. 33. When the subroutine is called, firstly, a flag LRF showing that learning should not be performed is reset (step S-600). Then, whether or not the focal length $f_B$ (a latest focal length in actual photographing) of the camera body is equal to or longer than $\frac{1}{2}$ times the focal length $f_{CD}$ determined by the in-card microcomputer $\mu$C3 and is equal to or shorter than twice the focal length $f_{CD}$ is determined (step S-605). When the focal length $f_B$ is within the range, the process returns. When it is not within the range, after the flag LRF is set, the process returns (step S-610). When the difference (the difference between $f_{CD}$ and $f_B$) is too large as described above, the photographing situation is different from the photographing situation for Sports Card in this embodiment. Therefore, determining that it is not an object of this embodiment to change (learn) the zoom program line for providing a relation between a subject distance and a focal length based on the large difference, learning is not performed.

Figure 32:
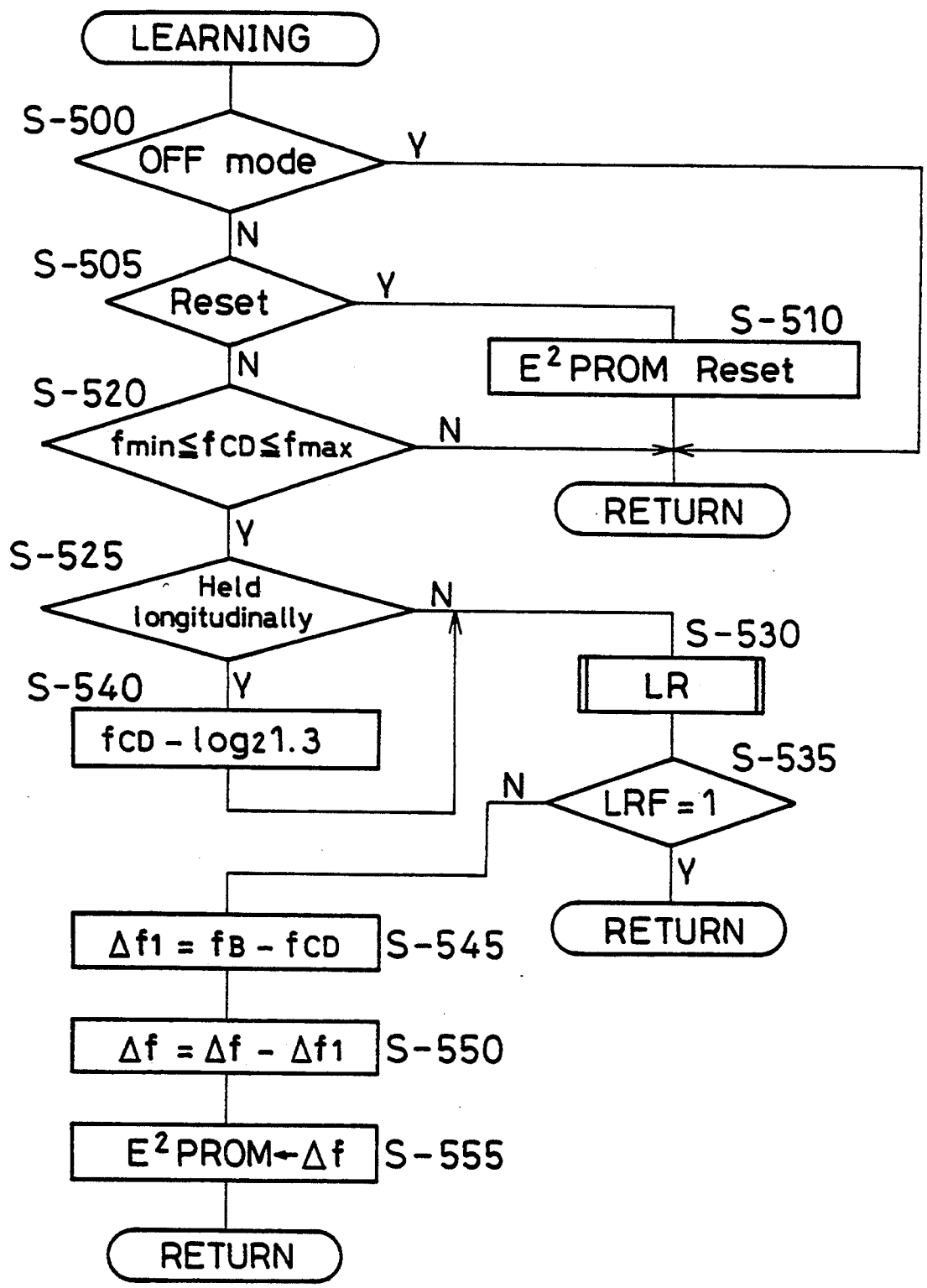
FIG. 32 shows a flow chart of a subroutine LEARNING executed by the in-card microcomputer μC3 of Sports Card.

Returning to the flow chart shown in FIG. 32, the description will be continued. When the process returns from the above-described subroutine LR, whether or not the flag LRF showing that learning should not be performed has been set is determined (step S-535). When it has been set, determining that learning should not be performed, the process returns. When it has not been set, a difference $\Delta f_1 = f_B - f_{CD}$ between the focal length $f_B$ (a latest focal length in actual photographing) of the camera and the focal length $f_{CD}$ obtained by the in-card microcomputer $\mu$C3 (see steps S-830 to S-870 in a subroutine AE CALCULATION to be described later with reference to FIG. 30B) is obtained (although it is actually a ratio, a difference is obtained since the focal length is shown in logarithmic form) (step S-545). Moreover, the previous difference $\Delta f$ minus the above-described difference $\Delta f_1$ between the focal lengths, that is, $\Delta f - \Delta f_1$ is set as a new difference $\Delta f$ (step S-550).

After the new difference $\Delta f$ is written and stored in the E$^2$ROM provided in the card (step S-555), the process returns.

Returning to the flow chart shown in FIG. 28, a case will be described where it is determined that the present communication is not the card communication CCM1 at step S-20. In this case, the process proceeds to step S-40, where whether or not the present communication is the card communication CCM2 is determined. When it is the card communication CCM2, the data which are set as described above and predetermined data particular to the card, that is, the data showing an ON/OFF of the card control, the continuous AF and an ON of the APZ are outputted from the in-card microcomputer $\mu$C3 to the in-body microcomputer $\mu$C1 (step S-45), and after a serial communication is performed, the in-card microcomputer $\mu$C3 enters the sleep condition (step S-50). In Sports Card, the APZ is always set to be ON in the above data. This is in order to change a size (magnification) of a moving object in response to a movement of the object.

When it is determined that the present communication is not the card communication CCM2 at step S-40, the process proceeds to step S-51, where whether or not the present communication is the card communication CCM3 is determined. When it is the card communication CCM3, the in-card microcomputer $\mu$C3 is made the data inputted side (S-52), and a serial communication is performed to input the data of the camera (step S-53). At the next step S-54, the subroutine AE CALCULATION for calculating data for controlling the camera (including a calculation of a focal length) is executed, and then, the in-card microcomputer $\mu$C3 enters the sleep condition. The subroutine AE CALCULATION will be described later with reference to FIGS. 30A and 30B. As described in the description of the subroutine CARD COMMUNICATION CCM3 (shown in FIG. 18), the data transmitted from the in-body microcomputer $\mu$C1 at step S-53 are as follows:

the present focal length $f_p$;
the minimum focal length $f_{min}$;
the maximum focal length $f_{max}$;
the photometry value $BV_o$;
the film sensitivity SV;
the open aperture $AV_o$; and
the maximum aperture value AVmax.

When it is determined that the present communication is not the card communication CCM3 at step S-51, determining that the present communication is the card communication CCM4, the process proceeds to S-60, where the in-card microcomputer $\mu$C3 is made the data outputting side. Then, the data calculated by the in-card microcomputer $\mu$C3, that is, the shutter speed $TV_{CD} = TV_c$, the aperture value $AV_{CD} = AV_c$ and the target focal length $f_{CD}$ (see the subroutine AE CALCULATION shown in FIGS. 30A and 30B) are transmitted to the in-body microcomputer $\mu$C1 through a serial communication (step S-85), and the in-card microcomputer C3 enters the sleep condition.

Figure 30A:
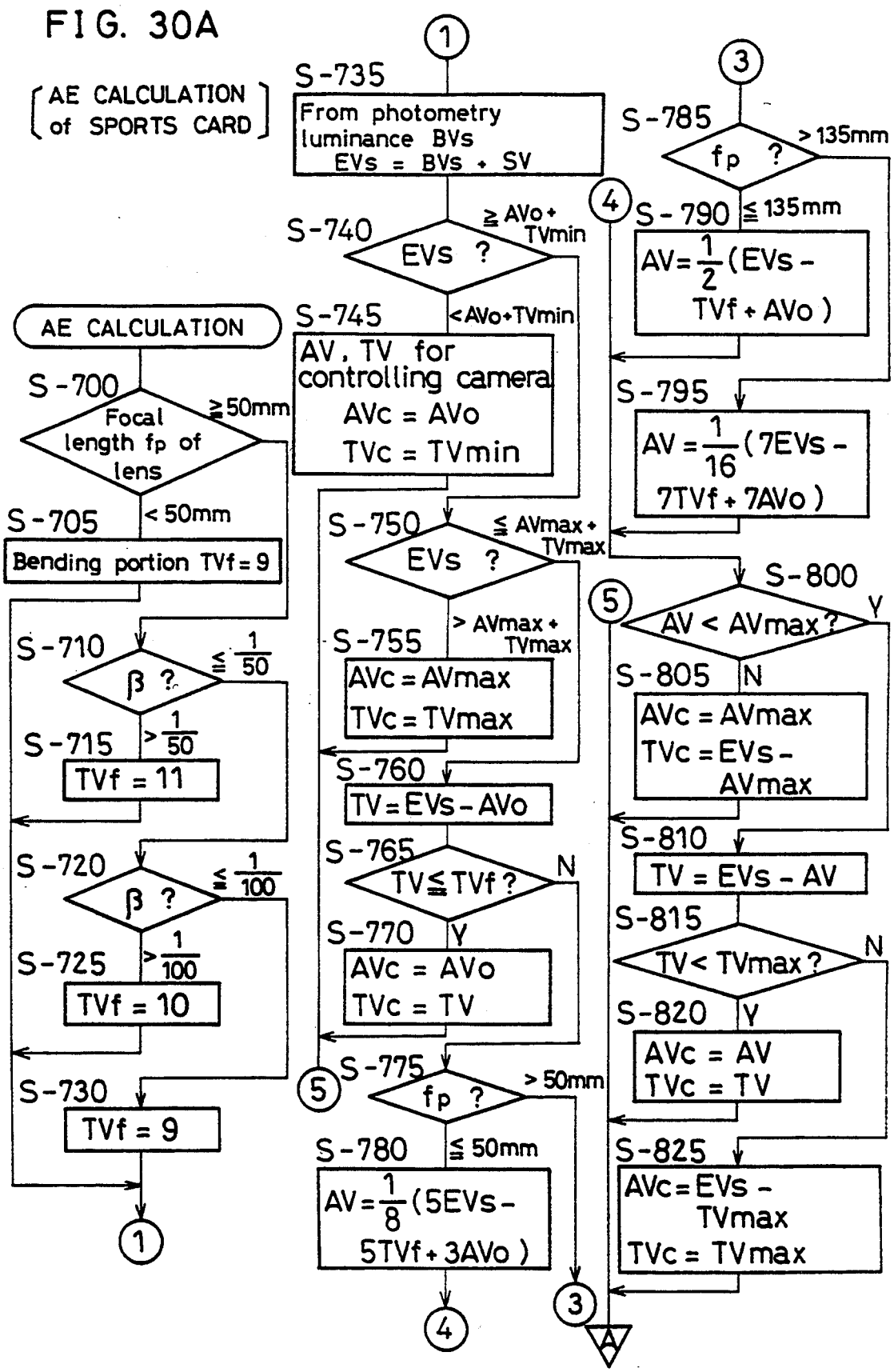
FIGS. 30A and 30B show a flow chart of a subroutine AE CALCULATION executed by the in-card microcomputer $\mu C3$ of Sports Card.
Figure 30B:
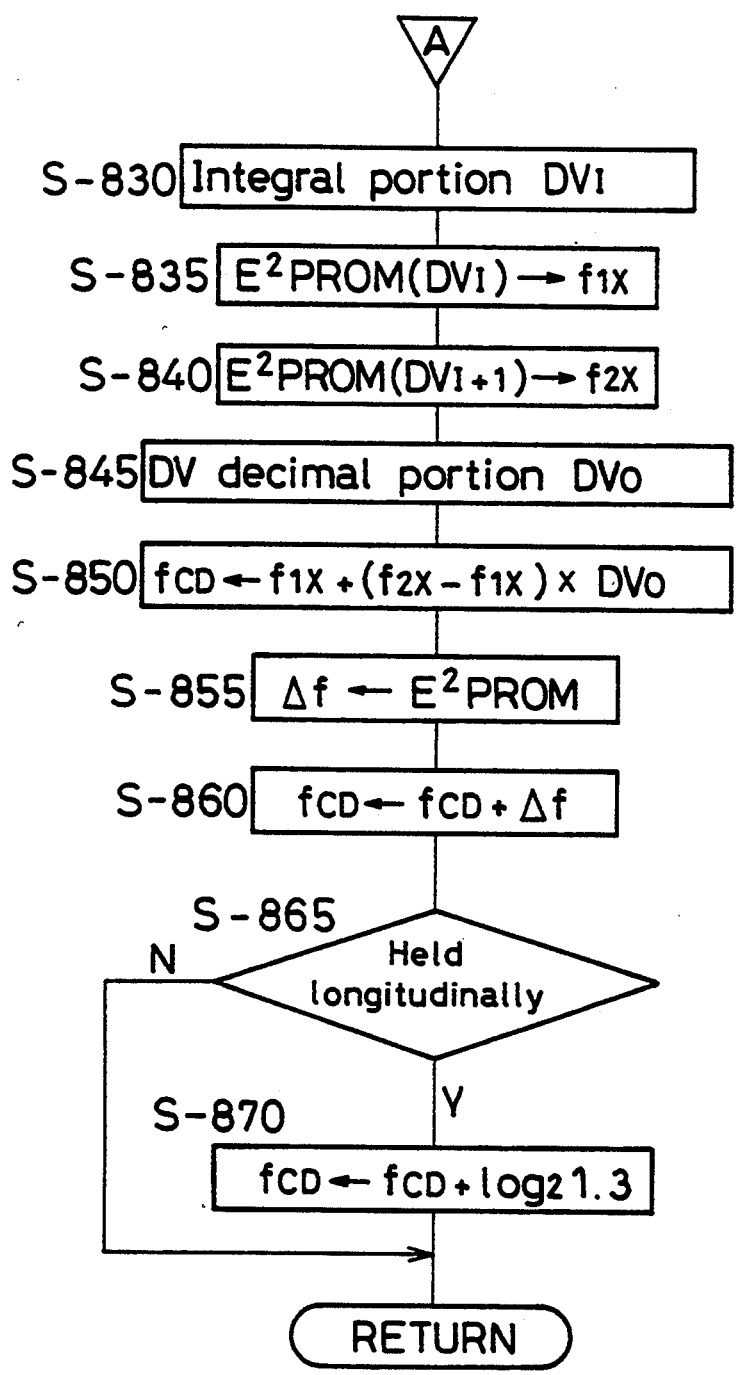
Figure 31:
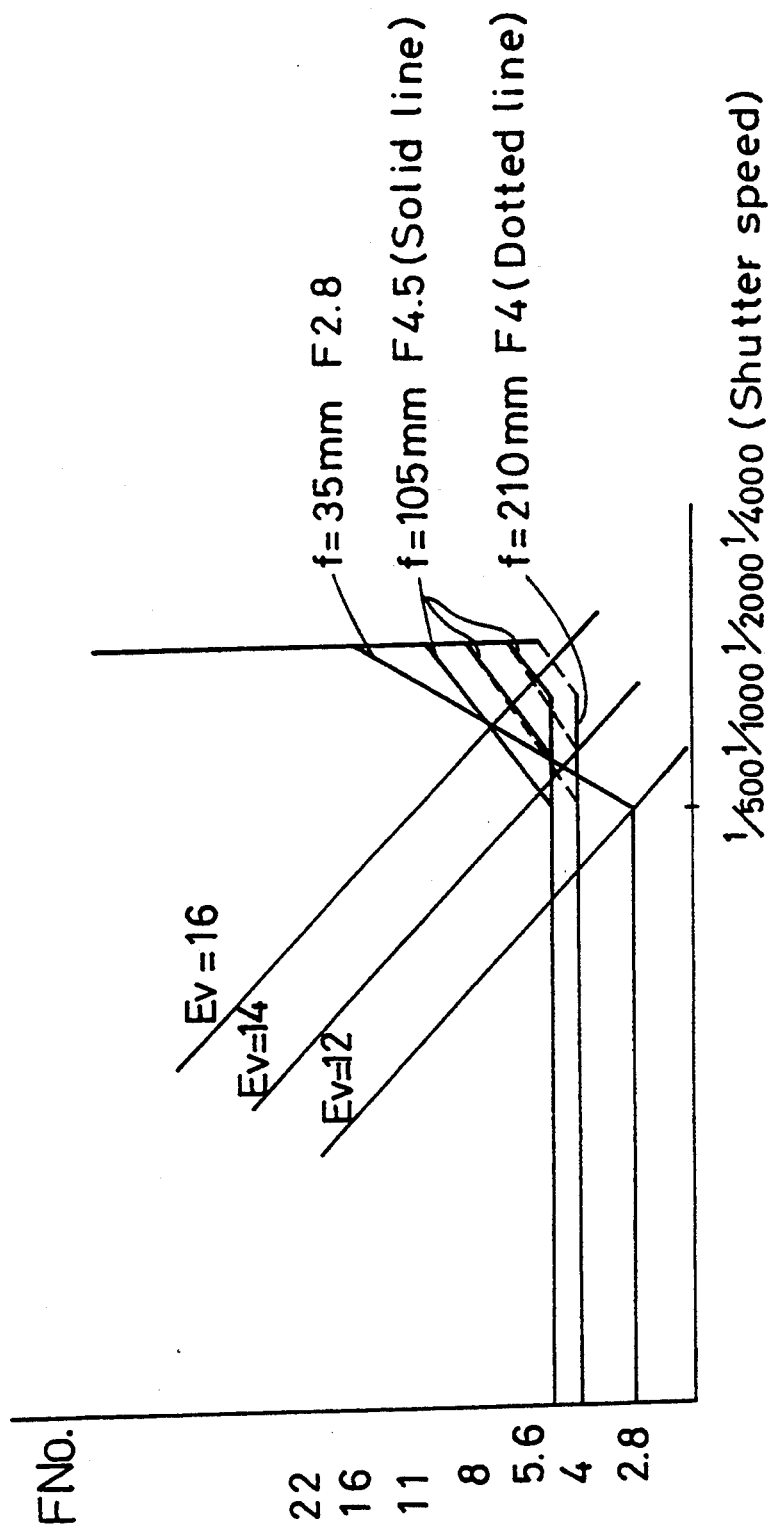
FIG. 31 shows an example of an AE program line of Sports Card.

Next, the subroutine AE CALCULATION (executed at step S-54 in FIG. 28) will be described with reference to the flow chart shown in FIGS. 30A and 30B. When the subroutine is called, firstly, a shutter speed TV$_f$ at a bending portion of the line (AE program line) of the AE calculation in the diagram shown in the FIG. 31 is calculated at steps S-700 to S-730.

That is, whether or not the focal length $f_P$ (the present focal length inputted from the in-body microcomputer μC1 at step S-53 of FIG. 28) of the lens is equal to or longer than 50 mm is determined at step S-700. When $f_p < 50$ mm, since there are little possibility of camera shake, the shutter speed $TV_f$ is set to 9 and the program line is changed so that the aperture is rather closed (step S-705). On the other hand, when $f_p \geq 50$ mm, assuming a case where a moving object located close to the camera is taken in a large size, the program line is changed according to a magnification $\beta$ as follows to increase a shutter speed (steps S-710 to S-730):

$TV_f 11$ when $\beta > 1/50$;
$TV_f = 10$ when $1/100 < \beta \leq 1/50$; and
$TV_f = 9$ when $\beta \leq 1/100$.

Next, an exposure value EV, is calculated from a photometry luminance (a luminance of a main object) $BV_s$ (step S-735). Then, whether or not the exposure value $EV_s$ is not within a control limit (whether or not it exceeds AVmax+TVmax, or whether or not it is smaller than $AV_o$+TVmin) is determined (steps S-740 and S-750). When the exposure value $EV_s$ is not within the control limit, the control limit is set as the control shutter speed $TV_c$ and the control aperture value AV, (steps S-745 and S-755).

When the exposure value EV, is within the control limit, a shutter speed $TV = EV_s - AV_o$ at an aperture value of $AV = AV_o$ is calculated, and whether or not the shutter speed TV is equal to or smaller than the shutter speed $TV_f$ of the bending portion of the AE program line is determined (steps S-760 and S-765). Then, when $TV \leq TV_f$, the control aperture value $AV_c$ and the control shutter speed $TV_c$ are respectively set to $$AV_c = AV_o$$

and $$TV_c = TV,$$

and the process proceeds to step S-830. When $TV > TV_f$, assuming that the AE program line is changed according to the focal length $f_p$ and the magnification $\beta$, the control aperture value $AV_c$ and the control shutter speed $TV_c$ are obtained as follows.

That is, the AE program line is set so that the shutter speed is high to prevent a camera shake when the focal length is long and so that the aperture is rather closed, considering a depth of field, when the focal length is short. FIG. 31 shows such an AE program line of each of three lenses where $f = 35$ mm and $F = 2.8$, where $f = 105$ mm and $F = 4.58$ and where $f = 210$ and $F = 4$. In the figure, f represents a focal length of each lens and F represents an F number of each lens. In FIG. 31, three lines correspond to each of the lenses where $f = 105$ mm and where $f = 210$ mm, and each line corresponds to a different magnification $\beta$. That is, these three lines respectively correspond to a magnification $\beta$ of $\beta \leq 1/100$, that at a magnification $\beta$ of $1/100 < \beta \leq 1/50$ and that at a magnification $\beta > 1/50$, from the upper. Therefore, to obtain the aperture value AV from the above-described $EV_s$ by use of the AE program line shown in FIG. 31, as shown by steps S-775 to S-795, a different expression is used according to a focal length f. Moreover, in the expression, a different $TV_f$ is used according to the magnification $\beta$ (see steps S-710 to S-730). In the above description, three fixed focal length lenses are described as an example. A similar AE program line can be used for zoom lenses.

Next, whether or not the aperture value AV obtained at steps S-775 to S-795 as described above is smaller than the maximum aperture value AVmax is determined (step S-800). When $AV \geq AV$max, the control aperture value $AV_c$ and the control shutter speed $TV_c$ are respectively set to $$AV_c = AV\text{max}$$

and $$TV_c = EV_c - AV\text{max},$$

(step S-805), and the process proceeds to step S-830. When $AV < AV$max, the shutter speed TV is set to $TV = EV_s - AV$ (step S-810), and whether or not the shutter speed TV is smaller (that is, the speed is lower) than the maximum shutter speed TVmax is determined (step S-815). When $TV < TV$max, the control aperture value AV, and the control shutter speed $TV_c$ are respectively set to $$AV_c = AV$$

and $$TV_c = TV,$$

(step S-820) and thereafter, the process proceeds to step S-830. When $TV \geq TV$max, the control shutter speed $TV_c$ is set to TVmax as well as the control aperture value $AV_c$ is obtained again, that is, the above two are respectively set to $$AV_c = EV_s - Tv\text{max}$$

and $$TV_c = TV\text{max},$$

(step S-825) and thereafter, the process proceeds to step S-830.

Figure 34:
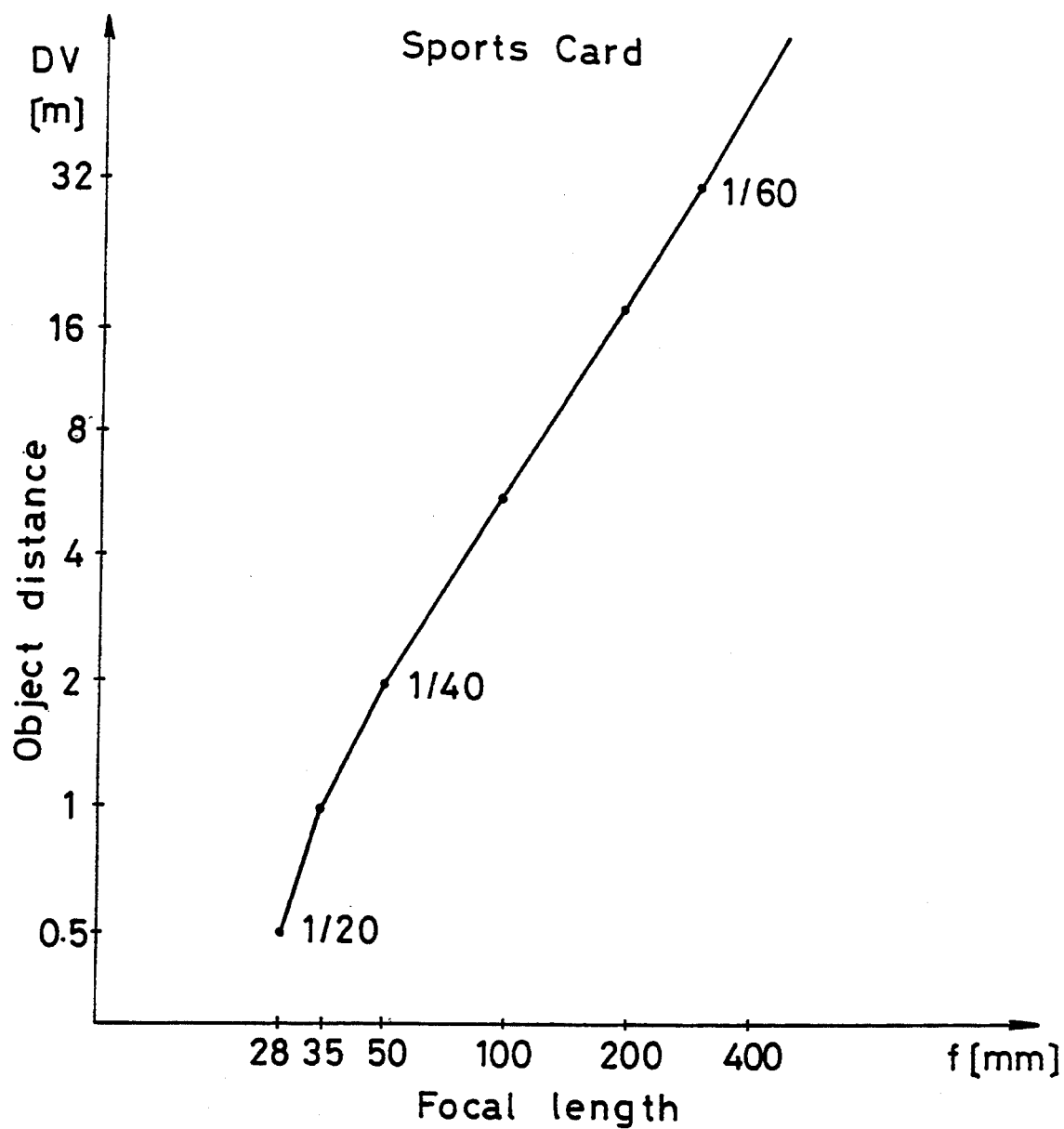
FIG. 34 shows a zoom program line of Sports Card.

At steps from S-830, a calculation of the APZ, that is, a calculation of the focal length $f_{CD}$ corresponding to a subject distance is performed based on a zoom program line shown in FIG. 34 (a program line showing a relation between a subject distance and a focal length). In this embodiment, of the focal lengths corresponding to the subject distance DV (distance information shown in logarithmic form), only the focal lengths corresponding to integral subject distances DV are stored in the ROM in order to reduce a ROM capacity required for storing the zoom program line. And, since the subject distance DV is not generally an integer, the zoom program line between adjacent two integers is interpolated by a straight line to obtain the focal length fed corresponding to the subject distance DV (see step S-850 to be described later). The calculation of the focal length fed will hereinafter be described.

Firstly, an integer portion $DV_1$ of the subject distance DV (distance information shown in logarithmic form) is taken out, a table in the ROM is accessed by using the integer portion $DV_1$ as an address to read out a focal length $f_{1x}$ (a logarithm), and a focal length $f_{2x}$ (a logarithm) is similarly read out by using an integer $DV_{1+1}$ which is larger than the $DV_1$ by 1 as an address (steps S-830 to S-840). Subsequently, a decimal portion $DV_o$ is taken out, and the focal length $f_{CD}$ to be calculated by the in-card microcomputer μC3 is obtained by $$f_{CD} = f_{1x} + (f_{2x} - f_{1x}) \times DV_o \quad (1)$$

(steps S-845 and S-850). Then, the learned value Δf (see step S-555 of FIG. 32) is read out from the E²PROM, and the value Δf plus the focal length $f_{CD}$ is set as a new $f_{CD}$ (steps S-855 and S-860). At the next step S-865, whether or not the camera is longitudinally held is determined. When the camera is not longitudinally held, the process returns. When the camera is longitudinally held, after the focal length is increased by 1.3 times (since the focal length is shown in a logarithmic form, log1.3 is added to the $f_{CD}$), the process returns (step S-870).

As understood from the above-described calculation of the focal length $f_{CD}$, in photographing under control of this card, the original program line is shifted as a whole by the value Δf and a zooming is automatically performed based on the shifted program line.

Secondly, Auto Depth Card will be described.

Auto Depth Card is a card suitable for taking, on a trip, in an event, etc., a photograph where both a person and the background are in focus. When photographing is performed with the card attached to a camera, the camera is controlled so that both a person and the background are in focus. The operation of the card will hereinafter be described.

Figure 35:
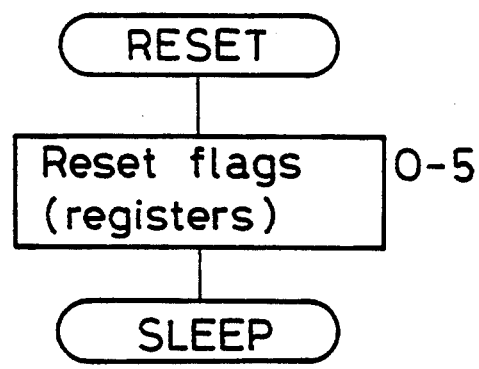
FIG. 35 shows a flow chart of a routine RESET executed by the in-card microcomputer μC3 of Auto Depth Card which is attached to the camera body.
Figure 36:
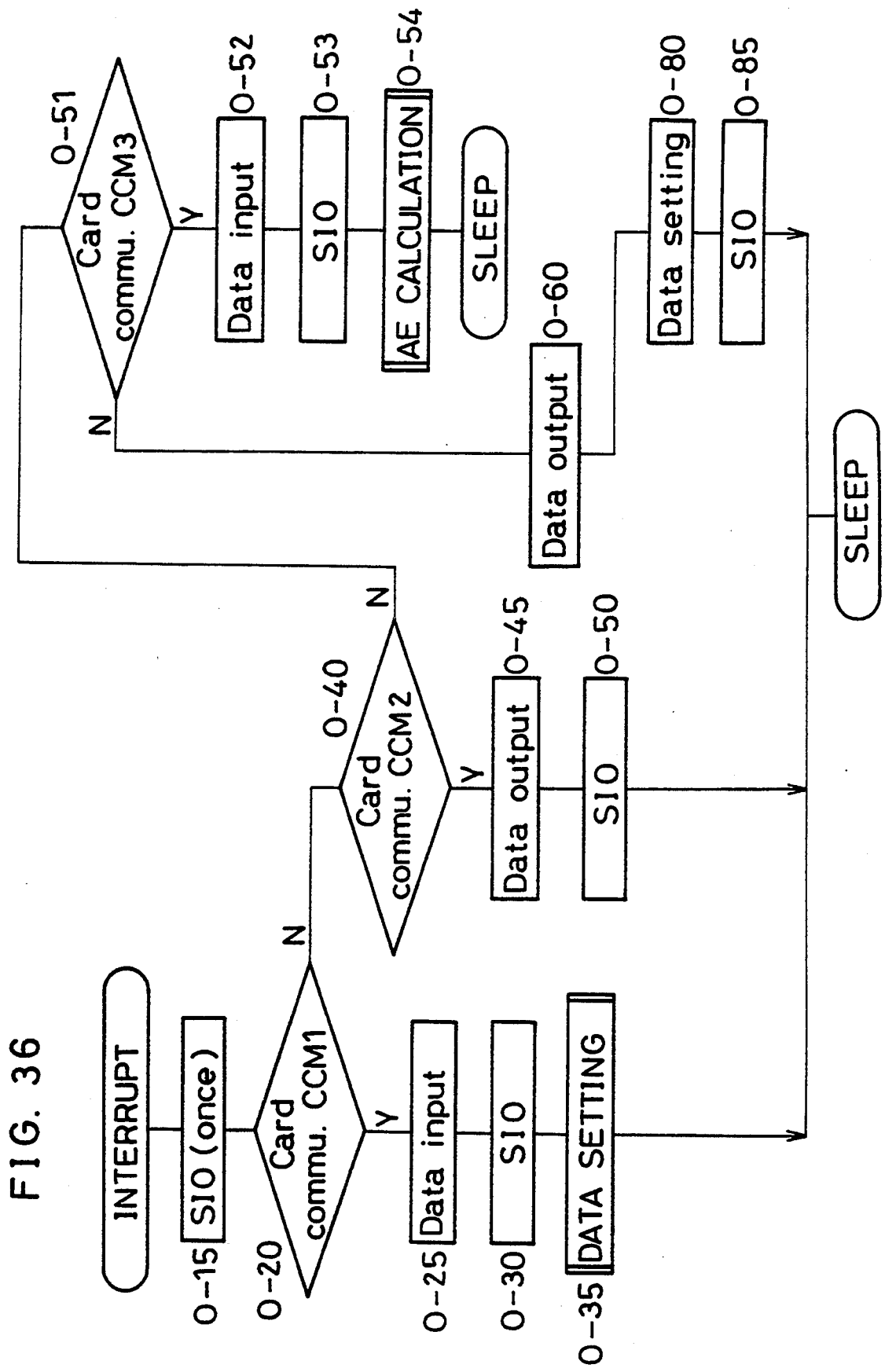
FIG. 36 shows a flow chart of a routine INTERRUPT executed by the in-card microcomputer μC3 of Auto Depth Card.

When Auto Depth Card is attached to a camera, a routine RESET shown in FIG. 35 is executed, and when a signal whose level changes from low to high is transmitted from the in-body microcomputer μC1 to the terminal CSCD of the in-card microcomputer μC3, a routine INTERRUPT shown in FIG. 36 is executed. The description of the routines RESET and INTERRUPT is omitted, since they are the same as the routines RESET (shown in FIG. 27) and INTERRUPT (shown in FIG. 28) of Sports Card. In the card communication CCM2 in FIG. 36, the following data are transmitted from the in-card microcomputer μC3 to the in-body microcomputer μC1 (step O-50):

- an ON/OFF of the card control;
- one-shot AF; and
- an ON/OFF of the APZ.

A subroutine DATA SETTING shown in FIG. 37 will be described, as it is partly different from the subroutine DATA SETTING (shown in FIG. 29) of Sports Card, and also, a subroutine LEARNING, shown in FIG. 39, which is called from the subroutine DATA SETTING and a subroutine LR, shown in FIG. 53, for determining in the subroutine LEARNING whether or not a focal length or a magnification should be learned (whether or not the focal length or the magnification is within a predetermined learning range) will be described.

Figure 37:
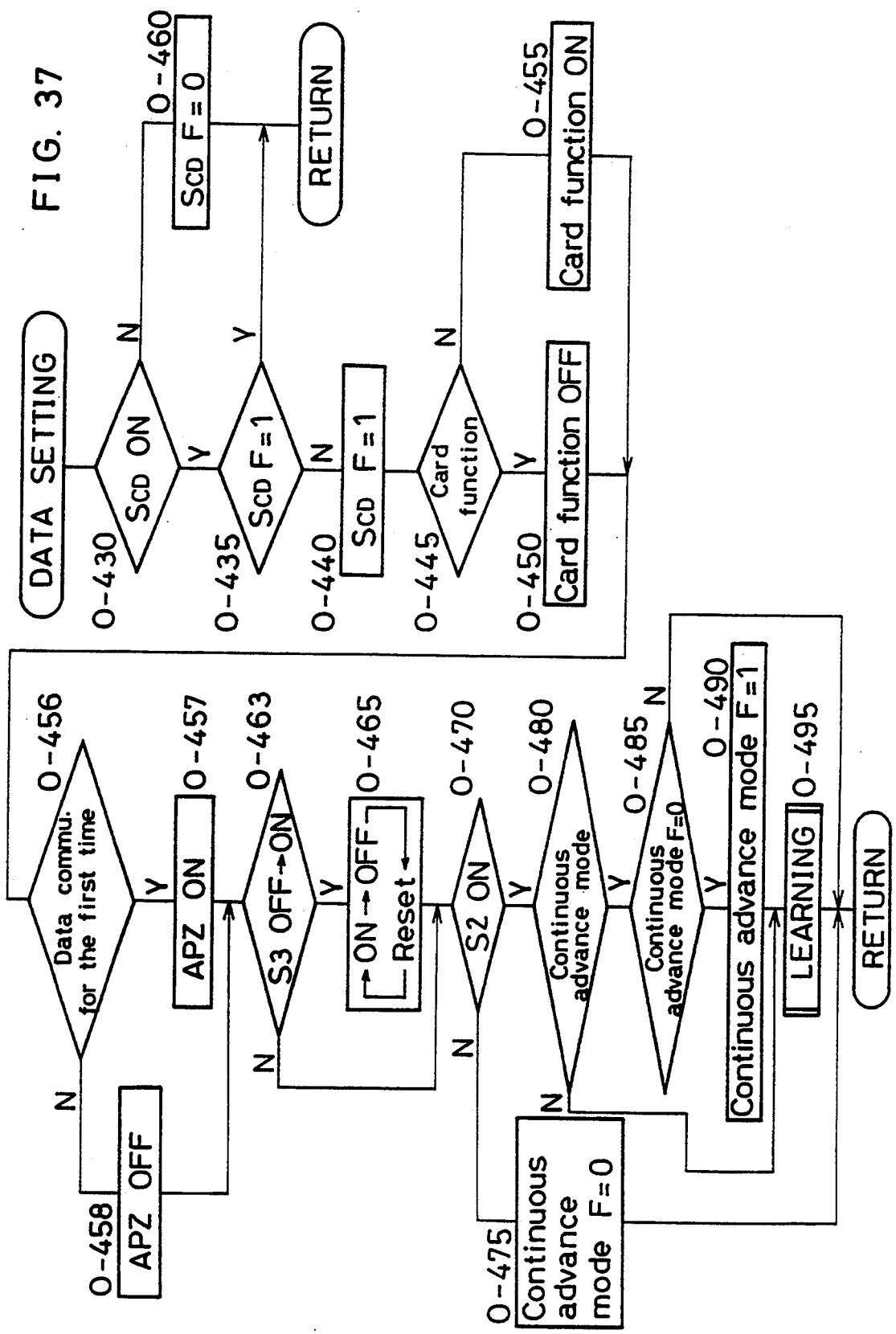
FIG. 37 shows a flow chart of a subroutine DATA SETTING executed by the in-card microcomputer μC3 of Auto Depth Card.

The subroutine DATA SETTING shown in FIG. 37 is different from that (shown in FIG. 29) of Sports Card in that steps O-456 to O-458 are added. At step O-456, whether or not the data communication is performed for the first time after the finder sensing or SION (that is, after the switch S1 is turned on without the finder sensing) based on data transmitted from the in-body microcomputer μC1. When the data communication is performed for the first time, the APZ operation is performed, and when the data communication is not performed for the first time, the APZ operation is inhibited. That is, in this card and Portrait Card (to be described later), the APZ operation is performed only when the subroutine SION is executed for the first time after the camera is activated. This is because the APZ operation is not required to be performed more than once since an object to be photographed is stationary.

Next, the subroutine LEARNING executed at step O-495 will be described with reference to FIG. 39. The description of steps O-500 to O-535 in the figure is omitted, since they are the same as those of the subroutine LEARNING (shown in FIG. 32) of Sports Card. Before the subroutine LEARNING shown in FIG. 39 is described, the subroutine LR executed at step O-530 will be described with reference to FIG. 38, as it is different from the subroutine LR (shown in FIG. 33) of Sports Card.

When the subroutine LR is called, firstly, the flag LRF showing that learning should not be performed is reset (step O-600), and whether or not the focal length $f_B$ (a latest focal length in actual photographing) of the camera body is equal to or larger than 28 mm and is equal to or shorter than 100 mm (that is, 28 mm $\leq f_B \leq$ 100 mm) is determined (step O-605). When the focal length $f_B$ is within the range, the magnification β is calculated (step O-610). Then, whether or not the magnification β is equal to or a larger than 1/70 and is equal to or smaller than 1/160 is determined (1/70 is a magnification when a subject distance is 2 m and a focal length is 28 mm, and 1/160 is a magnification when a subject distance is 16m and a focal length is 100 mm) (step O-615). When the magnification β is within the range, the process returns. On the other hand, when the magnification is not within the range, or when the focal length $f_B$ of the camera body is not within the above-described range (28 mm $\leq f_B \leq$ 100 mm), the flag LRF showing that learning should not be performed is set, and the process returns (step O-620). That is, in such a case, determining that the focal length range and the magnification range are not those which are frequently used for Auto Depth Card, that is, determining that it is a special case as a photographing with Auto Depth Card, learning is not performed.

After whether or not the focal length and the magnification should be learned is determined as described above, the process from step O-545 is executed. Before these steps are described, the manner in which learning is performed by Auto Depth Card and Portrait Card will be described with reference to FIG. 40. In the figure, a zoom program line which is set before a learning of this time (hereinafter referred to as original program line) is represented by $p_O$, and a zoom program line which is changed by the learning of this time, by $p_L$.

Now, a subject distance is represented by DV and a focal length (a latest focal length in actual photographing) of the camera body is represented by $f_B$. And it is assumed that the subject distance DV consists of an integral portion $DV_1$ and a decimal portion $DV_o$. From the above-described original program line $p_O$, the integral subject distance $DV_1$ and an integral subject distance $DV_{1+1}$ which is larger than $DV_1$ by 1 correspond to a focal length $f_1$ and a focal length $f_{1+1}$, respectively. From these focal lengths $f_1$ and $f_{1+1}$, a focal length $f_{CD}$ corresponding to the subject distance DV is obtained based on the original program line $p_O$. The L in the figure represents a difference between the focal length $f_{CD}$ and the focal length $f_B$ (a latest focal length in actual photographing of the camera body), and a result of a division of the difference L by a predetermined integer n is represented by $\Delta f_L$. That is, $$\Delta f_L = L/n = (f_B - f_{CD})/n \quad (2),$$

where a value of the integer n (n=1 to 3) is experimentally obtained. In place of the above equation, the following equation (3) may be used:

$$\Delta f_L = k \cdot L = k \cdot (f_B - f_{CD}) \quad (3)$$

where k is a positive number equal to or smaller than 1 and the value thereof is experimentally obtained.

Figure 40:
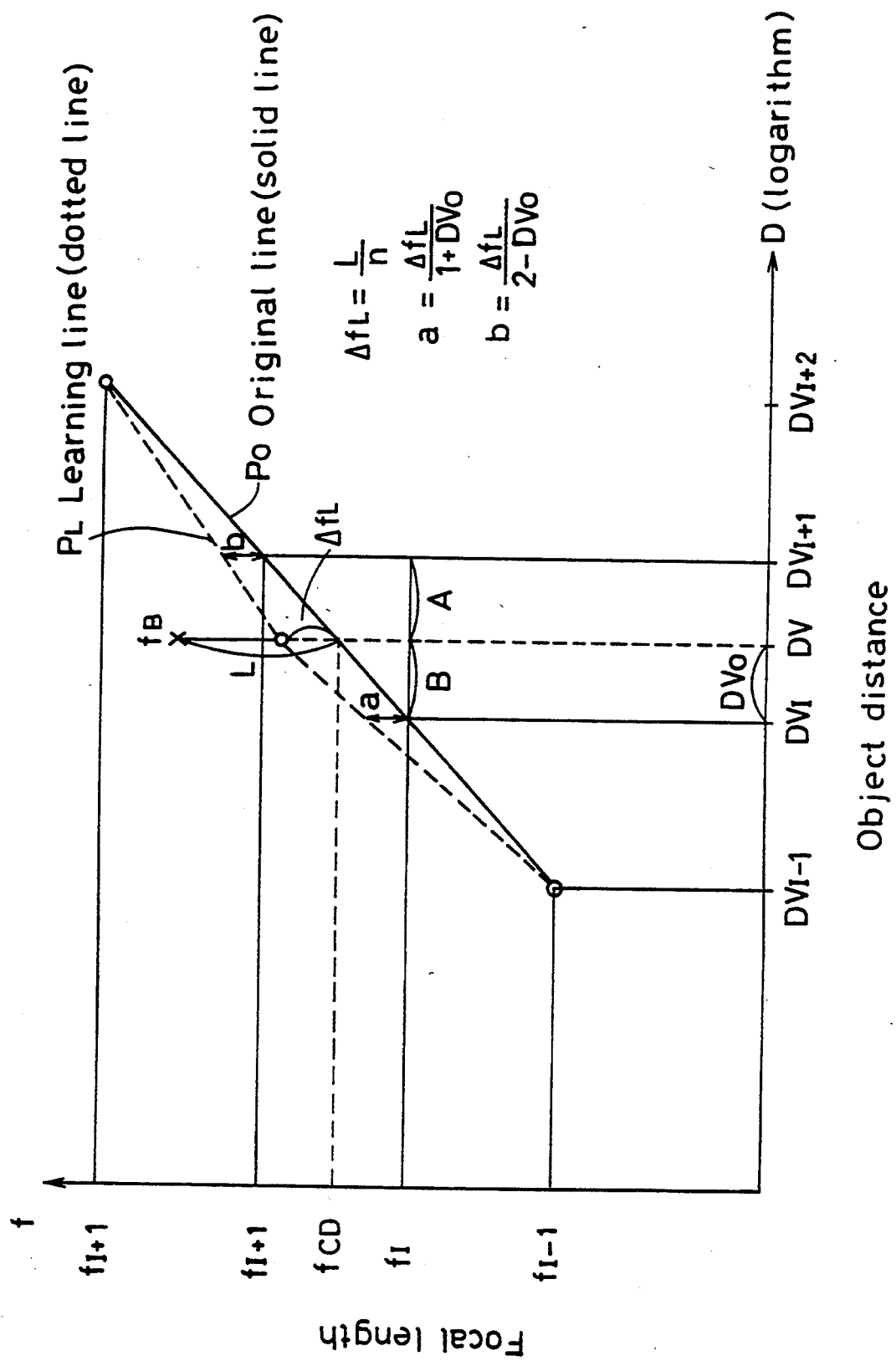
FIG. 40 shows a manner in which learning is performed by Auto Depth Card and Portrait Card.

As shown in FIG. 40, a straight line is drawn on which there are three points: a point with the subject distance DV and the focal length $f_{CD} + \Delta f_L$, a point with the subject distance $DV_{1-1}$ and the focal length $f_{1-1}$, and a point with the subject distance $DV_{1+1}$ and the focal length $f_{1+1}$, and the line drawn as described above is made a learning line. Thus, a focal length $f_1'$, for the subject distance $DV_1$, which is set after learning is obtained by $$f_1' = f_1 + \Delta f_L/(1+DV_o) \quad (4),$$

and a focal length $f_{1+1}'$, for the subject distance $DV_{1+1}$, which is set after learning is obtained by $$f_{1+1}' = f_{1+1} + \Delta f_L/(2-DV_o) \quad (5).$$

These values are stored in the ROM to change the zoom program line.

Figure 39:
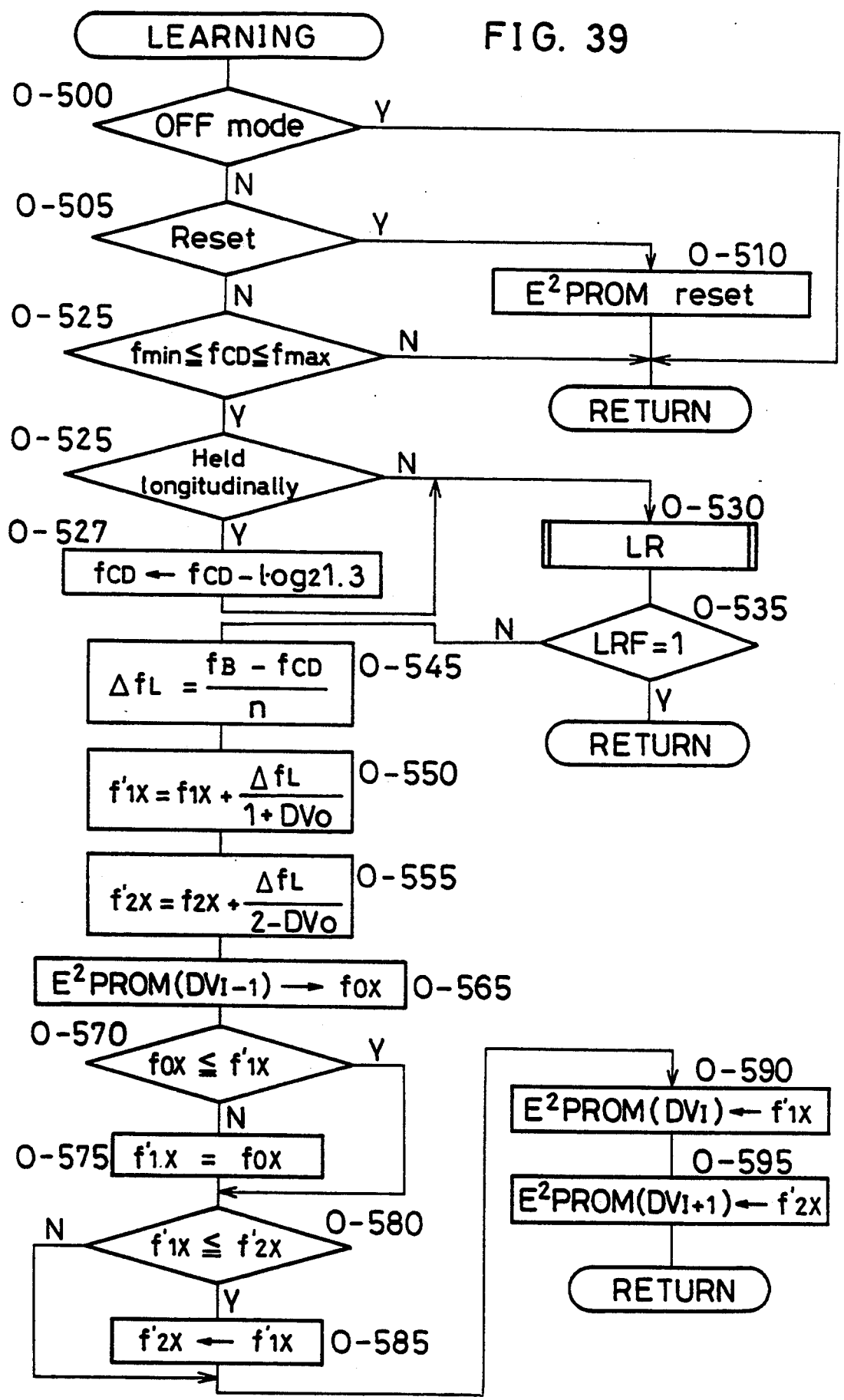
FIG. 39 shows a flow chart of a subroutine LEARNING executed by the in-card microcomputer μC3 of Auto Depth Card.

Returning to the flow chart shown in FIG. 39, the description will be continued from step O-545. At step O-545, the above-described difference $\Delta fL$ is obtained by $$\Delta f_L = (f_B - f_{CD})/n \quad (6).$$

Then, from focal lengths $f_{1x} = f_1$ and $f_{2x} = f_{1+1}$, set before learning, which have already been read out (see steps O-750 to O-755 of FIG. 41C), a focal length $f_{1x}'$, for the subject distance $DV_1$, which is set after the learning is obtained by $$f_{1x}' = f_{1x} + \Delta f_L/(1+DV_o) \quad (7),$$

and a focal length $f_{2x}'$, for the subject distance $DV_{1+1}$, which is set after the learning is obtained by $$f_{2x}' = f_{2x} + \Delta f_L/(2-DV_o) \quad (8)$$

(steps O-550 and O-555). In the zoom program line, the longer a subject distance is, the longer a focal length is. When this relation is reversed (that is, the increase is not monotonous), there are occasions where the user is given inconvenience by a sudden change of a magnification due to a variation of a subject distance. A process for preventing such a reversal of the relation between a subject distance and a focal length is executed at steps O-565 to O-585.

Firstly, a focal length fox corresponding to the subject distance $DV_{1-1}$ is read out from the E²PROM at step O-565, and the focal length $f_{ox}$ is compared with the focal length $f_{1x}'$. When $f_{ox} \leq f_{1x}'$, the process proceeds to step O-580, and when $f_{ox} > f_{1x}'$, the focal length $f_{1x}'$ is set to $$f_{1x}' = f_{ox},$$

and the process proceeds to step O-580 (steps O-570 and O-575). At step O-580, $f_{1x}'$ is compared with $f_{2x}'$. When $f_{1x}' \leq f_{2x}'$, the process proceeds to step O-590, and when $f_{1x}' > f_{2x}'$, the focal length $f_{2x}'$ is set to $f_{1xs}'$, that is, $$f_{2x}' = f_{1xs}', \text{ and}$$

the process proceeds to step O-590 (steps O-580 and O-585). Then, at step O-590, the focal length $f_{1x}'$ obtained as described above is written and stored in the E²PROM by using the subject distance $DV_1$ as an address, and at the next step O-595, the focal length $f_{2x}'$ is written and stored in the E²PROM by using the subject distance $DV_{1+1}$ as an address. Then, the process returns.

Next, a subroutine AE CALCULATION of Auto Depth Card will be described with reference to FIGS. 41A, 41B and 41C.

As already described, an object of Auto Depth Card is to take a picture where both a subject such as a person, etc. and the background are in focus. To achieve the object of the card, an aperture value having a range of depth of field from a present position of a subject to infinity is calculated by the following expression (9):

$$F = L_p/(2 \cdot K_{EL} \cdot \alpha \cdot \delta) \quad (9),$$

where:

$L_p$ represents a present movement amount of the AF lens;

$K_{EL}$ represents a converting coefficient for converting a defocus amount into a drive amount; and $\alpha$ and $\delta$ represent constants with respect to a depth. At the above aperture value F, the depth of field covers a range up to infinity when the AF lens is moved by half of the present movement amount Lp from the infinity position.

Figure 41A:
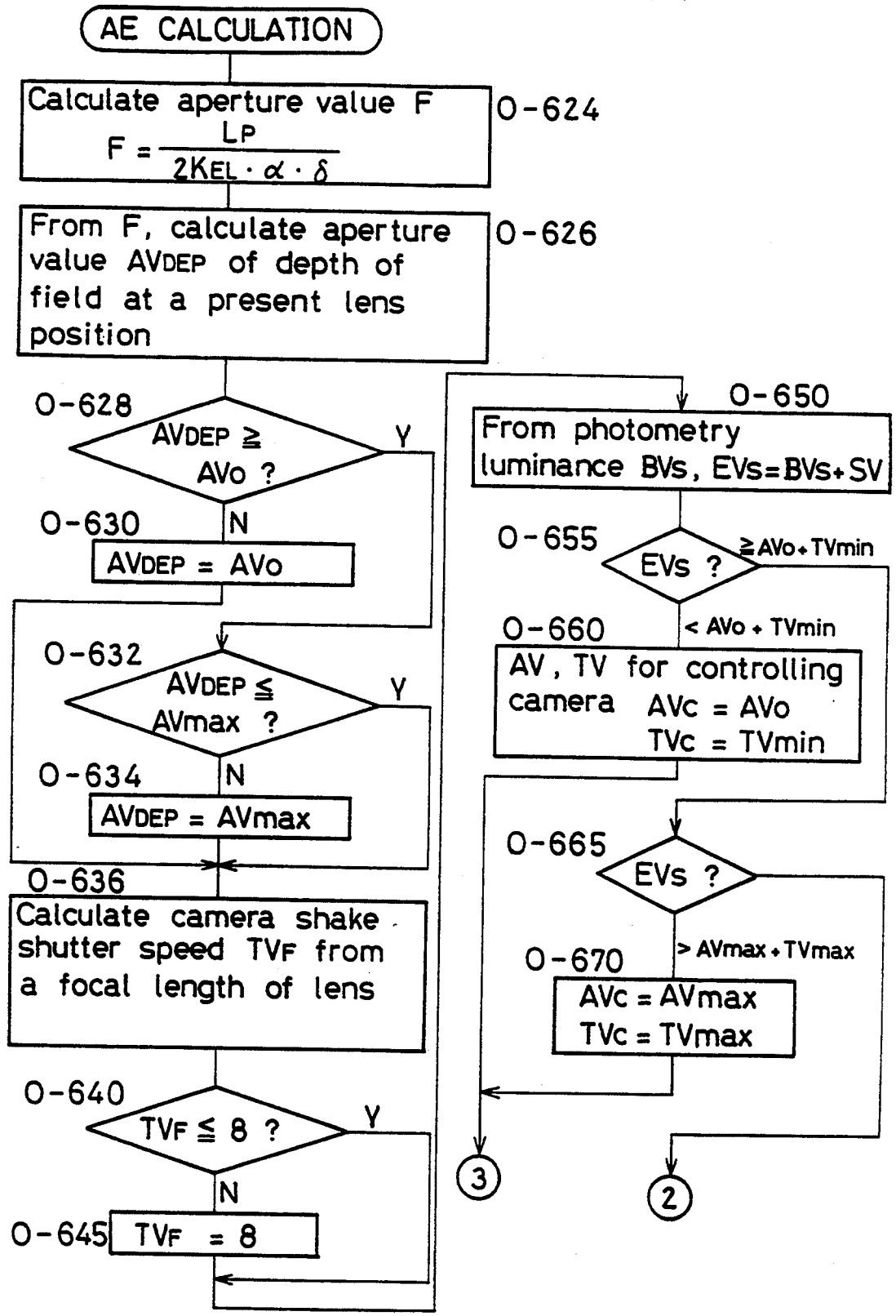
FIGS. 41A, 41B and 41C show a flow chart of a subroutine AE CALCULATION executed by the in-card microcomputer μC3 of Auto Depth Card.
Figure 41B:
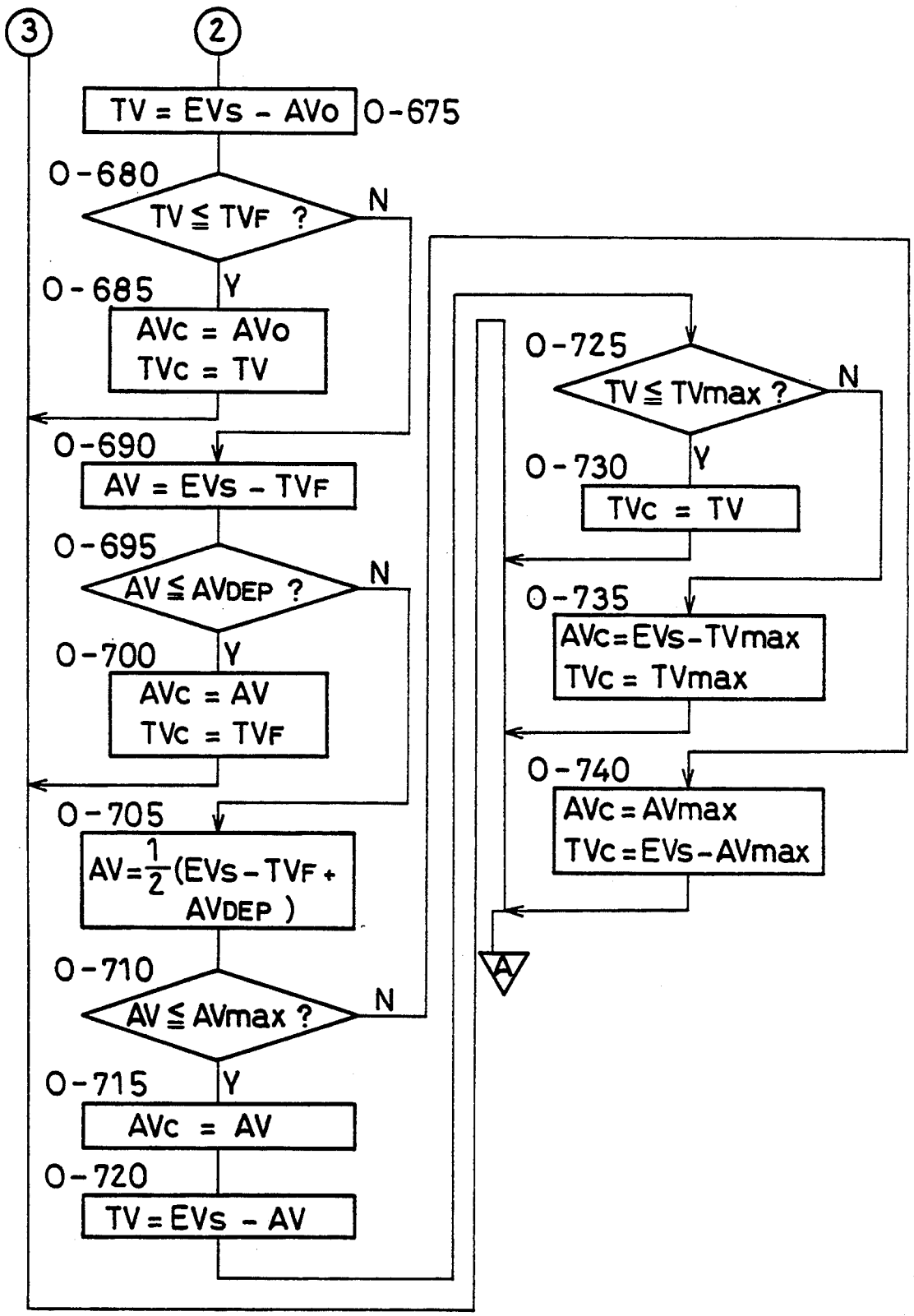

In the flow chart shown in FIG. 41A, the above aperture value F is obtained at step O-624, and an aperture value AVDEP shown by the APEX system (additive system of photographic exposure) is obtained from the aperture value F (step O-626). Then, the lens drive is controlled by calculating a shift amount of the AF lens based on the aperture value AVDEP so that the depth of field covers a range from infinity to a present position of a subject. The control will be described later.

In the above expression (9), the movement amount Lp is 0 when a subject is at infinity, and increases as the subject is closer to the camera. That is, when a subject is at infinity, it is not required to shift the AF lens since the depth of field is large, and the aperture value F is F=0. On the other hand, as a subject is closer, the AF lens has to be largely shifted in order to focus on the background as well as the subject, so that the aperture value F increases. Actually, however, since there is a limit for a range of allowable aperture value, the aperture value AVDEP obtained as described above is set to $AV_o$ when it is smaller than the open aperture value $AV_o$, and to AVmax when it is larger than the maximum aperture value AVmax (steps O-628 to O-634).

Then, at the next step O-636, a reference shutter speed $TV_F$ for a determination of camera shake is calculated by the following expressions (10) and (11):

$$zF_z = 16 \times \log_a f_p/50 + 56 \quad (10); \text{ and}$$

$$TV_F = (zF_z/2 + 16)/8 \quad (11),$$

wherein $f_p$ represents a focal length [mm] of a lens.

Since the longer the focal length is, the more liable a camera shake is to be caused, the reference shutter speed $TV_F$ increases as the focal length increases in the above expressions (10) and (11).

When the reference shutter speed $TV_F$ (a reference value for a determination of camera shake) obtained as described above exceeds a predetermined value (that is $TV_F > 8$), the reference shutter speed $TV_F$ is set to 8 (steps O-640 and O-645). This is in order to prevent a warning of camera shake from being made when the shutter speed exceeds a certain value.

Next, an exposure value $EV_s$ is calculated from a photometry luminance (luminance of a main subject) $BV_s$ (step O-650). Then, whether or not the exposure value $EV_s$ is within a control limit (that is, whether or not it exceeds AVmax+TVmax, or whether or not it is smaller than $AV_o$+TVmin) is determined (steps O-655 and O-665). When the exposure value $EV_s$ is not within the control limit, the control limit is set as the control shutter speed $TV_c$ and the control aperture value $AV_c$ (steps O-660 and O-670).

When the exposure $EV_s$ is within the control limit, the control aperture value AV, and the control shutter speed $TV_c$ are calculated based on the AE program line shown in FIG. 42 at steps O-675 to O-740.

Firstly, a shutter speed is obtained from $TV = EV_s - AV_o$ when an aperture value AV is $AV = AV_o$, and whether or not the shutter speed TV is equal to or smaller than the reference value $TV_F$ for a determination of camera shake is determined (steps O-675 to O-680). When $TV \leq TV_F$, the control aperture value $AV_c$ and the control shutter speed $TV_c$ are respectively set to $$AV_c = AV_o$$

and $$TV_c = TV,$$

and the process proceeds to step O-745. When $TV > TV_F$, the aperture value AV is set to $$AV = EV_s - TV_F,$$

and whether or not the aperture value AV is equal to or smaller than the above-described aperture value AVDEP (an aperture value for making a depth of field cover a range from infinity to a present position of a subject) is determined (step O-695). When $AV \leq AV$-DEP, the control aperture value $AV_c$ and the control shutter speed $TV_c$ are respectively set to $$AV_c = AV$$

and $$TV_c = TV_F,$$

in order to increase the depth of field by closing the aperture as much as possible as well as to give a priority to that a camera shake is not caused (step O-700), and the process proceeds to step O-745.

On the other hand, when AV > AVDEP, since only the same effect is obtained even if the aperture is closed by more than AVDEP, the aperture value AV is obtained based on a program line (shown in FIG. 42) for increasing the aperture value AV and the shutter speed TV at the same rate (step O-705). Then, whether or not the obtained aperture value AV is equal to or smaller than the maximum aperture value AVmax is determined (step O-710). When AV > AVmax, the control aperture value $AV_c$ and the control shutter speed $TV_c$ are respectively set to $$AV_c = AVmax$$

and $$TV_c = EV_s - AVmax,$$

(step O-740), and the process proceeds to step O-745. On the other hand, when $AV \leq AVmax$, the control aperture value $AV_c$ is set to $$AV_c = AV$$

and the shutter speed TV, to $$TV = EV_s - AV,$$

and whether or not the shutter speed TV is equal to or smaller than the maximum shutter speed TVmax is determined (steps O-715 to O-725). When $TV \leq TVmax$, the control shutter speed $TV_c$ is set to $$TV_c = TV,$$

and the process proceeds to step O-745. When TV > TVmax, the control shutter speed $TV_c$ is set to $$TV_c = TVmax,$$

and the control aperture value $AV_c$ is obtained again by $$AV_c = EV_s - TVmax$$

(steps O-725 to O-735). Then, the process proceeds to step O-745.

Based on the control aperture value $AV_c$ and the control shutter speed $TV_c$ obtained as described above, the in-body microcomputer $\mu C1$ controls an exposure. In addition, the in-body microcomputer $\mu C1$ controls the lens drive for shifting the AF lens so that the depth of field covers a range from infinity to a present position of a subject.

Figure 43:
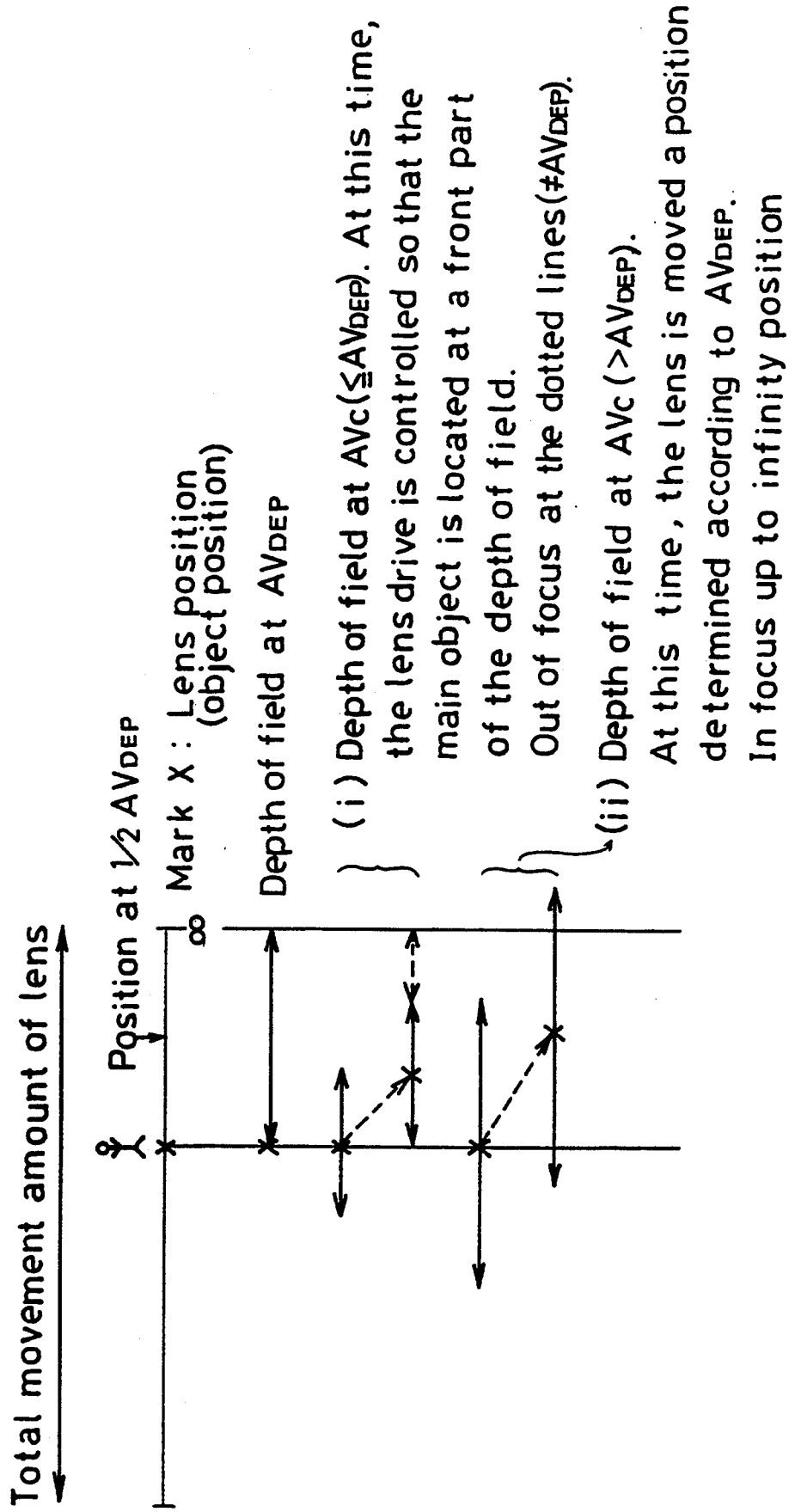
FIG. 43 is an explanatory view of an AF lens drive control for taking a picture, with Auto Depth Card, where both a main object and the background are in focus.

The control of the lens drive will be described with reference to FIG. 43. In the figure, a mark X shows a position of a lens (or a position of a main subject which becomes in focus when the lens is located at the position), and a solid line having an arrow shows a range of a depth of field. As shown in the figure, when the control aperture value $AV_c$ is equal to or smaller than the aperture value AVDEP, the lens is moved so that a main subject is located at a front part of the depth of field, since the range of the depth of field is narrower and closer than that of the depth of field corresponding to the aperture value AVDEP. At this time, an in-focus condition is not obtained with respect to a range shown by a dotted line having an arrow. On the other hand, when the control aperture value $AV_c$ exceeds the aperture value AVDEP, the range of the depth of field is, as a whole, larger as well as closer than that of the depth of field corresponding to the aperture value AVDEP. For this reason, the lens is moved to a position which is determined according to the aperture value AVDEP (a position of the lens where the depth of field covers a range from infinity to a main subject when an aperture value is the aperture value AVDEP). At this time, a range up to infinity is in focus.

Figure 41C:
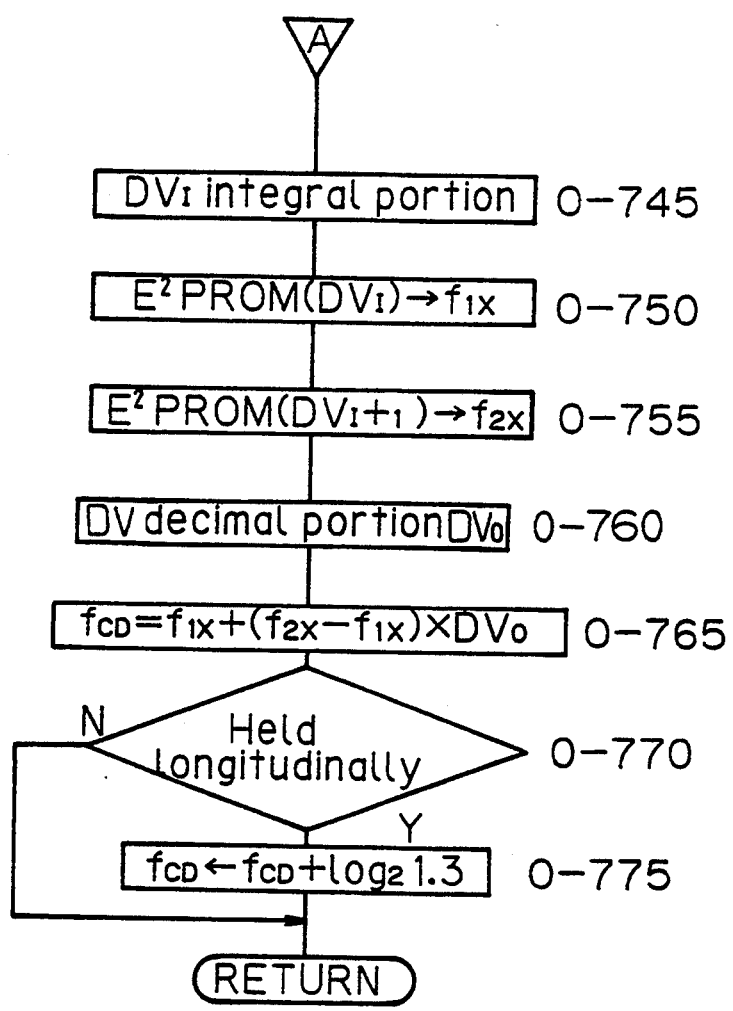

Returning to the flow chart shown in FIG. 41C, the description will be continued from step O-745. At steps from O-745, a calculation (APZ calculation) of the focal length $f_{CD}$ corresponding to a subject distance is performed based on a zoom program line shown in FIG. 44.

Firstly, an integer portion $DV_1$ of the subject distance DV (distance information shown in a logarithmic form) is taken out, a table in the ROM is accessed by using the integer portion $DV_1$ as an address to read out a focal length $f_{1x}$ (a logarithm), and a focal length $f_{2x}$ (a logarithm) is similarly read out by using an integer $DV_{1+1}$ which is larger than the $DV_1$ by 1 as an address (steps O-745 to O-755). Subsequently, a decimal portion $DV_o$ of the subject distance DV is taken out, and the focal length $f_{CD}$ corresponding to the subject distance DV is obtained by $$f_{CD} = f_{1x} + (f_{2x} - f_{1x}) \times DV_o \qquad (12)$$

(steps O-760 and O-765). At the next step O-770, whether or not the camera is longitudinally held is determined. When the camera is not longitudinally held, the process returns. When the camera is longitudinally held, after the focal length is increased by 1.3 times (since the focal length is shown in a logarithmic form, log1.3 is added to the $f_{CD}$), the process returns (step O-775).

A result of the learning in the subroutine LEARNING is reflected on the values of the focal lengths $f_{1x}$ and $f_{2x}$ used for the calculation by the above expression (12) (see steps O-590 and O-595 of FIG. 39). Thus, the result of the learning is also reflected on the focal length $f_{CD}$ obtained as described above. A change of the zoom program line (values of $f_{1x}$ and $f_{2x}$) by learning is limited to the learning range shown in FIG. 44.

Lastly, Portrait Card will be described.

Portrait Card is a card suitable for taking a picture of a person, such as portraits, etc. When photographing is performed with this card attached to the camera body, the camera is so controlled that a size of a person is judged by a magnification to determine an appropriate aperture value, so that photographing is performed at a depth of field according to the size of the person. The operation of the card will hereinafter be described.

Figure 45:
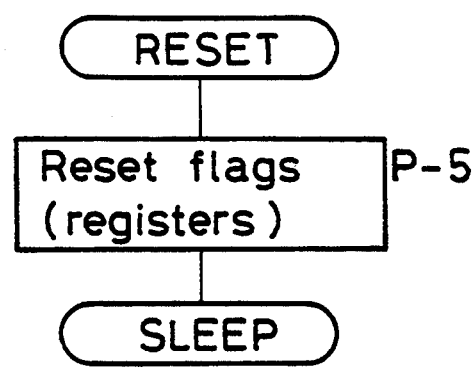
FIG. 45 shows a flow chart of a routine RESET executed by the in-card microcomputer μC3 of Portrait Card which is attached to the camera body.
Figure 46:
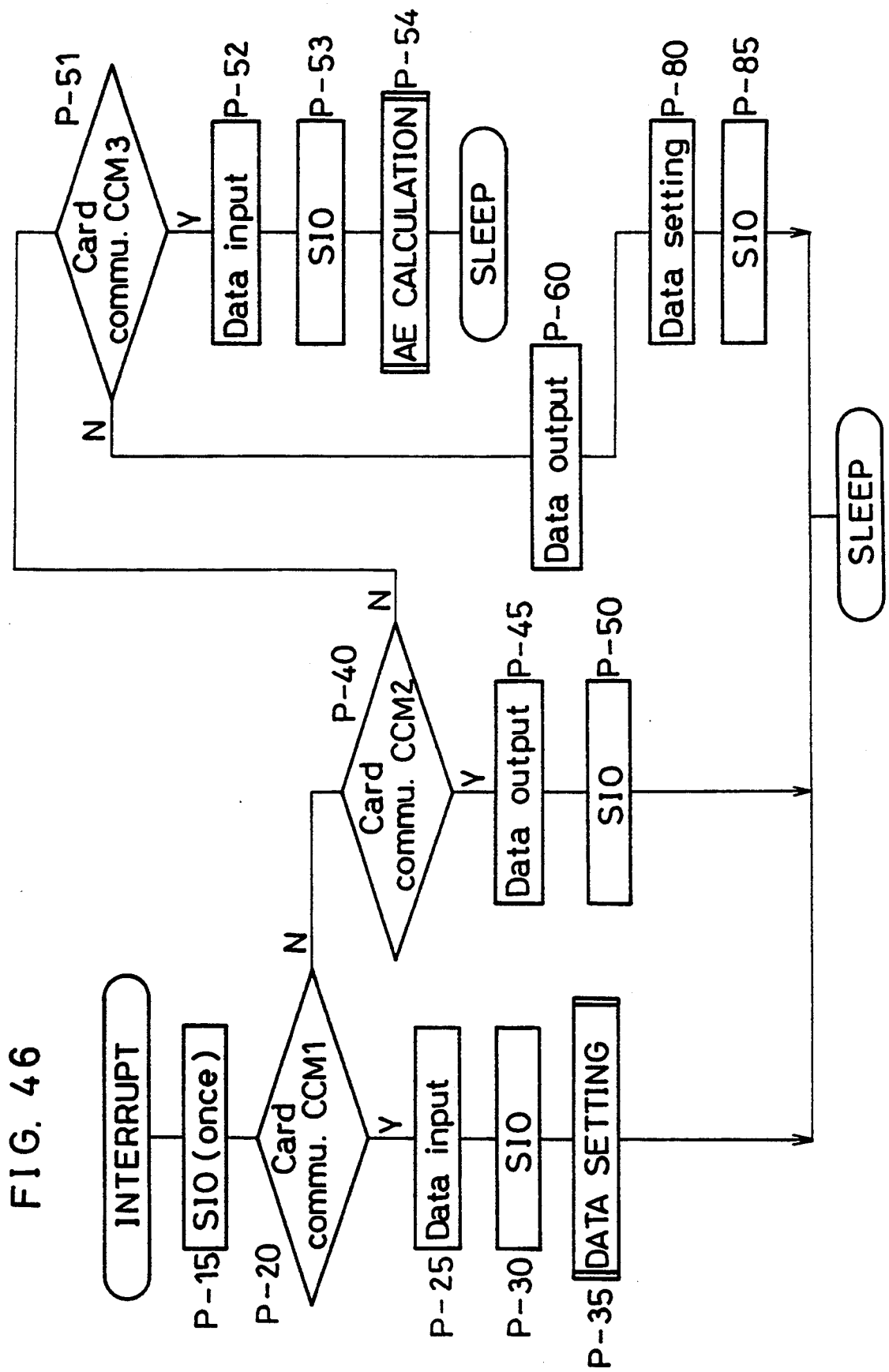
FIG. 46 shows a flow chart of a routine INTERRUPT executed by the in-card microcomputer μC3 of Portrait Card.

When Portrait Card is attached to the camera body, a routine RESET shown in FIG. 45 is executed, and when a signal whose level changes from low to high is transmitted from the in-body microcomputer $\mu C1$ to the terminal CSCD of the card, a routine INTERRUPT shown in FIG. 46 is executed. The description of the routines RESET and INTERRUPT is omitted, since they are the same as the routines RESET (shown in FIG. 35) and INTERRUPT (shown in FIG. 36) of Auto Depth Card, respectively.

Figure 47:
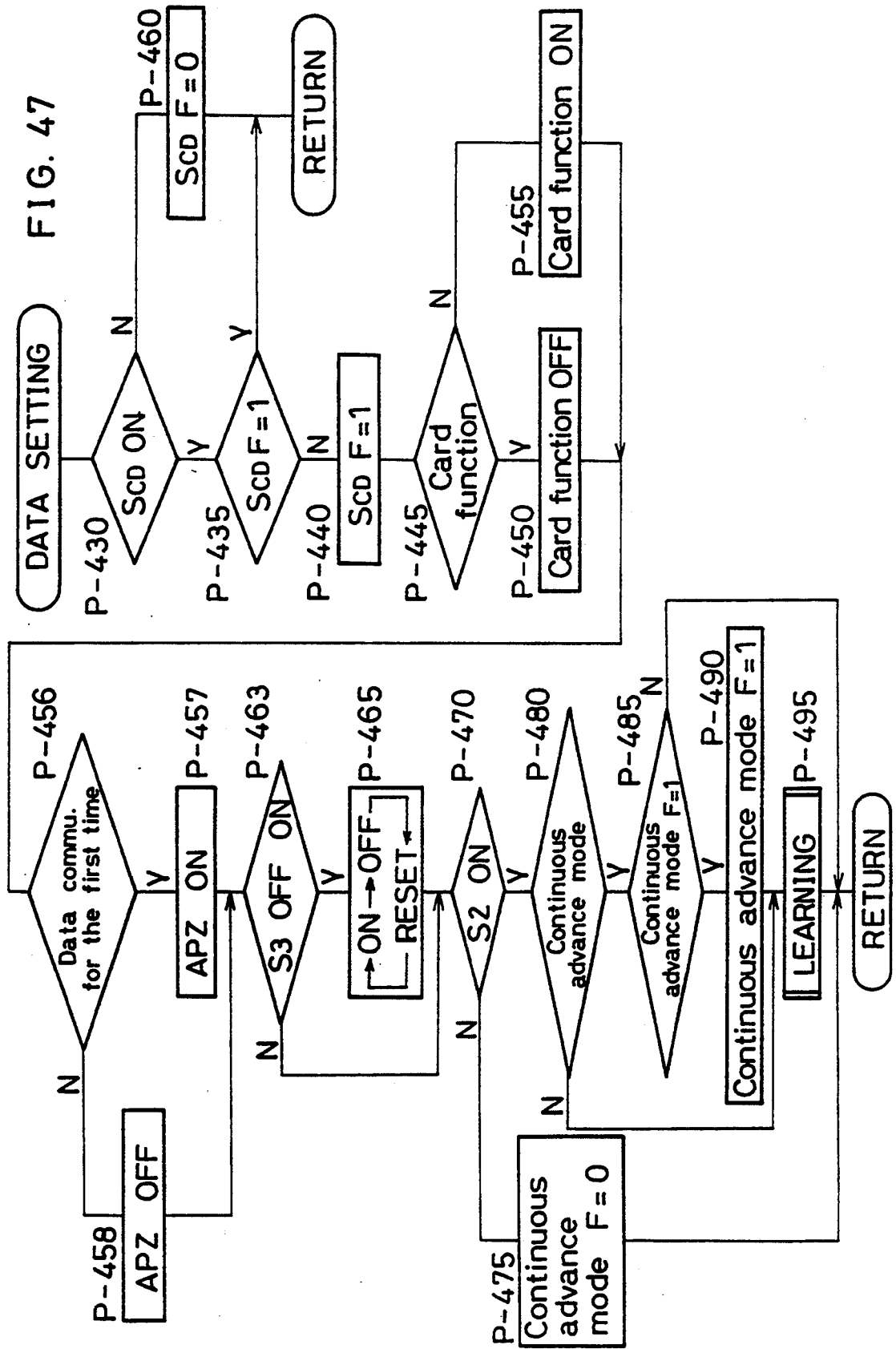
FIG. 47 shows a flow chart of a subroutine DATA SETTING executed by the in-card microcomputer μC3 of Portrait Card.

A subroutine DATA SETTING shown in FIG. 47 is different from the subroutine DATA SETTING (shown in FIG. 38) of Auto Depth Card only in that at a determination whether or not the focal length and the magnification should be learned (see FIG. 48) in a subroutine LEARNING (shown in FIG. 49) called from the subroutine DATA SETTING, the range of the focal length $f_B$ to be learned and that of the magnification $\beta$ to be learned are respectively $$35 \leq f_B \leq 300$$

and $$1/10 \leq \beta \leq 1/80.$$

As the other part of the subroutine DATA SETTING (shown in FIGS. 47 to 49) is the same as that of Auto Depth Card (shown in FIGS. 37 to 39), the description thereof is omitted.

Figure 50A:
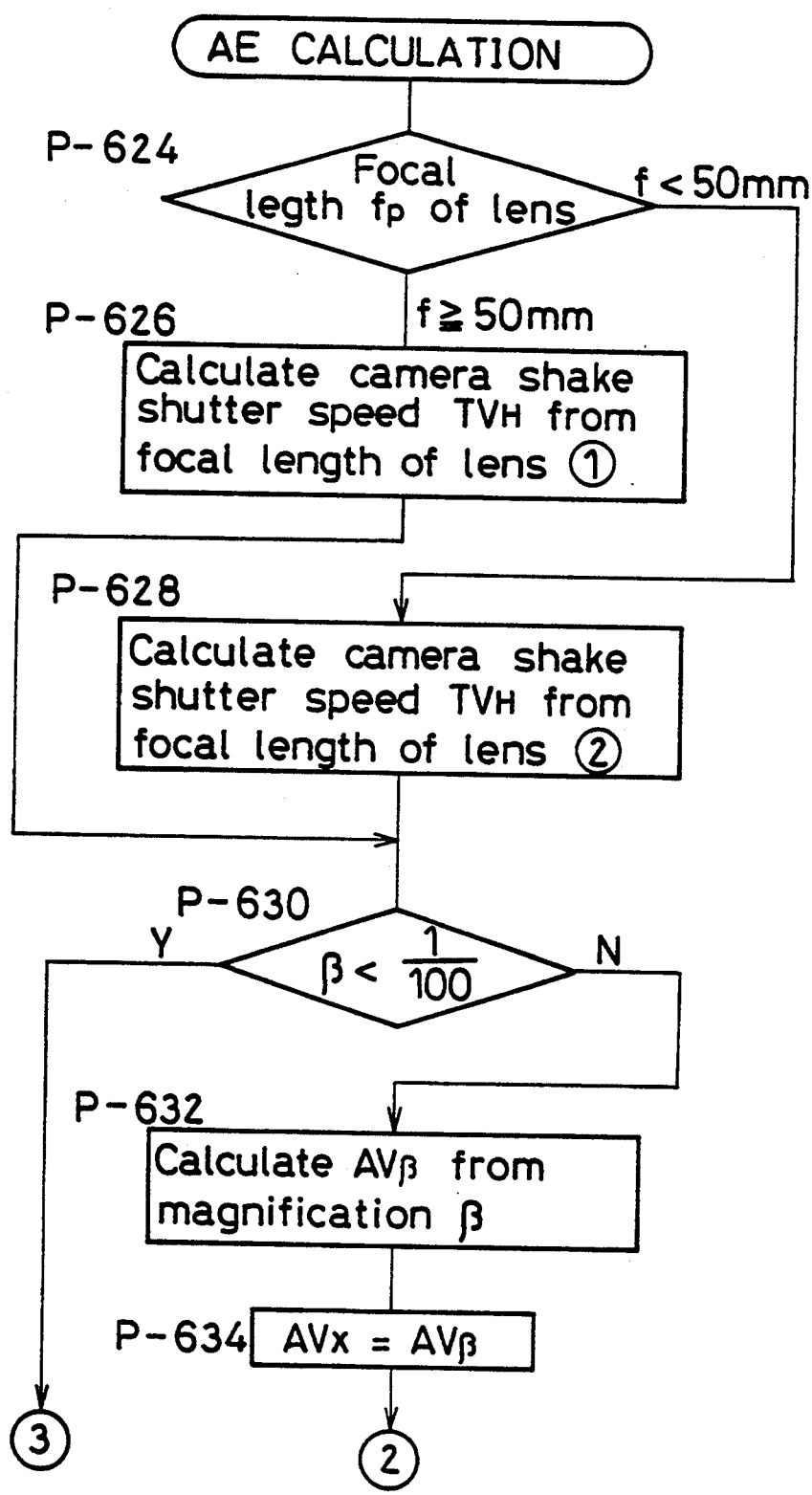
FIGS. 50A, 50B and 50C show flow chart of a subroutine AE CALCULATION executed by the in-card microcomputer μC3 of Portrait Card.
Figure 50B:
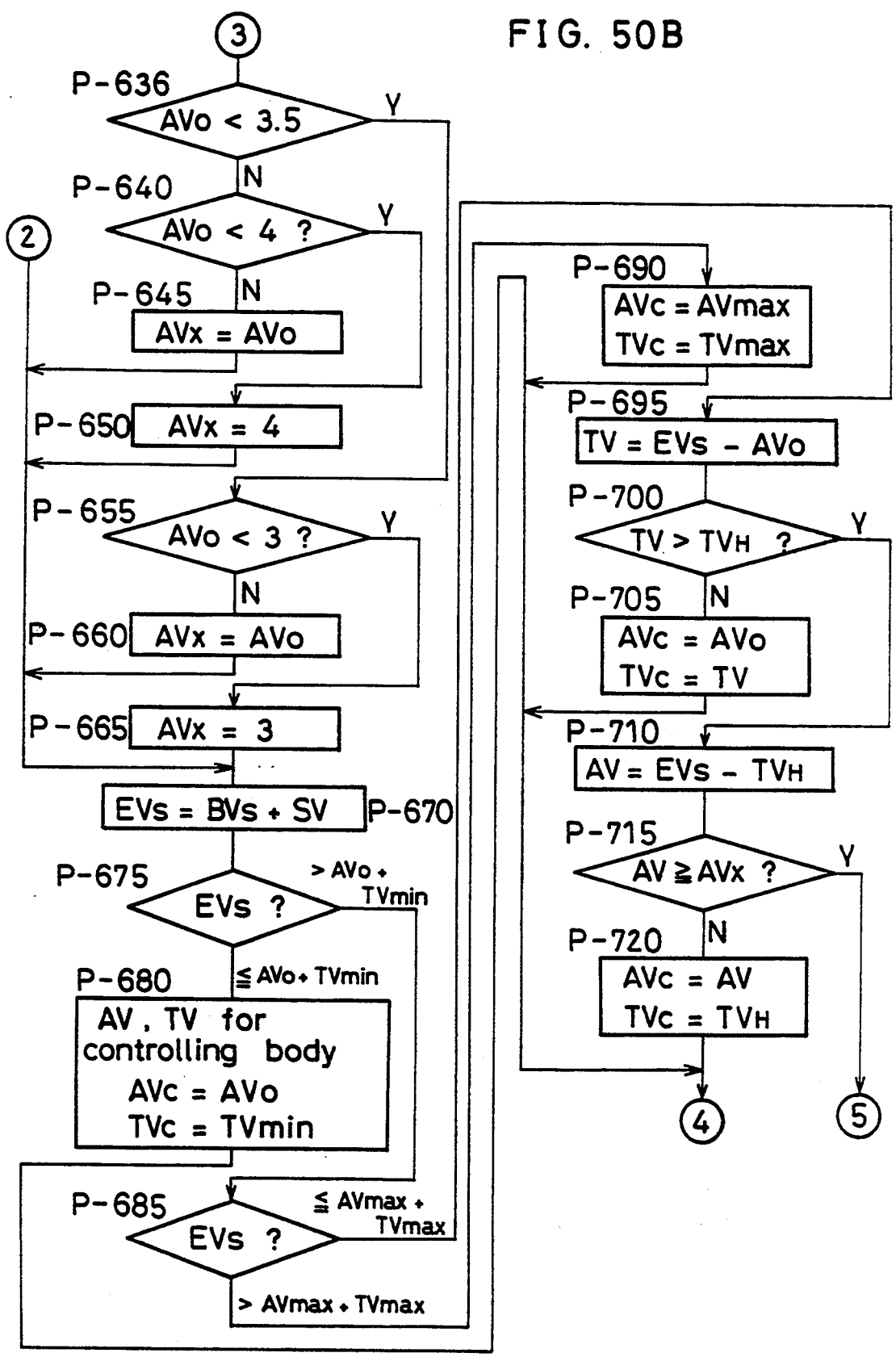
Figure 50C:
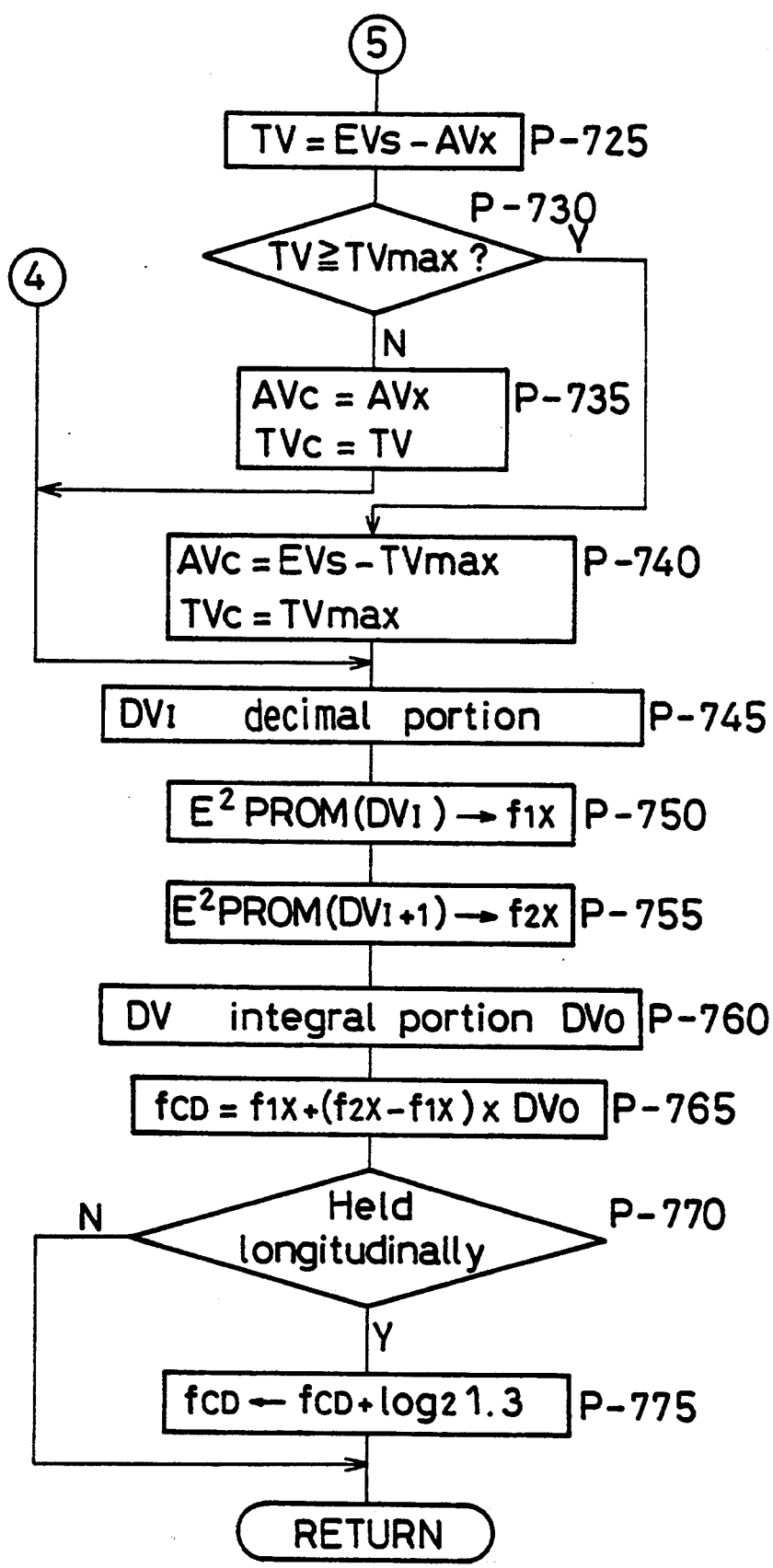

A subroutine AE CALCULATION will be described with reference to FIGS. 50A, 50B and 50C.

When the subroutine is called, firstly, whether or not the focal length $f_p$ (the present focal length inputted from the in-body microcomputer $\mu C1$ at step P-53 of FIG. 46) of the lens is equal to or longer than 50 mm is determined at step P-624, and based on a result of the determination, the reference shutter speed $TV_H$ for a determination of camera shake is obtained. That is, when $f_p \geq 50$ mm, the reference shutter speed $TV_H$ is calculated by the following expressions (13) and (14) (step P-626):

$$zFz = 16 \times \log_2 f_p / 50 + 56 \qquad (13); \text{ and}$$

$$TV_H = 1.25 \times (zFz/2 - 56)16 + 5.875 \qquad (14),$$

where $f_p$ represents a focal length of the lens. Since the longer a focal length is, the more liable a camera shake is to be caused even at a high shutter speed, in the above expressions, the longer a focal length is, the higher the reference shutter speed $TV_H$ is. On the other hand, since a warning is made when a shutter speed is extremely low even with a wide-angle lens, the reference shutter speed $TV_H$ is calculated by the following expressions when $f_P < 50$ mm (step P-628):

$$zFz = 16 \times \log_2 f_p / 50 + 56 \qquad (15); \text{ and}$$

$$TV_H = 1.125 \times (zFz/2 - 56)/16 + 5.875 \qquad (16),$$

where $f_p$ represents a focal length [mm] of the lens.

Figure 52:
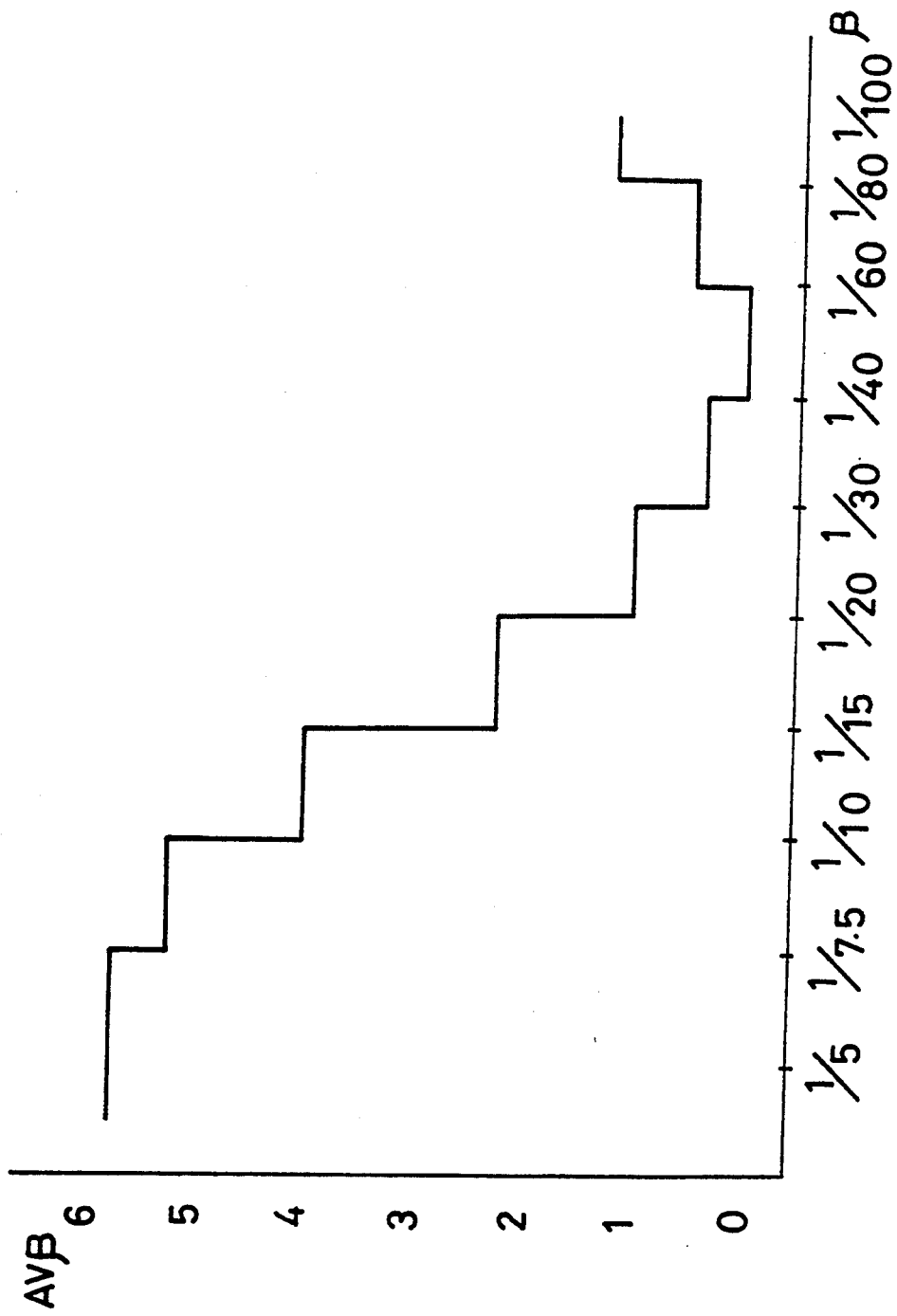
FIG. 52 shows a program lines, of Portrait Card, for providing a relation between a magnification and an aperture value.

Then, whether or not the magnification $\beta$ is smaller than 1/100 is determined at step P-630. When $\beta \geq 1/100$, an aperture value $AV\beta$ is obtained from the magnification $\beta$ based on a program line shown in FIG. 52, an aperture value $AV_x$ is set to $$AV_x = AV\beta,$$

and the process proceeds to step P-670 (steps P-632 to P-634). The program line shown in FIG. 52 is a program line for providing a relation between the magnification $\beta$ and the aperture value $AV\beta$. By using the magnification $\beta$ as an address, the aperture value $AV\beta$ corresponding thereto is written and stored in the $E^2$-PROM, etc.

On the other hand, when $\beta < 1/100$, since a main subject is taken in a small size and, consequently, it is difficult to distinguish the main subject from the background, the aperture value $AV_x$ is determined according not to the magnification $\beta$ but to the open aperture value $AV_o$ as follows (steps P-636 to P-665):

$AV_x = 3$ when $AV_o < 3$;
$AV_x = AV_o$ when $3 \leq AV_o < 3.5$;
$AV_x = 4$ when $3.5 \leq AV_o < 4$; and
$AV_x = AV_o$ when $4 \leq AV_o$.

With such settings, in a lens having a small F number, the aperture is rather closed to increase a depth of field so that the background is only slightly out of focus.

The aperture value $AV_x$ obtained as described above is the aperture value to be set in a photographing with Portrait Card. Actually, however, considering a control limit of an aperture value and shutter speed and a camera shake, the control aperture value $AV_c$ is obtained along with the control shutter speed $TV_c$. A calculation of the control shutter speed $TV_c$ and the control aperture value $AV_c$ will hereinafter be described.

Firstly, the exposure value $EV_s$ is obtained by $$EV_x = BV_x + SV$$

at step P-670, and whether or not the exposure value $EV_s$ is within a control limit is determined (steps P-675 to P-685). When the exposure value $EV_s$ is not within the control limit, the control shutter speed $TV_c$ and the control aperture value $AV_c$ is set to the control limit. That is, when the exposure value $EV_s$ is equal to or smaller than the minimum control value $AV_o + TVmin$, the control aperture value $AV_c$ and the control shutter speed $TV_c$ are respectively set to $$AV_c = AV_o$$

and $$TV_c = TVmin$$

(step P-680), and when the exposure value $EV_s$ exceeds the maximum control value $AVmax + TVmax$, the above two are respectively set to $$AV_c = AVmax$$

and $$TV_c = TVmax$$

(step P-690).

On the other hand, when it is determined that the exposure value $EV_s$ is within the control limit, a shutter speed $TV = EV_s - AV_o$ at the open aperture value $AV_o$ is obtained, and whether or not the shutter speed $TV$ exceeds the reference shutter speed $TV_H$ for a determination of camera shake is determined (step P-700). When $TV \leq TV_H$, the control aperture value $AV_c$ and the control shutter speed $TV_c$ are respectively set to $$AV_c = AV_o$$

and $$TV_c = TV$$

to increase the shutter speed as much as possible (step P-705).

On the other hand, when $TV > TV_H$, an aperture value $AV = EV_s - TV_H$ when a shutter speed is the reference value for a determination of camera shake is obtained, and whether or not the aperture value $AV$ is equal to or larger than the aperture value $AV_x$ obtained from the above-described program line is determined (step P-715). When $AV < AV_x$, the control aperture value $AV_c$ and the control shutter speed $TV_c$ are respectively set to $$AV_c = AV$$

and $$TV_c = TV_H$$

(step P-720) so that the control aperture value $AV_c$ approaches the aperture value $AV_x$ as much as possible without a camera shake being caused. When $AV \geq AV_x$, a shutter speed $TV = EV_s - AV_x$ at the aperture value $AV_x$ is obtained, and whether or not the shutter speed $TV$ is equal to or larger than the maximum shutter speed $TVmax$ is determined (step P-725 and P-730). When $TV < TVmax$, the control aperture value $AV_c$ and the control shutter speed $TV_c$ are respectively set to $$AV_c = AV_x$$

and $$TV_c = TV \text{ (step P-735)}.$$

When $TV \geq TVmax$, the above two are respectively set to $$AV_c = EV_a - TV_{max}$$

and $$TV_c = TVmax$$

(step P-740).

Figure 51:
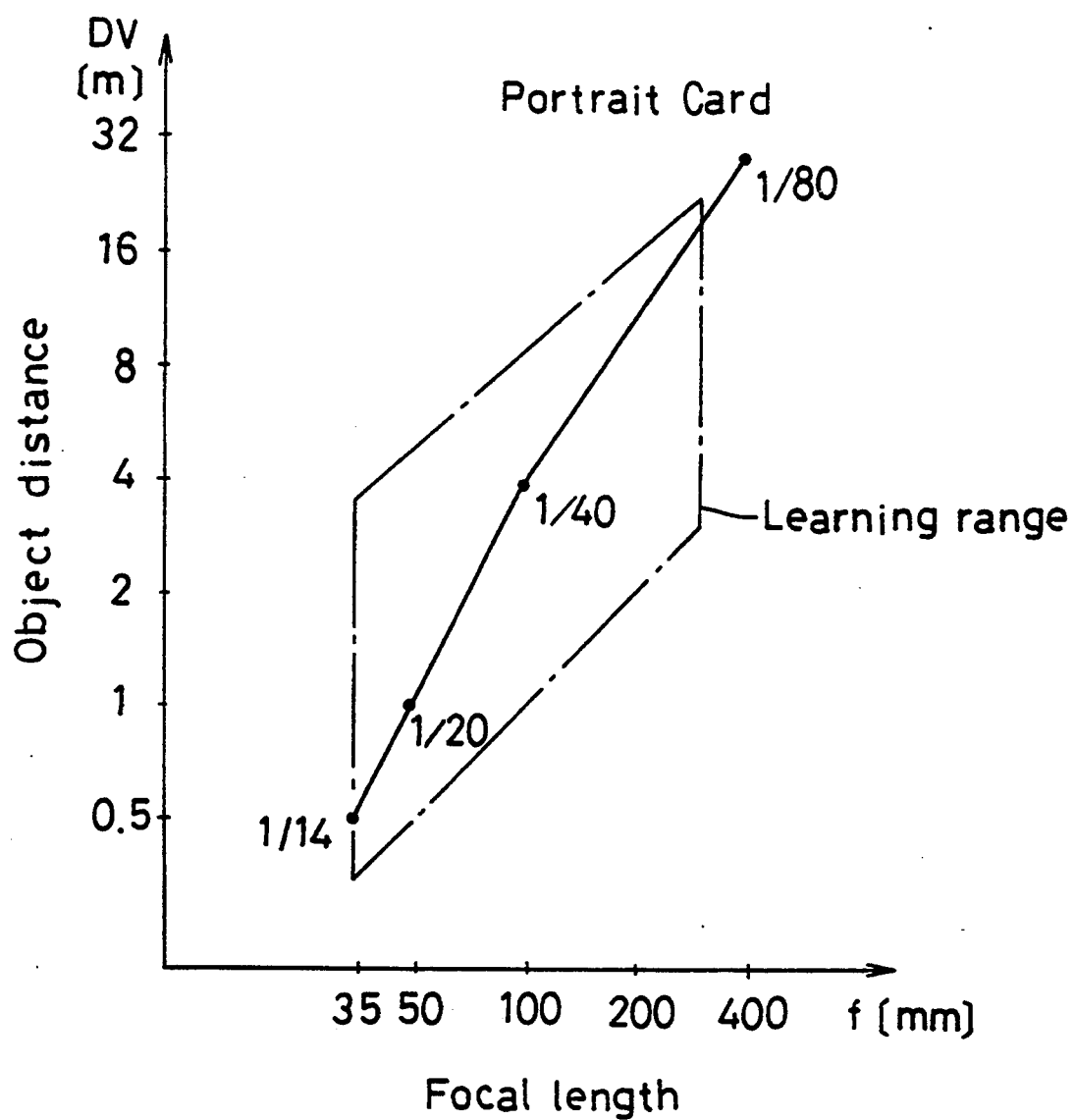
FIG. 51 shows a zoom program line of Portrait Card.

After the control aperture value $AV_c$ and the control shutter speed $TV_c$ are determined as described above, a process of the APZ calculation from step P-745 is executed. The description thereof is omitted, since the process is the same as that (steps O-745 to O-775 of FIG. 41C) of Auto Depth Card. The zoom program line for Portrait Card is shown by FIG. 51. In Portrait Card, similarly to in Auto Depth Card, the zoom program line can be changed by learning within the learning range shown in FIG. 51, and a result of the learning is reflected on the focal length $f_{CD}$ obtained by the APZ calculation.

Finishing a description of the IC cards, a summary of this embodiment will hereinafter be given.

As described above, according to this embodiment, a learning on zooming is performed by the in-card microcomputer $\mu C3$ when the release switch S2 is turned on (step S-470 of FIG. 29). For example, when Sports Card is being used, where a result of the learning is stored in the E²PROM provided in the card as the difference $\Delta f$ from the original zoom program line, the difference $\Delta f$ is changed based on the change amount $\Delta f_x$ of a focal length due to a manual zooming when the release switch S2 is turned on (steps S-545 to S-555 of FIG. 32). The change amount $\Delta f1$ of a focal length is a difference $f_b - f_{CD}$ (although it is actually a ratio, it is represented as a difference since focal lengths are shown in a logarithmic form) between the actual focal length $f_B$ (the latest focal length in actual photographing) of the camera and the focal length $f_{CD}$ obtained by the in-card microcomputer $\mu C3$, and the focal length $f_{CD}$ is a focal length corresponding to the subject distance DV obtained by the in-body microcomputer $\mu C1$ (see step #1137 of FIG. 20) from the zoom program line (see steps S-830 to S-870 of FIG. 30B). A result of the learning is reflected, since the difference $\Delta f$ obtained as described above is used for calculation of a focal length by the in-card microcomputer $\mu C3$ thereafter (step S-860 of FIG. 30B) so that the APZ operation is performed based on a program line which is made by shifting the original zoom program line as a whole by the difference Δ obtained after the learning.

As described above, when the learning mode is set to the ON mode, learning on zooming is performed (that is, the difference Δf is changed). When the learning mode is set to the OFF mode by an operation of the learning mode switch S3 (steps S-460 to S-465 of FIG. 29), learning on zooming is not performed (that is, the difference Δf is not changed) even if the release switch S2 is turned on (step S-500 of FIG. 32). Moreover, a limitation is placed on a range of the learning on zooming, and the learning is stopped when the range of the learning is outside a predetermined range.

However, a limitation is placed on a range of the above-described learning on zooming. That is, before the difference Δf is changed based on the change amount $\Delta f_1$ of a focal length due to a manual operation, whether or not the actual focal length $f_B$ (the latest focal length in photographing) of a camera is within a predetermined range is determined (step S-530 of FIG. 32 and step 5-605 of FIG. 33). The difference Δf is changed only when it is within the predetermined range (that is, flag LRF=0) (step 5-535 of FIG. 32). Thereby, when the difference (difference between $f_{CD}$ and $f_B$) is too large, the photographing situation is different from the photographing situation for Sports Card. Therefore, determining that it is not an object of this embodiment to change the zoom program line based on the large difference, learning is not performed.

On the other hand, if the release switch 52 is turned on while the learning mode is being set to the reset mode by an operation of the learning mode switch 53 (steps S-460 to S-465 of FIG. 29), the difference Δ stored in the E²PROM provided in the card is reset (Δf=0) to erase contents of the learning (steps S-505 to S-510 of FIG. 32). In this mode, the learning on zooming is not performed (that is, the difference Δf is not changed), either, even if the release switch S2 is turned on. That is, the reset mode according to this embodiment can be considered to be a learning stopping mode including a reset operation of contents of learning.

As described above, according to this embodiment, by operating the learning mode switch S3 at need, the learning function on zooming can be stopped or contents of the learning can be erased. Moreover, Sports Card is provided with information on a range to be learned (that is, a procedure for determining whether or not a range is within a learning range). Based on the information, learning on zooming is automatically stopped when a range is outside a predetermined learning range. That is, the mode is automatically changed between an automatic learning mode and an learning stopping mode according to the information provided to Sports Card.

Further, when Auto Depth Card is being used, different from the case where Sports Card is used, a result of learning is reflected on the zoom program line itself. That is, data representing the zoom program line are stored in the E²PROM provided in the card (that is, a focal length of every integral portion of an subject distance is stored), and when the release switch S2 is turned on (step O-470 of FIG. 37), the data representing the zoom program line is changed based on a change amount $L=f_B-f_{CD}$ of a focal length due to a manual zooming (see FIG. 40). At this time, the data stored in the E²PROM are re-written so that a focal length at the zoom program after the change is changed by $\Delta f_L = L/n = (f_B - f_{CD})/n$ (steps O-545 to O-595 of FIG. 39), where n represents an integral number and the value thereof is experimentally determined. It is in order to prevent the zoom program line from becoming unstable by being largely changed by learning that the value $\Delta f_L$ obtained by decreasing a change amount of a focal length L is used as described above. A result of the learning is reflected, since the zoom program line changed as described above is used for a calculation of the focal length $f_{CD}$ by the in-card microcomputer $\mu C3$ (steps O-745 to O-775) so that the APZ operation is performed based on the changed zoom program line. The learning on zooming used by Portrait Card is the same as that of Auto Depth Card.

In the continuous advance mode where photographing is continuously performed at predetermined intervals while the release switch S2 is ON, the subroutine LEARNING (shown in FIG. 32) is called at a photographing of the first frame in a single continuous photographing (steps S-480 to S-495, etc. of FIG. 29) to perform a learning on zooming (steps S-545 to S-555 of FIG. 32). However, the subroutine LEARNING is not called for a photographing of the second and succeeding frames (steps S-485). Thereby, it is avoided that similar photographing scenes are repeatedly learned, and only different photographing scenes are learned.

Figure 44:
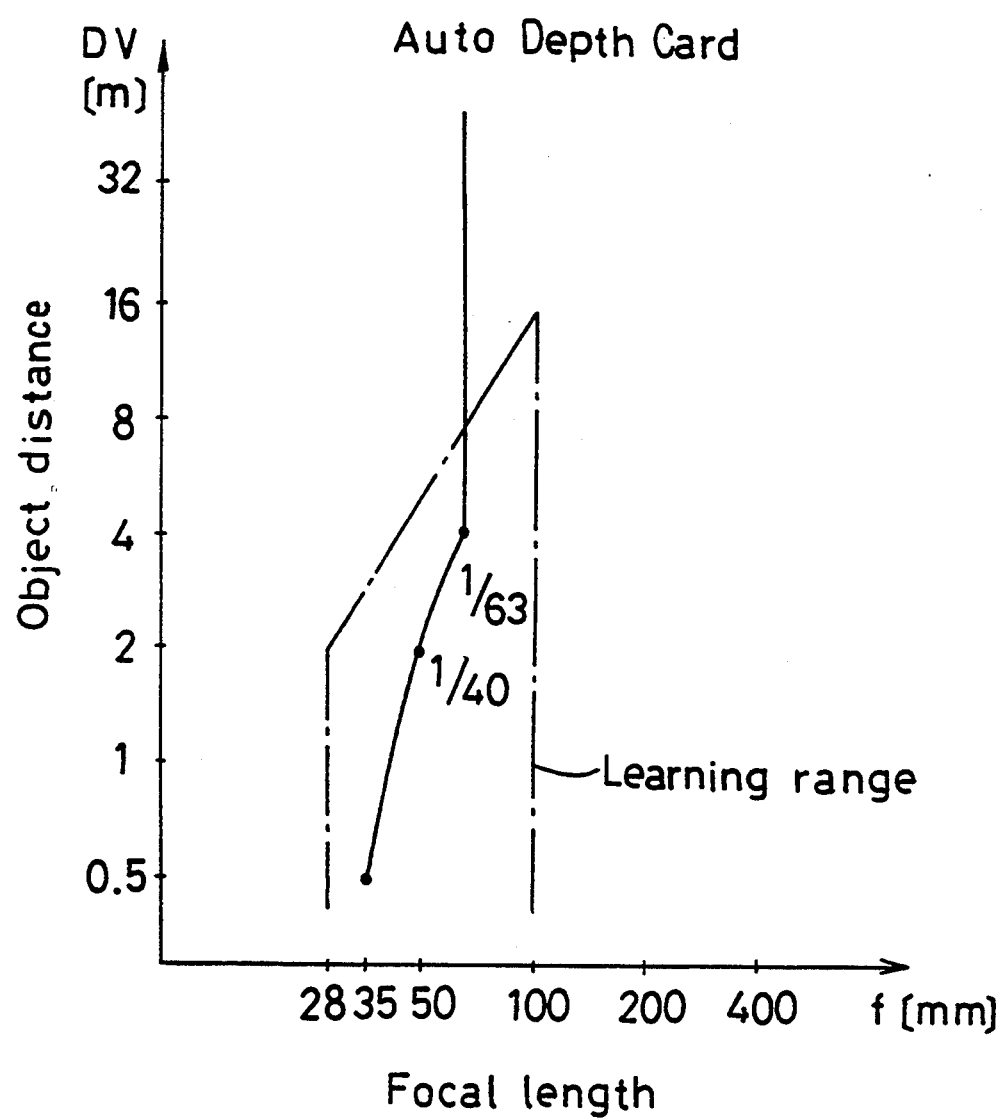
FIG. 44 shows a zoom program line of Auto Depth Card.

However, similar to the above-described case where Sports Card is used, a limitation is placed on a range of the learning on zooming in a case where Auto Depth Card or Portrait Card is used (see FIGS. 44 and 51). That is, before the zoom program line is changed based on the change amount $L=f_B-f_{CD}$ of a focal length due to a manual operation, whether or not the actual focal length $f_B$ (the latest focal length in photographing) of a camera and the magnification β are within a predetermined range is determined (steps O-530 of FIG. 39 and step P-530 of FIG. 49, and steps O-605 to O-615 of FIG. 38 and steps P-605 to P-615 of FIG. 48). The zoom program line is changed only when both of them are within the predetermined range (flag LRF=0) (step O-535 of FIG. 39 and step P-535 of FIG. 49). Thereby, learning is not performed when it is considered that Auto Depth Card or Portrait Card is not suitable for the present photographing situation.

Moreover, according to this embodiment, in a case where Auto Depth Card or Portrait Card is used, similarly to the case where Sports Card is used, learning on zooming can be stopped and contents of the learning can be erased by operating the learning mode switch S3 at need. As described above, learning in this case corresponds to a change of data representing a zoom program line stored in the E²PROM provided in the card. The reset operation of contents of the learning corresponds to returning the data representing a zoom program line stored in the E²PROM to data of the initial condition where no learning on zooming is performed (steps O-505 to O-510 of FIG. 39 and steps P-505 to P-510 of FIG. 49).

Figure 38:
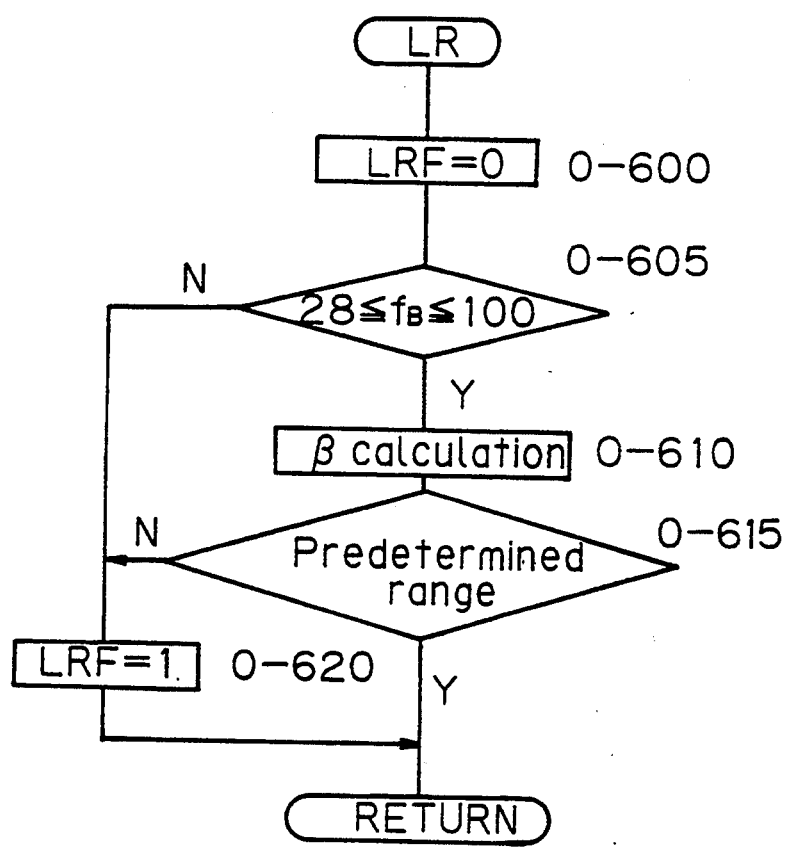
FIG. 38 shows a flow chart of a subroutine LR executed by the in-card microcomputer μC3 of Auto Depth Card.
Figure 48:
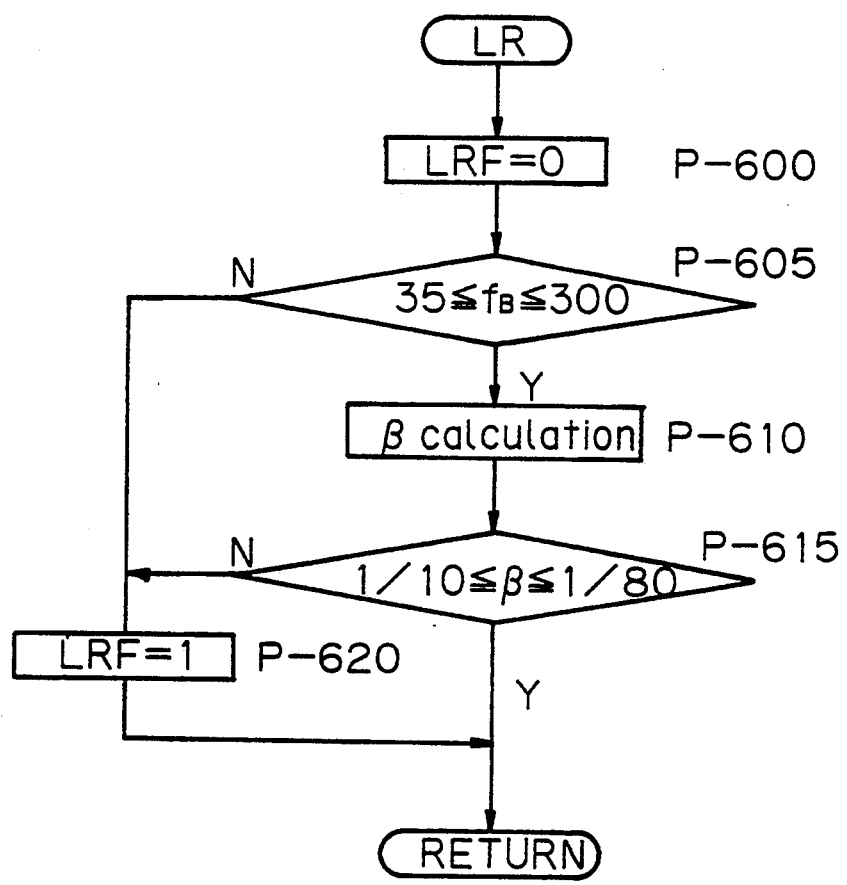
FIG. 48 shows a flow chart of a subroutine LR executed by the in-card microcomputer μC3 of Portrait Card.
Figure 49:
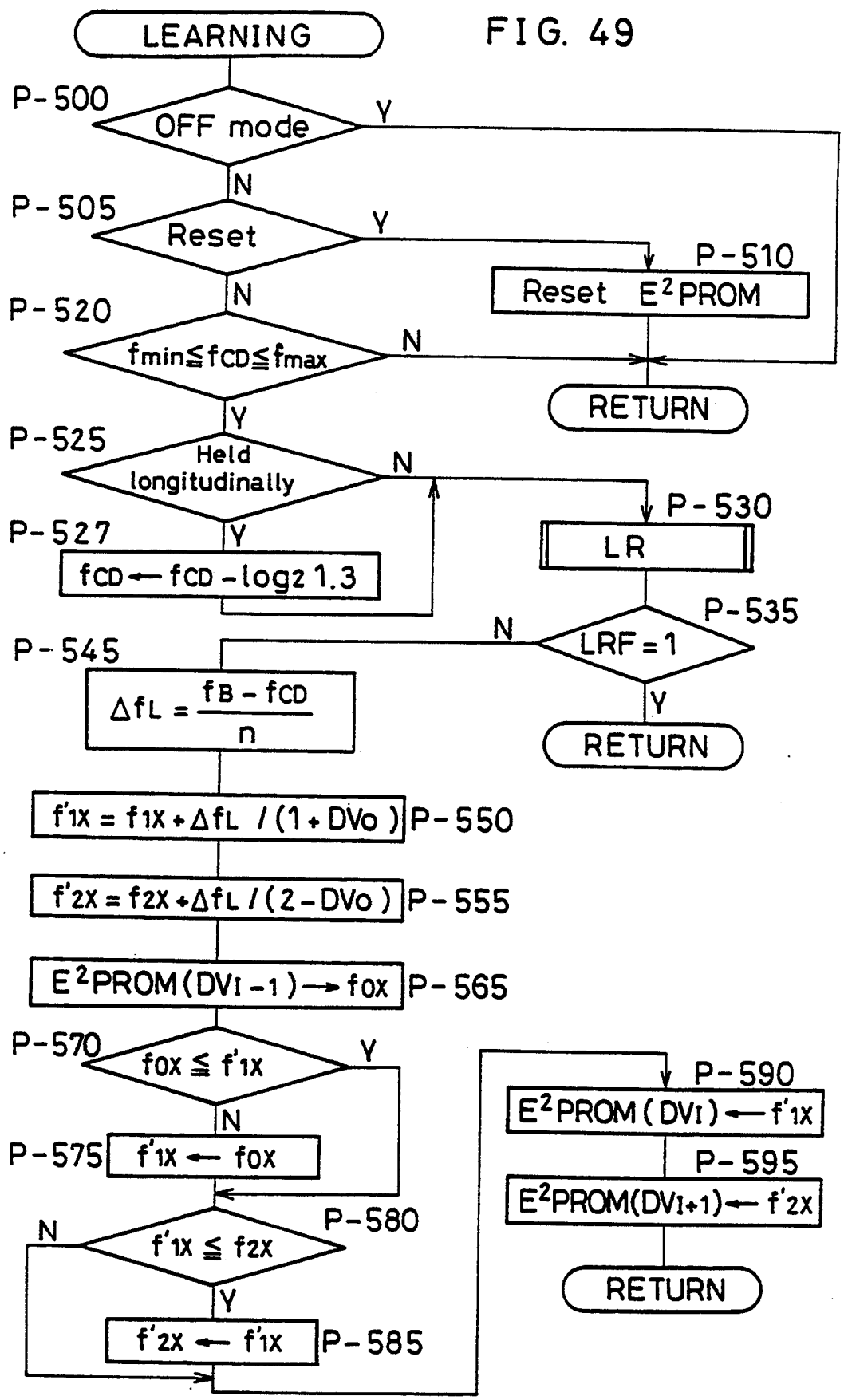
FIG. 49 shows a flow chart of a subroutine LEARNING executed by the in-card microcomputer C3 of Portrait Card.

As well as the above-described function to stop learning or to erase contents of the learning by an operation of the learning mode switch S3, Auto Depth Card and Portrait Card are provided, similarly to Sports Card, with a function to automatically change the mode between the automatic learning mode and the learning stopping mode based on information provided to the cards. That is, Auto Depth Card and Portrait Card are provided with information on a range to be learned (a procedure for determining whether or not a range is within a learning range) (FIGS. 38 and 48). Based on the information, the learning on zooming is automatically stopped when a range outside is predetermined learning range (flag LRF=1) (step O-535 of FIG. 39 and step P-535 of FIG. 49). Thereby, learning is not performed when it is considered that Auto Depth Card or Portrait Card is not suitable for the present photographing situation.

Although the functions are allotted to the in-body microcomputer μC1 and the in-card microcomputer μC3 in this embodiment, all the functions may be allotted to the in-body microcomputer μC1. Moreover, although zoom program lines and data relating learning are stored in the E²PROM provided in the card in this embodiment, they may be stored in a RAM or E²PROM provided in the camera body.

Although a single-lens reflex camera is described in the above description of this embodiment, the automatic learning function described therein may be realized in cameras, such as a lens shutter camera, where a finder optical system is separately provided. Further, the function may be realized not only in film cameras where film is used as a taking medium but also in electronic still cameras where a CCD or a MOS-IC is used as a taking medium.

Obviously, many modifications and variations of the present invention are possible in light of the above teachings. It is therefore to be understood that within the scope of the appended claims, the invention may be practiced other than as specifically described.

What is claimed is:

1. A camera comprising:
a taking lens whose focal length is variable;
a memory in which data for finding a magnification from a subject distance is previously stored;
a structure which measures a subject distance;
an automatic zooming arrangement which determines a focal length of said taking lens based on a subject distance measured by said distance measuring structure and the data stored in said memory so as to vary the photographing magnification;
a manual zooming arrangement which determines a focal length of said taking lens according to a manual operation; and
a changing circuit which changes a content of the data stored by said memory based on a focal length determined by said manual zooming arrangement and a subject distance measured by said distance measuring structure.

2. A camera as claimed in claim 1, further comprising a change inhibiting circuit which inhibits an operation of said changing circuit when a focal length determined by said manual zooming arrangement is outside a predetermined focal length range.

3. A camera as claimed in claim 1, further comprising a change inhibiting circuit which inhibits an operation of said changing circuit when a subject distance measured by said distance measuring structure is outside a predetermined distance range.

4. A camera as claimed in claim 1, further comprising a change inhibiting circuit which inhibits an operation of said changing circuit when a magnification determined based on a focal length determined by said manual zooming arrangement and a subject distance measured by said distance measuring structure is outside a predetermined magnification range.

5. A camera as claimed in claim 1, further comprising a change inhibiting circuit which inhibits an operation of said changing circuit when a focal length determined by said manual zooming arrangement is outside a focal length range determined by a subject distance measured by said distance measuring structure.

6. A camera comprising:
a memory where data showing a size of a subject image is previously stored;
a structure which measures a subject distance;
an automatic image size setting arrangement which varies a size of a subject image based on a subject distance measured by said distance measuring structure and the data stored in said memory;
a manual image size setting arrangement which determines a size of a subject image according to a manual operation; and
a changing circuit which changes a content of the data stored in said memory based on a size of a subject image determined by said manual image size setting arrangement.

7. A camera as claimed in claim 6, further comprising a taking lens whose focal length is variable, wherein said automatic image size setting arrangement and said manual image size setting arrangement are provided to determine a focal length of said taking lens.

8. A camera as claimed in claim 7, wherein said data showing a size of a subject image is a data showing a relation between a subject distance and a focal length.

9. A camera comprising:
a memory where automatic control data is stored;
an automatic image size setting arrangement which determines an automatic control value based on said automatic control data;
a manual image size setting arrangement which determines a manual control value according to a manual operation;
a changing circuit which changes the automatic control data stored in said memory according to said manual control value; and
a change inhibiting circuit which inhibits an operation of said changing circuit when said manual control value does not fulfill a predetermined condition even if the manual control value indicates a data to which the automatic control data can be changed.

10. A camera as claimed in claim 9, wherein said change inhibiting circuit inhibits an operation of said changing circuit when said manual control value is outside a predetermined range.

11. A camera as claimed in claim 10, further comprising a taking lens whose focal length is variable and a structure which measures a subject distance, wherein a relation data showing a relation between a subject distance and a focal length is previously stored in said memory, said automatic image size setting arrangement determines a focal length of said taking lens based on a subject distance measured by said distance measuring structure and the relation data stored in said memory, said manual image size setting arrangement determines a focal length of said taking lens according to a manual operation, and said changing circuit changes the relation data stored in said memory according to a focal length determined by said manual image size setting arrangement.

12. A camera as claimed in claim 11, wherein said change inhibiting circuit inhibits an operation of said changing circuit when a focal length determined by said manual image size setting arrangement is outside a predetermined focal length range.

13. A camera as claimed in claim 11, wherein said change inhibiting circuit inhibits an operation of said changing circuit when a subject distance measured by said distance measuring structure is outside a predetermined distance range.

14. A camera as claimed in claim 11, wherein said change inhibiting circuit inhibits an operation of said changing circuit when a magnification determined based on a focal length determined by said manual image size setting arrangement and a subject distance measured by said distance measuring structure is outside a predetermined magnification range.

15. A camera as claimed in claim 9, wherein said change inhibiting circuit inhibits an operation of said changing circuit when said manual control value is outside a range determined according to said automatic control value.

16. A camera as claimed in claim 15, further comprising a taking lens whose focal length is variable and a structure which measures a subject distance, wherein a data showing relation between a subject distance and a focal length is previously stored in said memory, said automatic image size setting arrangement determines a focal length of said taking lens based on a subject distance measured by said distance measuring structure and the data stored in said memory, and said manual image size setting arrangement determines a focal length of said taking lens according to a manual operation.

17. A camera as claimed in claim 16, wherein said change inhibiting circuit inhibits an operation of said changing circuit when a focal length determined by said manual image size setting arrangement is outside a focal length range determined by a subject distance measured by said distance measuring structure.

18. A camera as claimed in claim 9, further comprising a selector which selects a condition among a plurality of conditions, wherein said change inhibiting circuit inhibits an operation of said changing circuit when said manual control value does not fulfill a condition selected by said selector.

19. A camera as claimed in claim 18, further comprising:
an exposure control value outputting circuit which outputs an exposure control value;
a calculator which calculates an aperture value and a shutter speed which correspond to said exposure control value based on one of plural program lines showing a correspondence relation between an exposure control value and a combination of an aperture value and a shutter speed; and
a program line selector which selects a program line among said plural program lines, wherein said selector selects a condition corresponding to the program line selected by said program line selector.

20. A camera comprising:
a memory where an automatic control data is stored;
art automatic image size setting arrangement which determines an automatic control value based on said automatic control data;
a manual image size setting arrangement which determines a manual control value according to a manual operation;
a selector which selects an algorithm among plural algorithms; and
a changing circuit which changes the automatic control data stored in said memory according to said manual control value based on the algorithm selected by said selector.

21. A camera as claimed in claim 20, further comprising:
art exposure control value outputting circuit which outputs an exposure control value;
a calculator which calculates an aperture value and a shutter speed which correspond to said exposure control value based on one of plural program lines showing a correspondence relation between an exposure value and a combination of an aperture value and a shutter speed; and
a program line selector which selects a program line among said plural program lines, wherein said selector selects an algorithm which corresponds to the program line selected by said program line selector.

22. A camera as claimed in claim 20, further comprising a change inhibiting circuit which inhibits an operation of said changing circuit when said manual control value does not fulfill a predetermined condition, wherein said predetermined condition differs according to each of said algorithms.

23. A camera as claimed in claim 20, further comprising a detector which detects whether a taking image plane is longer in a vertical direction or in a horizontal direction, wherein said selector selects an algorithm according to an output of the detector.

24. A camera comprising:
a taking lens whose focal length is variable;
a memory where a plurality of relations between a subject distance and a focal length are previously stored;
a structure which measures a subject distance;
a selector which selects a relation among said plurality of relations;
art automatic zooming arrangement which determines a focal length of said taking lens based on a subject distance measured by said distance measuring structure and the relation selected by said selector;
art exposure control value outputting circuit which outputs an exposure control value; and
a calculator which calculates an aperture value and a shutter speed which correspond to said exposure control value based on one of plural program lines showing a correspondence relation between an exposure control value and a combination of an aperture value and a shutter speed, wherein said selector is provided to select a program line among said plural program lines.

25. A camera as claimed in claim 24, further comprising:
a manual zooming arrangement which determines a focal length of said taking lens according to a manual operation; and
a changing circuit which changes a content stored in said memory based on a focal length determined by said manual zooming arrangement and a subject distance measured by said distance measuring structure.

26. A camera as claimed in claim 25, further comprising a change inhibiting circuit which inhibits an operation of said changing circuit when a focal length determined by said manual zooming arrangement and/or a subject distance measured by said distance measuring structure do not fulfill a predetermined condition.

27. A camera comprising:

a memory for storing an automatic control data;
a determining circuit which determines an automatic control value based on the stored automatic control data;
a manual operation member;
a setting circuit which sets a manual control value, in response to the manual operation member;
a carrying circuit which carries out an operation of the camera based on one of the determined automatic control value and the set manual control value;
a detector which detects a photographing condition; and
a changing circuit which changes the automatic control data stored in the memory according to both a detection result of the detector and the set manual control value.

* * * * *